(12) United States Patent
Shao et al.

(10) Patent No.: US 12,063,110 B2
(45) Date of Patent: Aug. 13, 2024

(54) COMMUNICATION METHOD, MCS RECEIVING METHOD, MCS NOTIFICATION METHOD, AND DEVICE

(71) Applicant: Huawei Technologies Co., Ltd., Shenzhen (CN)

(72) Inventors: Jiafeng Shao, Beijing (CN); Lei Guan, Beijing (CN); Yongxia Lyu, Shenzhen (CN); Dan Hu, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/204,645

(22) Filed: Jun. 1, 2023

(65) Prior Publication Data

US 2023/0308207 A1    Sep. 28, 2023

Related U.S. Application Data

(63) Continuation of application No. 16/932,580, filed on Jul. 17, 2020, now Pat. No. 11,705,981, which is a
(Continued)

(30) Foreign Application Priority Data

| Jan. 19, 2018 | (CN) | .......................... 201810055745.6 |
| Apr. 4, 2018  | (CN) | .......................... 201810302135.1 |
| May 10, 2018  | (CN) | .......................... 201810467480.0 |

(51) Int. Cl.
*H04L 1/00*     (2006.01)
*H04B 7/06*     (2006.01)
(Continued)

(52) U.S. Cl.
CPC ......... *H04L 1/0026* (2013.01); *H04B 7/0632* (2013.01); *H04L 1/0009* (2013.01);
(Continued)

(58) Field of Classification Search
CPC ................. H04L 1/0003; H04L 1/0009; H04L 1/0026; H04L 5/006; H04W 24/08; H04W 24/10; H04B 7/0532
See application file for complete search history.

(56) References Cited

U.S. PATENT DOCUMENTS

| 9,596,052 B2  | 3/2017 | Pan et al. |
| 10,931,357 B2 | 2/2021 | Xu et al.  |

(Continued)

FOREIGN PATENT DOCUMENTS

| CN | 101521904 A | 9/2009 |
| CN | 102113258 A | 6/2011 |

(Continued)

OTHER PUBLICATIONS

"3rd Generation Partnership Project; Technical Specification Group Radio Access Network; NR; Multiplexing and channel coding (Release 15)", 3GPP TS 38.212 V15.0.0 (Dec. 2017), total 82 pages.

(Continued)

*Primary Examiner* — Kevin C. Harper
(74) *Attorney, Agent, or Firm* — Slater Matsil, LLP

(57) ABSTRACT

A method, and related apparatuses are disclosed, to provide an MCS corresponding to a lower code rate. The communication method includes: sending a first CQI number to a network device, wherein the first CQI number is determined based on a first CQI table; and receiving an MCS number in a first MCS table from the network device, wherein the first MCS table comprises an entry that is not comprised in the first CQI table, and at least one entry whose modulation scheme is 64QAM in the first CQI table, wherein a BLER corresponding to the first CQI table is 10e-5, and values obtained by multiplying code rates by 1024 in the first CQI table comprise 30 and 50.

18 Claims, 5 Drawing Sheets

Related U.S. Application Data continuation of application No. PCT/CN2019/072310, filed on Jan. 18, 2019.

(51) Int. Cl.
*H04W 24/08* (2009.01)
*H04L 27/18* (2006.01)

(52) U.S. Cl.
CPC .......... *H04W 24/08* (2013.01); *H04L 1/0003* (2013.01); *H04L 1/0013* (2013.01); *H04L 27/18* (2013.01)

(56) References Cited

U.S. PATENT DOCUMENTS

| | | | |
|---|---|---|---|
| 2010/0014500 A1 | 1/2010 | Lee et al. | |
| 2010/0313098 A1 | 12/2010 | Lee et al. | |
| 2011/0141941 A1 | 6/2011 | Lee et al. | |
| 2012/0058730 A1 | 3/2012 | Jitsukawa et al. | |
| 2012/0076236 A1 | 3/2012 | Ko et al. | |
| 2012/0320862 A1 | 12/2012 | Soo et al. | |
| 2013/0182627 A1 | 7/2013 | Lee et al. | |
| 2014/0219326 A1 | 8/2014 | Ko et al. | |
| 2014/0355543 A1 | 12/2014 | Golitschek Edler Von Elbwart et al. | |
| 2015/0016553 A1* | 1/2015 | Yang .................. H04L 1/1812 375/261 | |
| 2015/0103798 A1 | 4/2015 | Li | |
| 2015/0117568 A1 | 4/2015 | Wang et al. | |
| 2015/0173064 A1 | 6/2015 | Kim et al. | |
| 2015/0200746 A1 | 7/2015 | Pan et al. | |
| 2015/0207608 A1 | 7/2015 | Suikkanen et al. | |
| 2015/0271794 A1 | 9/2015 | Kang et al. | |
| 2015/0271802 A1* | 9/2015 | Kang .................. H04L 1/0003 370/329 | |
| 2016/0173253 A1 | 6/2016 | Hwang et al. | |
| 2016/0226649 A1* | 8/2016 | Papasakellariou .... H04L 1/0028 | |
| 2016/0277092 A1* | 9/2016 | Pi .................. H04L 1/0026 | |
| 2016/0337023 A1 | 11/2016 | Yi et al. | |
| 2017/0207878 A1 | 7/2017 | Chen et al. | |
| 2017/0231000 A1 | 8/2017 | Nagata et al. | |
| 2018/0097591 A1 | 4/2018 | Islam et al. | |
| 2018/0351625 A1* | 12/2018 | Xu .................. H04L 5/0057 | |
| 2019/0044647 A1 | 2/2019 | Tomeba et al. | |
| 2019/0165894 A1 | 5/2019 | Choi et al. | |
| 2019/0215095 A1 | 7/2019 | Park et al. | |
| 2019/0253121 A1 | 8/2019 | Islam et al. | |
| 2019/0313426 A1 | 10/2019 | Lin et al. | |
| 2020/0007270 A1* | 1/2020 | Wikström ............ H04L 5/0057 | |
| 2021/0226725 A1 | 7/2021 | Chen | |
| 2021/0243784 A1 | 8/2021 | Goto et al. | |

FOREIGN PATENT DOCUMENTS

| | | |
|---|---|---|
| CN | 102624501 A | 8/2012 |
| CN | 103580788 A | 2/2014 |
| CN | 103944855 A | 7/2014 |
| CN | 103973403 A | 8/2014 |
| CN | 104052572 A | 9/2014 |
| CN | 104243086 A | 12/2014 |
| CN | 104283638 A | 1/2015 |
| CN | 104468027 A | 3/2015 |
| CN | 105450329 A | 3/2016 |
| CN | 105850066 A | 8/2016 |
| CN | 105960787 A | 9/2016 |
| CN | 106160987 A | 11/2016 |
| CN | 106464645 A | 2/2017 |
| CN | 106464647 A | 2/2017 |
| CN | 106559171 A | 4/2017 |
| EP | 2879427 A1 | 6/2015 |
| EP | 3131225 A1 | 2/2017 |
| JP | 2013059098 A | 3/2013 |
| JP | 2015511475 A | 4/2015 |
| JP | 2015518311 A | 6/2015 |
| JP | 2018531545 A | 10/2018 |
| KR | 20080071469 A | 8/2008 |
| KR | 20150034808 A | 4/2015 |
| KR | 20160014729 A | 2/2016 |
| RU | 2501170 C2 | 12/2013 |
| RU | 2633154 C2 | 10/2017 |
| WO | 2010131354 A1 | 11/2010 |
| WO | 2011015097 A1 | 2/2011 |
| WO | 2013151715 A1 | 10/2013 |
| WO | 2014000306 A1 | 1/2014 |
| WO | 2014161134 A1 | 10/2014 |
| WO | 2015083566 A1 | 6/2015 |
| WO | 2015100690 A1 | 7/2015 |
| WO | 2017050273 A1 | 3/2017 |
| WO | 2017169829 A1 | 10/2017 |

OTHER PUBLICATIONS

"3rd Generation Partnership Project; Technical Specification Group Radio Access Network; NR;Physical layer procedures for data (Release 15)", 3GPP TS 38.214 V15.0.0 (Dec. 2017), total 71 pages.

Huawei et al., "Link adaption and CSI reporting for URLLC transmission", 3GPP TSG RAN WG1 Meeting #90bis, R1-1717093, Prague, Czech Republic, Oct. 9-13, 2017, total 10 pages.

Huawei Hisilicon, "Discussion on TBS and MCS designs", 3GPP TSG RAN WG1 Meeting 91,R1-1721390, Reno, USA, Nov. 27-Dec. 1, 2017, total 11 pages.

Huawei Hisilicon, "Remaining details of CQI and MCS design", 3GPP TSG RAN WG1 Meeting #91, R1-1721433, Reno, USA, Nov. 27-Dec. 1, 2017, total 10 pages.

"CQI and MCS Design for URLLC," Source: ZTE, Sanechips, Agenda Item: 7.4.1, Document for: Discussion, 3GPP TSG-RAN WG1 Meeting # AH 1801, R1-1800742, Vancouver, Canada, Jan. 22-26, 2018, 6 pages.

Ericsson, "CQI and MCS tables for URLLC", 3GPP TSG-RAN WG1 Meeting #91ah R1-1800959, Jan. 22-26, 2018, 12 pages, Vancouver, Canada.

3GPP TS 38.214 V15.5.0 (Mar. 2019), 3rd Generation Partnership Project; Technical Specification Group Radio Access Network; NR; Physical layer procedures for data(Release 15), 103 pages.

Intel Corporation, "On link adaptation enhancements to support URLLC", 3GPP TSG RAN WG1 Meeting 90bis, R1-1717399, Oct. 9-13, 2017, 5 pages, Prague, Czech Republic.

Samsung, "CQI definition", 3GPP TSG RAN WG1 Meeting #91, R1-1720292, Nov. 27-Dec. 1, 2017, 9 pages, Reno, USA.

Sony, "Summary of section 6.2.5.5 on PDSCH DL spectral efficiency for efeMTC", 3GPP TSG RAN1#91, R1-1721225, USA Nov. 27-Dec. 1, 2017, 3 pages, Reno, Nevada.

Sony, "CQI reporting for efeMTC supporting 64QAM", 3GPP TSG RAN1#91, R1-1720469, Nov. 27-Dec. 1, 2017, 3 pages, Reno, Nevada, USA.

* cited by examiner

COMMUNICATION METHOD, MCS RECEIVING METHOD, MCS NOTIFICATION METHOD, AND DEVICE

CROSS-REFERENCE TO RELATED APPLICATIONS

This application is a continuation of U.S. patent application Ser. No. 16/932,580, filed on Jul. 17, 2020, which is a continuation of International Application No. PCT/CN2019/072310, filed on Jan. 18, 2019, which claims priority to Chinese Patent Application No. 201810055745.6, filed on Jan. 19, 2018, claims priority to Chinese Patent Application No. 201810302135.1, filed on Apr. 4, 2018, and claims priority to Chinese Patent Application No. 201810467480.0, filed on May 10, 2018. All of the afore-mentioned patent applications are hereby incorporated by reference in their entireties.

TECHNICAL FIELD

This application relates to the field of communications technologies, and in particular, to a communication method, an MCS receiving method, an MCS notification method, and a device.

BACKGROUND

For a 5th generation (5G) mobile communications system and a future mobile communications system, the International Telecommunication Union (ITU) defines three types of application scenarios: enhanced mobile broadband (eMBB), ultra-reliable and low latency communication (URLLC), and massive machine type communications (mMTC).

A URLLC service has a very high latency requirement. A latency of unidirectional transmission from a transmit end to a receive end needs to be within 0.5 millisecond (ms), and reliability of transmission within 1 ms needs to reach 99.999%.

A block error rate (BLER) corresponding to a modulation and coding scheme (MCS) applied to a current eMBB service is 10e-1. For the URLLC service within a short latency, to achieve the higher reliability, a system needs to support a BLER with a smaller value. In view of a same signal-to-noise ratio, lower a code rate, lower a BLER is.

However, a code rate that is of an MCS and that is included in a currently applied MCS table is relatively high, and cannot adapt to a requirement of the URLLC service.

SUMMARY

Embodiments of this application provide a communication method, an MCS receiving method, an MCS notification method, and a device, to provide an MCS corresponding to a lower code rate, so as to better adapt to a requirement of a URLLC service.

According to a first aspect, a communication method is provided, and the method may be performed by a communications apparatus. The communications apparatus is, for example, a network device, and the network device is, for example, a base station. The method includes: determining N MCS indexes in an MCS table, where a value that is obtained by multiplying a code rate by 1024 and that corresponds to an MCS index X in the N MCS indexes is less than or equal to a first threshold, where X is an integer greater than or equal to 0, N is a positive integer, and N is greater than or equal to X; and sending at least one of the N MCS indexes.

Correspondingly, according to a second aspect, a communication method is provided, and the method may be performed by a communications apparatus. The communications apparatus is, for example, a terminal device. The method includes: receiving downlink control information; and obtaining at least one MCS index in an MCS table based on the downlink control information, where the MCS table includes N MCS indexes, a value that is obtained by multiplying a code rate by 1024 and that corresponds to an MCS index X in the N MCS indexes is less than or equal to a first threshold, where X is an integer greater than or equal to 0, N is a positive integer, and N is greater than or equal to X.

In this embodiment of this application, the value that is obtained by multiplying the code rate by 1024 and that corresponds to the index X in the N indexes included in the MCS table is less than or equal to the first threshold. To be specific, the MCS table provided in this embodiment of this application includes an MCS with a relatively low code rate, so that the MCS table may correspond to a lower BLER. In this case, the MCS table provided in this embodiment of this application can effectively adapt to a requirement of a URLLC service. The first threshold may be specified by a protocol. For example, the first threshold is 119 or 120. This is not specifically limited.

In a possible design, the value that is obtained by multiplying the code rate by 1024 and that corresponds to the MCS index X is greater than or equal to a second threshold. The value that is obtained by multiplying the code rate by 1024 and that corresponds to the MCS index X may not be infinitely small. Therefore, the value that is obtained by multiplying the code rate by 1024 and that corresponds to the MCS index X may further be greater than or equal to the second threshold. The second threshold may be specified by a protocol. For example, the second threshold is 5 or 8. This is not specifically limited.

In a possible design, a modulation scheme corresponding to the MCS index X is the same as a modulation scheme corresponding to an MCS index X+1, and a value obtained by multiplying a difference between a code rate corresponding to the MCS index X and a code rate corresponding to the MCS index X+1 by 1024 is less than or equal to a third threshold; and/or the modulation scheme corresponding to the MCS index X is the same as the modulation scheme corresponding to the MCS index X+1, and the value obtained by multiplying the difference between the code rate corresponding to the MCS index X and the code rate corresponding to the MCS index X+1 by 1024 is greater than or equal to a fourth threshold.

According to calculation in an existing protocol, a code rate fluctuation causes a severe resource allocation change. In this case, if the terminal device can accurately report a value of a code rate or spectral efficiency corresponding to an SNR, a system can save many resources, thereby improving system utilization. According to evaluation, specially, if a time-domain resource for data transmission is in a length of two symbols, a required frequency-domain resource is at least 212 resource blocks (RB) when a code rate multiplied by 1024 is 30, a required frequency-domain resource is 192 RBs when a code rate multiplied by 1024 is 34, a required frequency-domain resource is 172 RBs when a code rate multiplied by 1024 is 37, and a required frequency-domain resource is 152 RBs when a code rate multiplied by 1024 is 42. Therefore, different from an original table, in a CQI table or an MCS table in URLLC, if a difference between code rates of two adjacent entries can be less than or equal to the third threshold, system resource utilization can be improved. Therefore, in the MCS table provided in this embodiment of this application, the modulation schemes corresponding to the MCS index X and the MCS index X+1 are the same, and the value obtained by multiplying the difference between the code rate corresponding to the MCS index X and the code rate corresponding to the MCS index X+1 by 1024 may be less than or equal to the third threshold.

In addition to a condition related to the third threshold, in this embodiment of this application, the modulation scheme corresponding to the MCS index X is the same as the modulation scheme corresponding to the MCS index X+1, and the value obtained by multiplying the difference between the code rate corresponding to the MCS index X and the code rate corresponding to the MCS index X+1 by 1024 may be further greater than or equal to the fourth threshold. A value of the fourth threshold is related to channel estimation precision of the terminal device. If an SNR corresponding to 10 is 0.5 dB, minimum channel estimation precision of the terminal device is also 0.5 dB. To be specific, a code rate difference that is less than this value cannot be recognized by the terminal device. Therefore, in the MCS table provided in this embodiment of this application, a value obtained by multiplying a difference between code rates of two adjacent entries by 1024 is greater than or equal to the fourth threshold.

In a possible design, the code rate of the MCS index X is determined based on a code rate of an MCS index X−1 and a code rate of an MCS index X+2, and/or the code rate of the MCS index X+1 is determined based on the code rate of the MCS index X−1 and the code rate of the MCS index X+2.

In this embodiment of this application, a new entry may be added to an original CQI table or MCS table to obtain a new MCS table. A manner of adding a new entry is dividing a part between two entries in the original CQI table or MCS table into three equal parts, to obtain two new entries. In this manner, the MCS table provided in this embodiment of this application may be obtained. In this way, an entry with a low code rate may be added to the new MCS table. Because URLLC is a high-reliability service, a value of a low code rate is more required. Therefore, URLLC transmission reliability can be improved by designing the MCS table in this manner.

In a possible design, the code rate of the MCS index X is equal to one of the following:

⌈code rate of the MCS index X−1+{(code rate of the MCS index X+2−code rate of the MCS index X−1)/3}⌉;
code rate of the MCS index X−1+⌈(code rate of the MCS index X+2−code rate of the MCS index X−1)/3⌉;
⌈code rate of the MCS index X+2−{(code rate of the MCS index X+2−code rate of the MCS index X−1)×2/3}⌉; and
code rate of the MCS index X+2−⌈(code rate of the MCS index X+2−code rate of the MCS index X−1)×2/3⌉.

In a possible design, the code rate of the MCS index X+1 is equal to one of the following:

code rate of the MCS index X−1+⌈(code rate of the MCS index X+2−code rate of the MCS index X−1)×2/3⌉;
⌈code rate of the MCS index X+2−{(code rate of the MCS index X+2−code rate of the MCS index X−1)/3}⌉; and
code rate of the MCS index X+2−⌈(code rate of the MCS index X+2−code rate of the MCS index X−1)/3⌉.

The foregoing calculation methods for the MCS index X and the MCS index X+1 are merely an example, and this embodiment of this application is not limited thereto.

In a possible design, the first threshold is 119, and the value that is obtained by multiplying the code rate by 1024 and that corresponds to the MCS index X includes at least one of the following values:

5, 8, 10, 13, 14, 15, 16, 17, 18, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, and 119.

Some possible values are listed. Selection may be performed in a specific MCS table as required. This is relatively flexible.

In a possible design, a coding scheme corresponding to the MCS index X is BPSK or QPSK.

Generally, a larger value of an MCS index leads to a higher corresponding code rate. In this case, because the code rate corresponding to the MCS index X is relatively low, the value of the MCS index X is relatively small. For example, the MCS index X includes an MCS index 1 or an MCS index 0. When the value of the MCS index is relatively small, BPSK or QPSK may be selected as a corresponding coding scheme, to achieve relatively good coding performance.

In a possible design, in the MCS table, a coding scheme corresponding to an MCS index whose code rate is less than F is polar or LDPC BG2, and F is greater than or equal to 0.25.

An MCS index with a relatively low code rate may correspond to a coding scheme such as the polar or the LDPC BG2. Certainly, this is not specifically limited in this embodiment of this application.

In a possible design, the MCS indexes in the MCS table correspond to at least two of the following coding schemes: LDPC BG1, LDPC BG2, and polar.

In addition to the foregoing three enumerated schemes, the MCS indexes in the MCS table may further correspond to another coding scheme. This is not limited in this embodiment of this application.

In a possible design, in the N MCS indexes, coding corresponding to an MCS index XX and an MCS index XX+1 are different, spectral efficiency corresponding to the MCS index XX and the MCS index XX+1 is the same, and a coding scheme corresponding to the MCS index XX is the BG2 and a coding scheme corresponding to the MCS index XX+1 is the BG1, or a coding scheme corresponding to the MCS index XX is the BG1 and a coding scheme corresponding to the MCS index XX+1 is the BG2, where XX is an integer greater than or equal to 0, and XX+1 is less than or equal to N.

A newly introduced MCS in the MCS table provided in this embodiment of this application may be considered as a new entry first introduced in a CQI table, and the new entry introduced in the CQI table may be directly added to the MCS table. In this case, in entries newly added to the MCS table, an average value such as an arithmetic average value of two adjacent entries may be calculated. In this manner, a new entry may be obtained. The two adjacent entries herein are two entries with adjacent MCS indexes. In this case, when the average value of the two adjacent entries is calculated, only one entry may be obtained, or two entries may be obtained. For example, two entries are obtained by calculating the average value of the two adjacent entries, and MCS indexes of the two entries are respectively an MCS index XX and an MCS index XX+1. In this case, modulation schemes corresponding to the MCS index XX and the MCS index XX+1 are different. For example, the MCS index XX corresponds to QPSK, and the MCS index XX+1 corresponds to 16QAM. However, spectral efficiency corresponding to the MCS index XX and the MCS index XX+1 may be the same. In this case, coding schemes corresponding to the MCS index XX and the MCS index XX+1 may be different. For example, the MCS index XX corresponds to the BG2 and the MCS index XX+1 corresponds to the polar, or the MCS index XX+1 corresponds to the BG2 and the MCS index XX corresponds to the polar.

In a possible design, in the N MCS indexes, a quantity of MCS indexes whose corresponding coding schemes are the BG2 is greater than or equal to a quantity of MCS indexes whose corresponding coding schemes are the polar.

To be specific, in the MCS table, a larger quantity of MCS indexes correspond to relatively high code rates, so that the MCS table provided in this embodiment of this application can be better compatible with an existing MCS table.

In a possible design, the MCS table includes an entry whose corresponding modulation scheme is QPSK, includes entries whose corresponding modulation schemes are BPSK and 16QAM, and does not include entries whose corresponding modulation schemes are 64QAM and 256QAM.

In other words, in this embodiment of this application, a modulation scheme may be limited, but a code rate and spectral efficiency are not limited.

According to a third aspect, an MCS receiving method is provided, and the method may be performed by a communications apparatus. The communications apparatus is, for example, a terminal device. The method includes: sending, by the communications apparatus, a first CQI number, where the first CQI number is determined based on a first CQI table; and receiving, by the communications apparatus, an MCS number in a first MCS table, where the first MCS table includes an entry excluded in the first CQI table, and at least one entry whose modulation scheme is 64QAM in the first CQI table.

Correspondingly, according to a fourth aspect, an MCS notification method is provided, and the method may be performed by a communications apparatus. The communications apparatus is, for example, a network device, and the network device is, for example, a base station. The method includes: receiving, by the communications apparatus, a first channel quality indicator CQI number in a first CQI table; and sending, by the communications apparatus, a first MCS number, where the first MCS number is determined based on a first MCS table, and the first MCS table includes an entry excluded in the first CQI table, and at least one entry whose modulation scheme is 64QAM in the first CQI table.

The entry excluded in the first CQI table is, for example, an entry corresponding to a relatively low code rate. To be specific, the MCS table provided in this embodiment of this application includes an MCS with a relatively low code rate, so that the MCS table may correspond to a lower BLER. In this case, the MCS table provided in this embodiment of this application can effectively adapt to a requirement of a URLLC service.

In a possible design, the first MCS table includes all entries other than an entry corresponding to a smallest CQI number in the first CQI table.

The first MCS table includes all the entries other than the entry corresponding to the smallest CQI number in the first CQI table. The first MCS table includes all entries other than an entry corresponding to a CQI number 0 in the first CQI table. In other words, the first MCS table includes all entries other than an "out of range" entry in the first CQI table.

In a possible design, the first MCS table includes 16 entries in total, and there is one entry excluded in the first CQI table.

For example, a code rate of the one entry excluded in the first CQI table is less than a code rate of a CQI number 1 in the first CQI table. For another example, spectral efficiency of the one entry excluded in the first CQI table is less than spectral efficiency of the CQI number 1 in the first CQI table. In this way, when the network device receives the CQI number 1 or the CQI number 0 sent by a terminal device, the network device may further schedule the terminal device at a lower code rate, so that the terminal device can still meet a URLLC service requirement. Therefore, reliability of URLLC service transmission is ensured.

In a possible design, an MCS number that is of the entry not included in the first CQI table and that is in the first MCS table is one of the following: an MCS number 0, an MCS number 1, and an MCS number 3.

If the network device receives the CQI number 1 or the CQI number 0 sent by a terminal device, the network device may further schedule the terminal device at a lower code rate, so that the terminal device can still meet a URLLC service requirement. Therefore, reliability of URLLC service transmission is ensured. Alternatively, when the network device receives the CQI number 1 or the CQI number 2 sent by a terminal device, the network device may schedule the terminal device based on the MCS number 1 corresponding to an intermediate spectral efficiency, so that the terminal device can still meet a URLLC service requirement. Therefore, system efficiency and reliability of URLLC service transmission are ensured. Alternatively, when the network device receives a CQI number 2 or a CQI number 3 sent by a terminal device, the network device may schedule the terminal device based on the MCS number 3 corresponding to an intermediate spectral efficiency, so that the terminal device can still meet a URLLC service requirement. Therefore, system efficiency and reliability of URLLC service transmission are ensured.

In a possible design, a quantity of entries included in the first MCS table is the same as a quantity of entries included in the first CQI table, or a quantity of entries included in the first MCS table is less than or equal to 16 and is greater than a quantity of entries included in the first CQI table.

In a possible design, in the entries included in the first CQI table and/or the first MCS table, a corresponding value obtained by multiplying a code rate by 1024 includes the following value: 30, or includes at least one of the following values: 35, 37, 40, 46, 49, 68, 70, 90, and 95.

The foregoing describes a relationship between the first MCS table and the first CQI table. This is merely an example. This embodiment of this application is not limited thereto.

In a possible design, spectral efficiency of an entry of the MCS number 0 in the first MCS table is less than spectral efficiency of an entry of the CQI number 1 in the first CQI table.

In this way, when the network device receives the CQI number 1 or the CQI number 0 sent by a terminal device, the network device may further schedule the terminal device at a lower code rate, so that the terminal device can still meet a URLLC service requirement. Therefore, reliability of URLLC service transmission is ensured.

In a possible design, all entries whose modulation schemes are 64QAM in the first CQI table are some entries of 64QAM in a second CQI table, and the some entries of 64QAM in the second CQI table are as follows:

the some entries correspond to equally spaced CQI numbers; or the some entries correspond to nonconsecutive CQI numbers, and are at least one entry other than an entry corresponding to a largest CQI number in all entries whose modulation schemes are 64QAM in the second CQI table; or the some entries correspond to consecutive CQI numbers, and are at least one entry other than an entry corresponding to a largest CQI number in all entries whose modulation schemes are 64QAM in the second CQI table; or the some entries include an entry corresponding to a largest CQI number in all entries whose modulation schemes are 64QAM in the second CQI table; or the some entries include N entries whose modulation schemes are 64QAM in the second CQI table and that correspond to consecutive CQI numbers, and a first entry in the N consecutive entries is an entry whose modulation scheme is 64QAM in the second CQI table and that corresponds to a smallest CQI number, where N is a positive integer greater than or equal to 1 and less than or equal to 5.

Several possibilities for the some entries of 64QAM in the second CQI table are described.

In a possible design, the some entries whose modulation schemes are 64QAM in the second CQI table are a CQI number 10, a CQI number 12, and a CQI number 14, or a CQI number 11, a CQI number 13, and a CQI number 15 in the second CQI table; or the some entries whose modulation schemes are 64QAM in the second CQI table are a CQI number 10, a CQI number 11, a CQI number 12, a CQI number 13, and a CQI number 15, or a CQI number 10, a CQI number 11, a CQI number 14, and a CQI number 15, or a CQI number 11, a CQI number 12, a CQI number 13, a CQI number 14, and a CQI number 15, or a CQI number 10, a CQI number 11, a CQI number 12, a CQI number 14, and a CQI number 15 in the second CQI table; or the some entries whose modulation schemes are 64QAM in the second CQI table are a CQI number 10, a CQI number 11, a CQI number 12, a CQI number 13, and a CQI number 14, or a CQI number 10, a CQI number 11, a CQI number 12, and a CQI number 13, or a CQI number 10, a CQI number 11, and a CQI number 12, or a CQI number 10 and a CQI number 11 in the second CQI table.

Several possibilities for the some entries of 64QAM in the second CQI table are described.

In a possible design, each entry in the first MCS table corresponds to one modulation scheme, one code rate, and one piece of spectral efficiency; or a modulation scheme of an entry with a largest MCS number in the first MCS table is QPSK, and a code rate and spectral efficiency are reserved; or a modulation scheme of an entry with a largest MCS number in the first MCS table is 16QAM and a code rate and spectral efficiency are reserved, and a modulation scheme of an entry with a second largest MCS number in the first MCS table is QPSK and a code rate and spectral efficiency are reserved; or a modulation scheme of an entry with a largest MCS number in the first MCS table is 64QAM and a code rate and spectral efficiency are reserved, and a modulation scheme of an entry with a second largest MCS number in the first MCS table is QPSK and a code rate and spectral efficiency are reserved; or a modulation scheme, a code rate, and spectral efficiency of at least one entry in the first MCS table are reserved.

In a possible design, a value range of a CQI number in the first CQI table is the same as a value range of a CQI number in the second CQI table.

For example, if the first CQI table includes CQI numbers 0 to 15, the second CQI table also includes the CQI numbers 0 to 15.

In a possible design, the first MCS table is determined based on a first MCS offset and a second MCS table, or a code rate corresponding to at least one MCS number in the first MCS table is determined based on a first MCS offset and a second MCS table. The first MCS offset may be sent by the network device by using higher layer signaling or downlink control information DCI.

In a possible design, the first MCS table includes 32 entries, the 32 entries include all entries in the first CQI table, the first CQI table includes at least one entry whose spectral efficiency is less than 78/1024×2, and the 32 entries further include at least one entry excluded in the first CQI table and whose spectral efficiency is greater than 772/1024×6, where for the MCS number X, modulation schemes corresponding to an MCS number X−1 and the MCS number X are QPSK, a modulation scheme corresponding to an MCS number X+1 is 16QAM, and a code rate of the MCS number X is equal to one of the following: rounding up {(code rate of the MCS number X−1×2+code rate of the MCS number X+1×4)/4}, rounding down {(code rate of the MCS number X−1×2+code rate of the MCS number X+1×4)/4}, rounding off {(code rate of the MCS number X−1×2+code rate of the MCS number X+1×4)/4}, and (code rate of the MCS number X−1×2+code rate of the MCS number X+1×4)/4; and for an MCS number Y, modulation schemes corresponding to an MCS number Y−1 and the MCS number Y are 16QAM, a modulation scheme corresponding to an MCS number Y+1 is 64QAM, and a code rate of the MCS number Y is equal to one of the following: rounding up {(code rate of the MCS number Y−1×4+code rate of the MCS number Y+1×6)/8}, rounding down {(code rate of the MCS number Y−1×4+code rate of the MCS number Y+1×6)/8}, rounding off {(code rate of the MCS number Y−1×4+code rate of the MCS number Y+1×6)/8}, and (code rate of the MCS number Y−1×4+code rate of the MCS number Y+1×6)/8, where Y is greater than X+2.

Currently, URLLC supports two CQI tables, and the two CQI tables respectively correspond to different BLERs. For example, the two CQI tables are respectively referred to as a first CQI table and a second CQI table. All or some entries in the two CQI tables are different. For example, a BLER corresponding to the first CQI table is 10e-5, and more low spectral efficiency entries are introduced in the first CQI table. For example, a BLER corresponding to the second CQI table is 10e-1, the second CQI table may reuse an eMBB CQI table, and the second CQI table includes more high spectral efficiency entries. Currently, an MCS table is not determined. If two MCS tables are designed to be in a one-to-one correspondence with the CQI tables, there is a problem about how the terminal device and the network device determine a specific MCS table that should be used. Currently, there are two mainstream solutions: 1. A dynamic MCS table is used, in other words, the network device notifies, by using signaling, the terminal device of a specific MCS table to be used. 2. An MCS table is semi-statically configured by using RRC signaling. In the solution 1, a relatively large quantity of additional signaling overheads are caused. The solution 2 takes effect too slowly, and is not suitable for scheduling in a URLLC service having a relatively high latency requirement. In view of this, this embodiment of this application provides a new MCS table. The MCS table is, for example, referred to as a first MCS table, and the first MCS table may correspond to at least two CQI tables with different BLERs.

In this embodiment of this application, the first MCS table may include 32 entries. The 32 entries include all entries in the first CQI table. The first CQI table includes at least one entry whose spectral efficiency is less than 78/1024×2. Currently, it is known that highest spectral efficiency in the first CQI table is 772/1024×6. In this case, all the entries included in the first CQI table should be included in the first MCS table, and the 32 entries further include at least one entry excluded in the first CQI table. Spectral efficiency of the at least one entry excluded in the first CQI table is greater than 772/1024×6. In other words, all or some of entries that are not included in the first CQI table and whose spectral efficiency is greater than 772/1024×6 are included in the first MCS table.

In a possible design, X, Y, the entry excluded in the first CQI table, and all the entries in the first CQI table correspond to values of MCS numbers, spectral efficiency of a CQI number 14 in the second CQI table is 873/1024×6, spectral efficiency of a CQI number 15 in the second CQI table is 948/1024×6, and there is one of the following combinations:

X is 15, Y is 21, spectral efficiency of an MCS number 30 is 873/1024×6, spectral efficiency of an MCS number 31 is 948/1024×6, spectral efficiency of the MCS number 0 is spectral efficiency of the CQI number 1 in the first CQI table, and spectral efficiency of a MCS number 2 is spectral efficiency of the CQI number 2 in the first CQI table;

X is 15, Y is 21, spectral efficiency of the MCS number 30 is 873/1024×6, spectral efficiency of the MCS number 31 is 910/1024×6, spectral efficiency of the MCS number 0 is spectral efficiency of the CQI number 1 in the first CQI table, and spectral efficiency of the MCS number 2 is spectral efficiency of the CQI number 2 in the first CQI table;

X is 13, Y is 19, spectral efficiency of an MCS number 28 is 873/1024×6, spectral efficiency of an MCS number 27 is 822/1024×6, MCS numbers 29 to 31 are reserved entries, spectral efficiency of the MCS number 0 is spectral efficiency of the CQI number 1 in the first CQI table, and spectral efficiency of the MCS number 1 is spectral efficiency of the CQI number 2 in the first CQI table;

X is 14, Y is 20, spectral efficiency of an MCS number 28 is 822/1024×6, MCS numbers 29 to 31 are reserved entries, spectral efficiency of the MCS number 0 is (spectral efficiency of the CQI number 1 in the first CQI table+spectral efficiency of the CQI number 2 in the first CQI table)/2, spectral efficiency of the MCS number 1 is the spectral efficiency of a CQI number 2 in the first CQI table, and spectral efficiency of the MCS number 2 is (spectral efficiency of the CQI number 1 in the first CQI table+spectral efficiency of a CQI number 3 in the first CQI table)/2; and X is 14, Y is 20, spectral efficiency of an MCS number 28 is 822/1024×6, spectral efficiency of an MCS number 29 is 873/1024×6, spectral efficiency of an MCS number 30 is 910/1024×6, spectral efficiency of an MCS number 31 is 948/1024×6, spectral efficiency of the MCS number 0 is (spectral efficiency of the CQI number 1 in the first CQI table+spectral efficiency of the CQI number 2 in the first CQI table)/2, spectral efficiency of the MCS number 1 is the spectral efficiency of the CQI number 2 in the first CQI table, and spectral efficiency of an MCS number 2 is (spectral efficiency of the CQI number 1 in the first CQI table+ spectral efficiency of a CQI number 3 in the first CQI table)/2.

The foregoing shows some specific examples of entries included in the first MCS table. This is not limited in actual application.

In a possible design, transform precoding is enabled; if the terminal device reports that pi/2 BPSK modulation is supported, q=1; if the terminal device reports that the pi/2 BPSK modulation is not supported, q=2, where q is a lowest supported modulation order reported by the terminal device; and a modulation order of a reserved entry corresponding to at least one of the MCS numbers 29, 30, and 31 is determined based on a value of q.

The MCS table further corresponds to the transform precoding. If the transform precoding is enabled, the parameter q exists, and q may represent the lowest modulation order that can be supported by the terminal device. If q=2, a reserved entry q (for example, an entry corresponding to an MCS number 28 in the prior art) always exists in the MCS table. This causes a state entry waste. For example, in the prior art, when q=2, the MCS number 28 and an MCS number 29 are a same entry. This belongs to a redundant state. In view of this, in this embodiment of this application, in consideration of state entry saving, more valid MCS indication state entries are introduced. For example, in this embodiment of this application, all or some entries in the first MCS table may be determined based on the value of q.

In a possible design, that a modulation order of a reserved entry corresponding to at least one of the MCS numbers 29, 30, and 31 is determined based on a value of q includes: if q=1, the MCS number 29 corresponds to a modulation order 1, the MCS number 30 corresponds to a modulation order 2, and the MCS number 31 corresponds to a modulation order 4; and/or if q=2, the MCS number 29 corresponds to a modulation order 2, the MCS number 30 corresponds to a modulation order 4, and the MCS number 31 corresponds to a modulation order 6.

In a possible design, the transform precoding is enabled; if the terminal device reports that pi/2 BPSK modulation is supported, q=1; if the terminal device reports that pi/2 BPSK modulation is not supported, q=2, where q is the lowest supported modulation order reported by the terminal device; and spectral efficiency corresponding to at least one MCS number is determined based on the value of q.

In a possible design, spectral efficiency of an entry corresponding to the MCS number 28 is a reserved value or a value greater than 772/1024×6, and is determined based on the value of q; or spectral efficiency of an entry corresponding to the MCS number 28 is one of two values greater than 772/1024×6, and is determined based on the value of q.

In a possible design, that spectral efficiency of an entry corresponding to the MCS number 28 is a reserved value or a value greater than 772/1024×6, and is determined based on the value of q includes: if q=1, the spectral efficiency of the entry corresponding to the MCS number 28 is reserved; and/or if q=2, the spectral efficiency of the entry corresponding to the MCS number 28 is one of the following spectral efficiency: 822/1024×6, 873/1024×6, 910/1024×6, and 948/1024×6.

It may be learned that, in this embodiment of this application, the modulation order of the reserved entry corresponding to the at least one of the MCS numbers 29, 30, and 31 may be determined based on the value of q, so as to minimize a state entry waste. Certainly, the foregoing description is merely some examples. This is not specifically limited.

According to a fifth aspect, a CQI notification method is provided, and the method may be performed by a communications apparatus. The communications apparatus is, for example, a terminal device. The method includes: learning, by the communications apparatus, of a first CQI number based on a first CQI table; and sending, by the communications apparatus, the first CQI number, where the first CQI table includes an entry excluded in a second CQI table, and some entries whose modulation schemes are 64QAM in the second CQI table.

Correspondingly, according to a sixth aspect, a CQI receiving method is provided, and the method may be performed by a communications apparatus. The communications apparatus is, for example, a network device, and the network device is, for example, a base station. The method includes: receiving, by the communications apparatus, a first CQI number in a first CQI table; and determining, by the communications apparatus, a modulation scheme, a code rate, and spectral efficiency that correspond to the first CQI number, where the first CQI table includes an entry excluded in a second CQI table, and some entries whose modulation schemes are 64QAM in the second CQI table.

The entry excluded in the second CQI table is, for example, an entry corresponding to a relatively low code rate. To be specific, an MCS table provided in this embodiment of this application includes an MCS with a relatively low code rate, so that the MCS table may correspond to a lower BLER. In this case, the MCS table provided in this embodiment of this application can effectively adapt to a requirement of a URLLC service.

In a possible design, all entries whose modulation schemes are 64 quadrature amplitude modulation QAM in the first CQI table are some entries of 64QAM in a second CQI table, and the some entries of 64QAM in the second CQI table are as follows:
  the some entries correspond to equally spaced CQI numbers; or
  the some entries correspond to nonconsecutive CQI numbers, and are at least one entry other than an entry corresponding to a largest CQI number in all entries whose modulation schemes are 64QAM in the second CQI table; or
  the some entries correspond to consecutive CQI numbers, and are at least one entry other than an entry corresponding to a largest CQI number in all entries whose modulation schemes are 64QAM in the second CQI table; or
  the some entries include an entry corresponding to a largest CQI number in all entries whose modulation schemes are 64QAM in the second CQI table; or
  the some entries include N entries whose modulation schemes are 64QAM in the second CQI table and that correspond to consecutive CQI numbers, and a first entry in the N consecutive entries is an entry whose modulation scheme is 64QAM in the second CQI table and that corresponds to a smallest CQI number, where N is a positive integer greater than or equal to 1 and less than or equal to 5.

In a possible design, all the entries whose modulation schemes are 64QAM in the first CQI table are the some entries of 64QAM in the second CQI table, and the some entries of 64QAM in the second CQI table are as follows:
  the some entries whose modulation schemes are 64QAM in the second CQI table are a CQI number 10, a CQI number 12, and a CQI number 14, or a CQI number 11, a CQI number 13, and a CQI number 15 in the second CQI table; or
  the some entries whose modulation schemes are 64QAM in the second CQI table are a CQI number 10, a CQI number 11, a CQI number 12, a CQI number 13, and a CQI number 15, or a CQI number 10, a CQI number 11, a CQI number 14, and a CQI number 15, or a CQI number 11, a CQI number 12, a CQI number 13, a CQI number 14, and a CQI number 15, or a CQI number 10, a CQI number 11, a CQI number 12, a CQI number 14, and a CQI number 15 in the second CQI table; or
  the some entries whose modulation schemes are 64QAM in the second CQI table are a CQI number 10, a CQI number 11, a CQI number 12, a CQI number 13, and a CQI number 14, or a CQI number 10, a CQI number 11, a CQI number 12, and a CQI number 13, or a CQI number 10, a CQI number 11, and a CQI number 12, or a CQI number 10 and a CQI number 11 in the second CQI table.

According to a seventh aspect, a communications apparatus is provided. The communications apparatus is, for example, a network device. The communications apparatus has functions of implementing the network device in the method designs. These functions may be implemented by hardware, or may be implemented by hardware by executing corresponding software. The hardware or the software includes one or more units corresponding to the functions.

In a possible design, a specific structure of the communications apparatus may include a processor and a transceiver. The processor and the transceiver may perform corresponding functions in the method provided in any possible design in the first aspect, the fourth aspect, or the sixth aspect.

In a possible design, a specific structure of the communications apparatus may include a processing module and a transceiver module. The processing module and the transceiver module may perform corresponding functions in the method provided in any possible design in the first aspect, the fourth aspect, or the sixth aspect.

According to an eighth aspect, a communications apparatus is provided. The communications apparatus is, for example, a terminal device. The communications apparatus has functions of implementing the terminal device in the method designs. These functions may be implemented by hardware, or may be implemented by hardware by executing corresponding software. The hardware or the software includes one or more units corresponding to the functions.

In a possible design, a specific structure of the communications apparatus may include a processor and a transceiver. The processor and the transceiver may perform corresponding functions in the method provided in any possible design in the second aspect, the third aspect, or the fifth aspect.

In a possible design, a specific structure of the communications apparatus may include a processing module and a transceiver module. The processing module and the transceiver module may perform corresponding functions in the method provided in any possible design in the second aspect, the third aspect, or the fifth aspect.

According to a ninth aspect, a communications apparatus is provided. The communications apparatus may be the network device in the foregoing method designs, or may be a chip disposed in the network device. The communications apparatus includes: a memory, configured to store computer executable program code; and a processor, where the processor is coupled to the memory. The program code stored in the memory includes an instruction, and when the processor executes the instruction, the communications apparatus is enabled to perform the method performed by the network device in any possible design in the first aspect, the fourth aspect, or the sixth aspect.

According to a tenth aspect, a communications apparatus is provided. The communications apparatus may be the terminal device in the foregoing method designs, or may be a chip disposed in the terminal device. The communications apparatus includes: a memory, configured to store computer executable program code; and a processor, where the processor is coupled to the memory. The program code stored in the memory includes an instruction, and when the processor executes the instruction, the communications apparatus is enabled to perform the method performed by the terminal device in any possible design in the second aspect, the third aspect, or the fifth aspect.

According to an eleventh aspect, a communications system is provided, and the communications system includes a network device and a terminal device. The network device is configured to: determine N MCS indexes in an MCS table, where a value that is obtained by multiplying a code rate by 1024 and that corresponds to an MCS index X in the N MCS indexes is less than or equal to a first threshold, where X is an integer greater than or equal to 0, N is a positive integer, and N is greater than or equal to X; and send at least one of the N MCS indexes. The terminal device is configured to receive downlink control information; and obtain the at least one MCS index in the MCS table based on the downlink control information, where the MCS table includes the N MCS indexes, the value that is obtained by multiplying the code rate by 1024 and that corresponds to the MCS index X in the N MCS indexes is less than or equal to the first threshold, where X is an integer greater than or equal to 0, N is a positive integer, and N is greater than or equal to X.

According to a twelfth aspect, a communications system is provided, and the communications system includes a network device and a terminal device. The terminal device is configured to: send a first CQI number, where the first CQI number is determined based on a first CQI table; and receive an MCS number in a first MCS table, where the first MCS table includes an entry excluded in the first CQI table, and at least one entry whose modulation scheme is 64QAM in the first CQI table. The network device is configured to: receive the first channel quality indicator CQI number in the first CQI table; and send a first MCS number, where the first MCS number is determined based on the first MCS table, and the first MCS table includes the entry excluded in the first CQI table, and the at least one entry whose modulation scheme is 64QAM in the first CQI table.

According to a thirteenth aspect, a communications system is provided, and the communications system includes a network device and a terminal device. The terminal device is configured to: learn of a first CQI number based on a first CQI table, and send the first CQI number, where the first CQI table includes an entry excluded in a second CQI table, and some entries whose modulation schemes are 64QAM in the second CQI table. The network device is configured to: receive the first CQI number in the first CQI table, and determine a modulation scheme, a code rate, and spectral efficiency that correspond to the first CQI number, where the first CQI table includes the entry excluded in the second CQI table, and the some entries whose modulation schemes are 64QAM in the second CQI table.

According to a fourteenth aspect, a computer readable storage medium is provided. The computer readable storage medium stores an instruction. When the instruction is run on a computer, the computer is enabled to perform the method in any possible design in the foregoing aspects.

According to a fifteenth aspect, a computer program product including an instruction is provided. The computer program product stores the instruction. When the computer program product is run on a computer, the computer is enabled to perform the method in any possible design in the foregoing aspects.

The MCS table provided in the embodiments of this application includes an MCS with a relatively low code rate, so that the MCS table may correspond to a lower BLER. In this case, the MCS table provided in the embodiments of this application can effectively adapt to a requirement of a URLLC service.

BRIEF DESCRIPTION OF DRAWINGS

FIG. 4-1 is a schematic diagram of an application manner of an MCS table according to an embodiment of this application;

FIG. 4-2 is a schematic diagram of an application manner of an MCS table according to an embodiment of this application;

DESCRIPTION OF EMBODIMENTS

Figure 1:
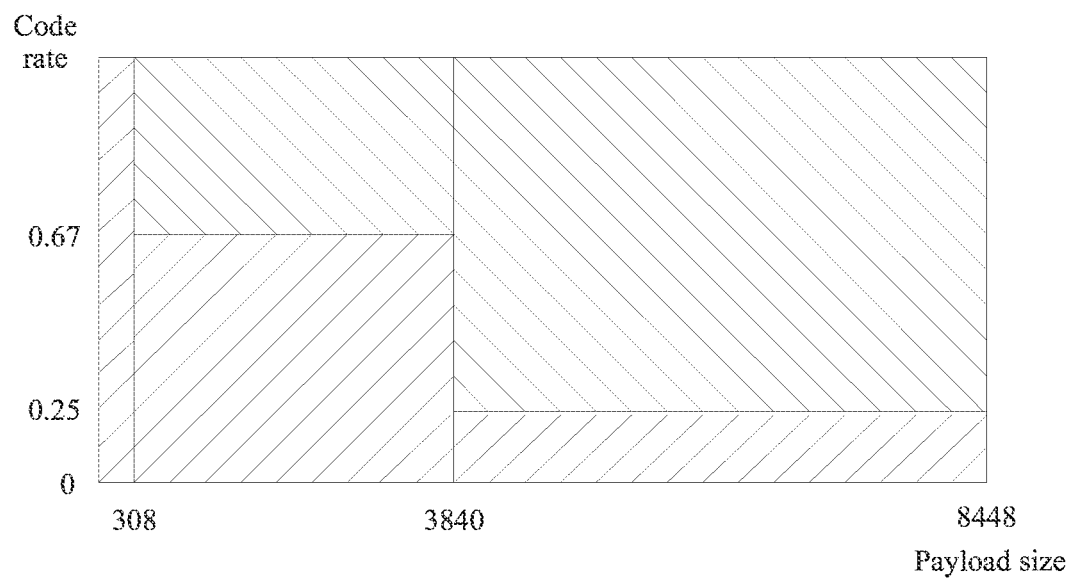
FIG. 1 is a schematic diagram of use scenario division of LDPC BG1 and BG2 in an eMBB service.

To make the objectives, technical solutions, and advantages of embodiments of this application clearer, the following further describes the embodiments of this application in detail with reference to the accompanying drawings.

In the following, some terms of the embodiments of this application are described, so as to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal device (remote terminal), an access terminal device, a user terminal device, a user agent, a user device, or the like. For example, the terminal device may include a mobile phone (or referred to as a "cellular" phone), a computer with a mobile terminal device, a portable, pocket-sized, handheld, computer built-in, or in-vehicle mobile apparatus, an intelligent wearable device, or the like. For example, the terminal device may be a device such as a personal communications service (PCS) phone, a cordless telephone set, a session initiation protocol (SIP) phone, a wireless local loop (WLL) station, or a personal digital assistant (PDA). Alternatively, the terminal device includes a limited device, for example, a device with relatively low power consumption, a device with a limited storage capability, or a device with a limited computing capability. For example, the terminal device includes an information sensing device such as a barcode device, radio frequency identification (RFID) device, a sensor, a global positioning system (GPS), or a laser scanner By way of example but not limitation, in the embodiments of this application, the terminal device may be alternatively a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but is configured to implement a powerful function through software support, data interaction, and cloud interaction. Generalized wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands, smart helmets, or smart jewelry for monitoring physical signs.

(2) A network device includes, for example, a base station (for example, an access point), and may be a device that is in an access network and that communicates with a wireless terminal device by using one or more cells over an air interface. The network device may be configured to: mutually convert a received over-the-air frame and an Internet protocol (IP) packet, and serve as a router between the terminal device and a remaining part of the access network, where the remaining part of the access network may include an IP network. The network device may further coordinate attribute management for the air interface. For example, the network device may include an evolved NodeB (NodeB or eNB or e-NodeB) in a long term evolution (LTE) system or an LTE-advanced (LTE-A) system, or may include a next generation NodeB (gNB) in a 5G NR system. This is not limited in the embodiments of this application.

In addition, in the embodiments of this application, the network device provides a service for a cell, and the terminal device communicates with the network device by using a transmission resource (for example, a frequency-domain resource or a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, or the like. These small cells are characterized by a small coverage area and a low transmit power, and are suitable for providing a high-rate data transmission service.

In addition, in the LTE system or the NR system, a plurality of intra-frequency cells may simultaneously work on a carrier. In some special scenarios, it may also be considered that a concept of the carrier is equivalent to that of the cell. For example, in a carrier aggregation (CA) scenario, both a carrier index of a secondary component carrier and a cell identity (Cell ID) of a secondary serving cell that works on the secondary component carrier are carried when the secondary component carrier is configured for UE. In this case, it may be considered that the concept of the carrier is equivalent to that of the cell. For example, that the UE accesses a carrier is equivalent to that the UE accesses a cell.

(3) A subcarrier spacing is a spacing value between central locations or peak locations of two adjacent subcarriers in frequency domain in an orthogonal frequency division multiplexing (OFDM) system. For example, a subcarrier spacing in a long term evolution (LTE) system is 15 kHz (kilohertz), and a subcarrier spacing in a 5G NR system may be 15 kHz, 30 kHz, 60 kHz, 120 kHz, or the like.

(4) A URLLC service is as follows: The URLLC service has a very high latency requirement. A latency of unidirectional transmission from a transmit end to a receive end needs to be within 0.5 ms, and reliability of transmission within 1 ms needs to reach 99.999%.

To meet the transmission latency requirement of the URLLC service, a smaller time scheduling unit may be used for data transmission on a wireless air interface. For example, a mini-slot or a slot corresponding to a larger subcarrier spacing is used as a smallest time scheduling unit. One mini-slot includes one or more time-domain symbols. The time-domain symbol herein may be an orthogonal frequency division multiplexing (OFDM) symbol. A slot corresponding to a subcarrier spacing of 15 kHz includes six or seven time-domain symbols, and corresponds to a time length of 0.5 ms. A slot corresponding to a subcarrier spacing of 60 kHz corresponds to a time length shortened to 0.125 ms.

A data packet of the URLLC service may be suddenly and randomly generated. There may be no generated data packet in a long time, or a plurality of data packets may be generated in a short time. In most cases, the data packet of the URLLC service is a small packet, for example, has 50 bytes. A characteristic of the data packet of the URLLC service affects a resource allocation manner of a communications system. The resource herein includes but is not limited to a time-domain symbol, a frequency-domain resource, a time-frequency resource, a codeword resource, a beam resource, and the like. Allocation of a system resource is usually completed by an access network device. The following uses the access network device as an example for description. If the access network device allocates a resource to the URLLC service in a resource reservation manner, the system resource is wasted when there is no URLLC service. In addition, a short-latency characteristic of the URLLC service requires that a data packet is transmitted in a very short time. Therefore, the access network device needs to reserve enough large bandwidth for the URLLC service, resulting in a great decrease in system resource utilization.

A relatively small time scheduling unit is usually used for data of the URLLC service, to meet a requirement on an ultra-low latency. For example, two time-domain symbols corresponding to a subcarrier spacing of 15 kHz is used; or a slot corresponding to a subcarrier spacing of 60 kHz is used, where the slot corresponding to a subcarrier spacing of 60 kHz corresponds to seven time-domain symbols, and a time length of 0.125 ms.

(5) A modulation and coding scheme table is as follows: In this specification, a modulation and coding scheme may be briefly referred to as an MCS. Therefore, in this specification, the modulation and coding scheme table may be briefly referred to as an MCS table. However, the modulation and coding scheme is not limited in this specification, and may be translated in another manner. The MCS table includes at least one of the following content: a modulation scheme, a code rate, spectral efficiency, and the like. One MCS table may include at least one type of modulation and coding scheme information, and each type of modulation and coding scheme information has a corresponding number (namely, a modulation and coding scheme number (index)), and corresponds to at least one of the following content: a modulation scheme, a code rate, and spectral efficiency. Similarly, because the modulation and coding scheme is briefly referred to as the MCS in this specification, the modulation and coding scheme information may also be briefly referred to as MCS information, and the modulation and coding scheme index may be briefly referred to as an MCS number.

For a URLLC service, a plurality of MCS tables may be supported, and each MCS table may correspond to one BLER or a plurality of BLERs.

For a relationship between values in the MCS table, refer to the following formula:

Spectral efficiency=code rate/1024×modulation order$Q_m$ (formula 1)

Code rate=amount of valid transmitted information/used data resource (formula 2)

(6) A channel quality indicator (CQI) table is as follows: The CQI table includes at least one of a modulation scheme, a code rate, spectral efficiency, and a BLER. One CQI table may include at least one type of CQI (or referred to as at least one CQI), and each type of CQI has a corresponding index (namely, a CQI index), and corresponds to at least one of the following content: a modulation scheme, a code rate, spectral efficiency, and a BLER.

It may be considered that the MCS table is obtained based on the CQI table. For example, a current CQI table includes 16 entries, that is, includes 16 CQI indexes from 0 to 15. The 16 entries may be directly placed in the MCS table as 16 entries included in the MCS table. In this case, the 16 entries become 16 MCSs in the MCS table. If the MCS table is indicated by using 5 bits, in the MCS table, two adjacent entries in the 16 entries may be further averaged to obtain 16 other entries. In this case, the MCS table may include 32 entries in total.

For example, Table 1 is a current CQI table.

TABLE 1

| CQI index | Modulation scheme | Code rate × 1024 | Spectral efficiency |
|---|---|---|---|
| 0 | Out of range (out of range) | | |
| 1 | Quadrature phase shift keying (quadrature phase shift keying, QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 quadrature amplitude modulation (quadrature amplitude modulation, QAM) | 378 | 1.4766 |

TABLE 1-continued

| CQI index | Modulation scheme | Code rate × 1024 | Spectral efficiency |
|---|---|---|---|
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

It can be learned that Table 1 includes 16 entries in total.

Table 2 is a current MCS table applicable to a physical downlink shared channel (PDSCH).

TABLE 2

| MCS Index $I_{MCS}$ | Modulation order (Order) $Q_m$ | Target (Target) code rate × [1024] R | Spectral efficiency (Spectral efficiency) |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved (reserved) | |
| 30 | 4 | reserved | |
| 31 | 6 | reserved | |

It can be understood that the MCS table shown in Table 2 includes the 16 entries in the CQI table shown in Table 1, and further includes the 16 other entries obtained by averaging two adjacent entries in the 16 entries.

A modulation order 1 corresponds to pi/2 binary phase shift keying (BPSK), a modulation order 2 corresponds to QPSK, a modulation order 4 corresponds to 16QAM, a modulation order 6 corresponds to 64QAM, and a modulation order 8 corresponds to 256QAM.

(7) A block error rate is briefly referred to as a BLER in this specification, but another translation manner or another name is not excluded. The BLER is a percentage of an error block to all sent blocks. For example, the BLER may be equal to one of {x×10e-1, x×10e-2, x×10e-3, x×10e-4, x×10e-5, x×10e-6, x×10e-7, x×10e-8, and x×10e-9}, or may be equal to another value. $10e-1=10^{-1}=0.1$, and the other values of the BLER are also similar. x is a positive number, for example, x=1 or 5, or may be equal to another value. To be specific, it can be understood that the BLER may be replaced with a correctness rate, which may be equal to one of $\{1-x \times 10e-1, 1-x \times 10e-2, 1-x \times 10e-3, 1-x \times 10e-4, 1-x \times 10e-5, 1-x \times 10e-6, 1-x \times 10e-7, 1-x \times 10e-8, \text{ or } 1-x \times 10e-9\}$.

(8) A channel coding technology is a common method for improving data transmission reliability in a communications system. Currently, a channel coding technology in a 5G eMBB scenario has been approximately standardized: Low-density parity-check code (LDPC) coding is used for a data channel, and polar coding is used for a control channel.

In the 5G eMBB scenario, the LDPC coding is used as a unique channel coding scheme for the data channel. A current standard provides two base matrices: a BG1 and a BG2. The BG2 is used for: all payload sizes when a code rate is less than 1/4; all code rates when a payload is less than 308; and a scenario in which a code rate is less than 2/3 when a payload is between 308 and 3840. In another case, the BG1 is usually used. FIG. 1 shows usage scenario division of an eMBB LDPC BG1 (also briefly referred to as the BG1) and an LDPC BG2 (also briefly referred to as the BG2). A horizontal axis represents a payload size, a vertical axis represents a code rate, a part marked with "/" represents the BG2, and a part marked with "\" represents the BG1.

Compared with the eMBB scenario, in a URLLC scenario, a data packet size is usually relatively small, and to pursue higher reliability, a relatively low code rate usually needs to be used. Therefore, the BG2 may be used for a data channel in the URLLC scenario. However, the embodiments of this application are not limited thereto.

(9) Channel state information (CSI) is as follows: Generally, the CSI is divided into periodic CSI (P-CSI), aperiodic CSI (A-CSI), and semi-persistent CSI (SPS-CSI). The periodic CSI means that a terminal device periodically sends the CSI to a network device. Sending of the aperiodic CSI means that the network device triggers sending the CSI each time by using downlink control information (DCI). Sending of the semi-persistent CSI means that the network device triggers, by using downlink control information, the terminal device to continuously send the CSI for a period of time. It can be learned from the sending mechanisms that for the aperiodic CSI, the network device can instruct, based on a requirement of the network device, the terminal device to send current CSI. Therefore, this is more flexible. However, each trigger depends on DCI sending. To control an amount of DCI and reduce a control channel resource occupied by the DCI, the semi-persistent CSI is introduced. Because the periodic CSI is configured by using higher layer signaling, resources occupied for DCI sending are reduced to a greatest extent. Therefore, all the three mechanisms are reserved. It should be noted that only the periodic CSI and the aperiodic CSI are supported in a 4th generation (4G) mobile communications system, the aperiodic CSI is necessarily sent on a physical uplink shared channel (PUSCH), and the periodic CSI is necessarily sent on a physical uplink control channel (PUCCH). In discussion of a current 5G NR system, the semi-persistent CSI is introduced, and it is also agreed that the aperiodic CSI can be sent on a PUCCH. The CSI includes one or more pieces of information such as a CQI, a precoding matrix indicator (PMI), a rank indicator (RI), a reference signal received power (RSRP), a channel state information-reference signal resource indicator (CRI), and an indication of the number of non-zero wideband amplitude coefficients (indicator of the number of non-zero wideband amplitude coefficients).

(10) Higher layer signaling may be signaling sent by a higher-layer protocol layer. The higher-layer protocol layer is at least one protocol layer above a physical layer. The higher-layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

Dynamic signaling may be signaling sent by the physical layer, for example, signaling or information sent by using DCI.

(11) The terms "system" and "network" may be used interchangeably in the embodiments of this application. "A plurality of" refers to two or more, and therefore, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless otherwise specified.

In the embodiments described in this application, when a table is described, "number" and "index" may be understood as a same concept, and both are "index" in English. For example, for an MCS table, two concepts: an MCS number and an MCS index, are interchangeable. For another example, for a CQI table, two concepts: a CQI number and a CQI index are interchangeable. For example, an entry in the MCS table corresponds to a modulation scheme, a code rate, and spectral efficiency that correspond to an MCS number in the MCS table. An entry in the CQI table corresponds to a modulation scheme, a code rate, and spectral efficiency that correspond to a CQI number in the CQI table.

In addition, unless otherwise stated, in the embodiments of this application, ordinal numbers such as "first" and "second" are intended to distinguish between a plurality of objects, and are not intended to limit an order, a time sequence, priorities, or importance of the plurality of objects.

The embodiments of this application are applicable to an LTE system or a 5G NR system, or are applicable to a next-generation mobile communications system or another similar communications system.

In addition, in the following description process, an example in which the technical solutions provided in the embodiments of this application are applied to a URLLC service is mainly used. This is not limited in actual application. For example, the technical solutions provided in the embodiments of this application may be alternatively applied to another service that has a requirement similar to that of the URLLC service, or may be applied to a service such as eMBB.

The following describes a technical background of the embodiments of this application.

In a 5G system, a URLLC service has a very high latency requirement. A latency of unidirectional transmission from a transmit end to a receive end needs to be within 0.5 millisecond (ms), and reliability of transmission within 1 ms needs to reach 99.999%.

A BLER corresponding to an MCS currently applied to an eMBB service is 10e-1. For the URLLC service having a short latency, to achieve higher reliability, a system is expected to support a BLER with a smaller value. In view of a relationship between a BLER and a code rate, to correspond to a lower BLER, a lower code rate is required, because a lower code rate leads to a lower BLER corresponding to the code rate.

The following describes a reason why the system needs to support a lower code rate to support a lower BLER. In a current communication condition, a lowest MCS that can be used for data transmission of a terminal device is only an MCS corresponding to an MCS index 0 in an existing MCS table, and a corresponding block error rate is 10e-1. Herein, uplink or downlink is not distinguished. If no other external condition changes, transmission with a lower block error rate can be supported only by reducing a modulation order or a code rate.

If the code rate is reduced, it means that less expected information is transmitted in a same system resource, and more information redundancy is introduced, to improve reliability. For example, it is assumed that A bits are originally transmitted in Z data resources, and a code rate is A/Z. On 3×Z data resources, the A bits are repeated for three times to form 3A bits for transmission. In this case, a code rate is A/3Z. Apparently, the latter code rate is lower, so that higher accuracy can be achieved.

If the modulation order is reduced, an objective of transmitting a small amount of expected information by using more data resources may also be achieved. However, because in an existing MCS table, a modulation order has reached 2-QPSK, and pi/2 BPSK is very close to QPSK in terms of performance, a lower modulation order cannot be used to improve reliability.

In conclusion, improving reliability by reducing the code rate is relatively proper. In view of this, the embodiments of this application provide an MCS corresponding to a lower code rate, so that the MCS can adapt to the requirement of the URLLC service.

Figure 2:
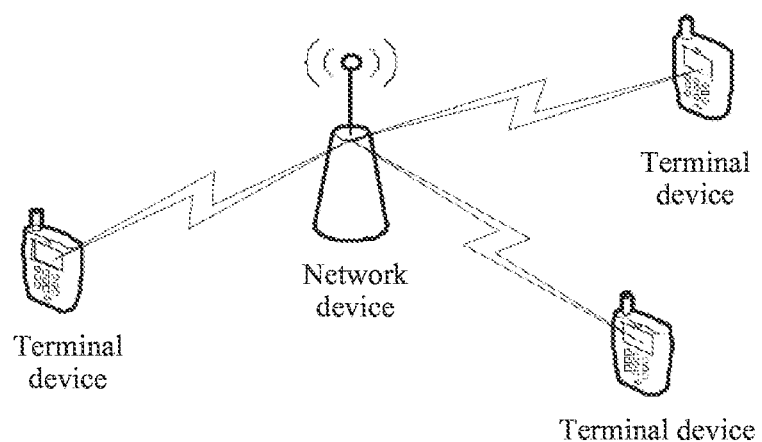
FIG. 2 is a schematic diagram of an application scenario according to an embodiment of this application.

FIG. 2 shows an application scenario according to an embodiment of this application. FIG. 2 includes a network device and at least one terminal device. The network device and the terminal device work in a 5G NR system, and the network device is, for example, a base station. The terminal device and the network device may communicate with each other by using the 5G NR system.

Figure 3:
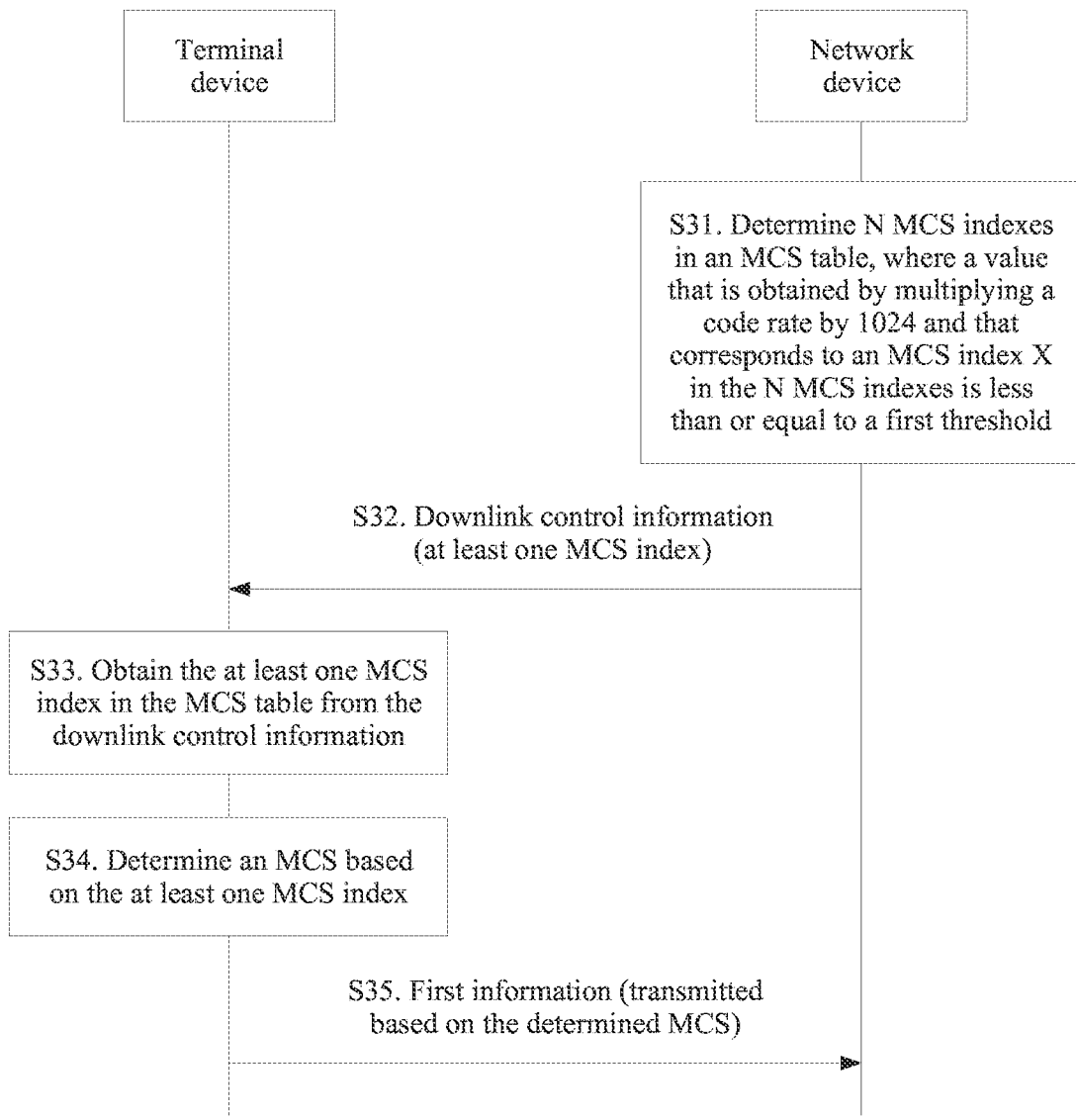
FIG. 3 is a flowchart of a communication method according to an embodiment of this application.

Referring to FIG. 3, an embodiment of this application provides a communication method. In the following description process, an example in which the method is applied to the application scenario shown in FIG. 2 is used. A procedure of the method is described as follows:

S31. A network device determines N MCS indexes in an MCS table, where a value that is obtained by multiplying a code rate by 1024 and that corresponds to an MCS index X in the N MCS indexes is less than or equal to a first threshold, where X is an integer greater than or equal to 0, N is a positive integer, and N≥X.

S32. If the network device sends at least one of the N MCS indexes to a terminal device, the terminal device receives the at least one of the N MCS indexes. An example in which the network device sends the at least one MCS index to the terminal device by using downlink control information is used in FIG. 3. In this case, the terminal device receives the downlink control information.

S33. The terminal device obtains the at least one MCS index in the MCS table from the downlink control information, where the MCS table includes the N MCS indexes, the value that is obtained by multiplying the code rate by 1024 and that corresponds to the MCS index X in the N MCS indexes is less than or equal to the first threshold, where X is an integer greater than or equal to 0, N is a positive integer, and N≥X.

S34. The terminal device determines an MCS based on the at least one MCS index.

S35. The terminal device transmits first information based on the determined MCS.

In this embodiment of this application, the numbers before the steps are merely an example, and are not a limitation on an actual execution sequence of the steps. In an application process, an execution sequence of each step may be changed based on different scenarios or requirements.

The terminal device obtains a CSI report by measuring a channel of a CSI reference resource. The terminal device sends CSI obtained by coding the CSI report to the network device, and the network device may receive the CSI from the terminal device.

S31 is an optional step, because the network device may alternatively send an MCS index to the terminal device when receiving no CSI from the terminal device.

In addition, S35 is also an optional step.

The downlink control information is, for example, DCI, or may be other downlink control information. In this specification, the DCI is used as an example. For example, the DCI includes an MCS field, and the MCS field may indicate the at least one MCS index.

The first information may be scheduled by using the DCI, or may be scheduled in another manner.

This embodiment of this application provides the MCS table, the MCS table includes the N MCS indexes, each MCS index corresponds to one MCS, and one MCS corresponds to at least one of the following content: a modulation scheme, a code rate, and spectral efficiency. In the N MCS indexes, the value that is obtained by multiplying the code rate by 1024 and that corresponds to the MCS index X is less than or equal to YY. To be specific, the MCS table provided in this embodiment of this application includes an MCS with a relatively low code rate, so that the MCS table may correspond to a lower BLER. In this case, the MCS table provided in this embodiment of this application can effectively adapt to a requirement of a URLLC service. Optionally, a value of X in the MCS index X is one of 0, 1, 2, 3, 4, 5, 6, 7, and 8, or may be a positive integer greater than or equal to 0.

In addition, the code rate corresponding to the MCS index X may not be infinitely small. Therefore, in addition to being less than or equal to the first threshold, the value that is obtained by multiplying the code rate by 1024 and that corresponds to the MCS index X may be further greater than or equal to a second threshold. In other words, second threshold code rate corresponding to the MCS index X×1024 first threshold. The second threshold is, for example, 5 or 8, or may be another value, and the first threshold is, for example, 119, 120, or 40, or may be another value. This is not limited in this embodiment of this application. In the following specification, the first threshold may be alternatively represented by YY, and the second threshold may be alternatively represented by YYY.

For example, the MCS index X is an index with a relatively small index value in the MCS table. Generally, if an MCS index is smaller, a corresponding coding scheme may be BPSK or QPSK. Therefore, optionally, a coding scheme corresponding to the MCS index X may be BPSK or QPSK.

In this embodiment of this application, that the first threshold is 119 is used as an example, and the value that is obtained by multiplying the code rate by 1024 and that corresponds to the MCS index X in the MCS table may include at least one of the following values: 5, 8, 10, 13, 14, 15, 16, 17, 18, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, and 119.

In a current MCS table, a value obtained by multiplying a lowest code rate by 1024 is 120. It may be learned that a value obtained by multiplying a code rate supported in the MCS table provided in this embodiment of this application by 1024 may be less than the value obtained by multiplying the lowest code rate in the current MCS table by 1024. In other words, the code rate supported in the MCS table provided in this embodiment of this application is less than the lowest code rate in the current MCS table. In this way, the MCS table may correspond to a lower BLER, thereby effectively adapting to the requirement of the URLLC service. In addition, in the MCS table provided in this embodiment of this application, a code rate corresponding to an MCS index with a smallest value is less than a code rate corresponding to an MCS index with a smallest value in a CQI table. Herein, the CQI table is a currently existing CQI table. For example, referring to Table 1, in the current CQI table, the code rate corresponding to the MCS index with the smallest value is 78. In this case, in the MCS table provided in this embodiment of this application, the code rate corresponding to the MCS index with the smallest value is less than 78. In other words, the MCS table provided in this embodiment of this application can support a lower code rate.

In this embodiment of this application, the provided MCS table may correspond to at least two of the following coding schemes: an LDPC BG1, an LDPC BG2, and polar, and certainly may further correspond to another coding scheme. For example, the MCS table corresponds to the LDPC BG2 and the polar. In this case, in the MCS table, a quantity of MCS indexes corresponding to the polar is less than a quantity of MCS indexes corresponding to the LDPC BG2. To be specific, in the MCS table, a larger quantity of MCS indexes correspond to relatively high code rates, so that the MCS table provided in this embodiment of this application can be better compatible with an existing MCS table.

If a code rate corresponding to an MCS index is less than F, a coding scheme corresponding to the MCS index may be the polar or the BG2. F is, for example, greater than or equal to 0.25, or it is understood that F belongs to a first set, and a smallest value included in the first set is 0.25.

A newly introduced MCS in the MCS table provided in this embodiment of this application may be considered as a new entry first introduced in a CQI table, and the new entry introduced in the CQI table may be directly added to the MCS table. In this case, in entries newly added to the MCS table, an average value such as an arithmetic average value of two adjacent entries may be calculated. In this manner, a new entry may be obtained. The two adjacent entries herein are two entries with adjacent MCS indexes. In this case, when the average value of the two adjacent entries is calculated, only one entry may be obtained, or two entries may be obtained. For example, two entries are obtained by calculating the average value of the two adjacent entries, and MCS indexes of the two entries are respectively an MCS index XX and an MCS index XX+1. In this case, modulation schemes corresponding to the MCS index XX and the MCS index XX+1 are different. For example, the MCS index XX corresponds to QPSK, and the MCS index XX+1 corresponds to 16QAM. However, spectral efficiency corresponding to the MCS index XX and the MCS index XX+1 may be the same. In this case, coding schemes corresponding to the MCS index XX and the MCS index XX+1 may be different. For example, the MCS index XX corresponds to the BG2 and the MCS index XX+1 corresponds to the polar, or the MCS index XX+1 corresponds to the BG2 and the MCS index XX corresponds to the polar.

In addition, according to calculation in an existing protocol, a code rate fluctuation causes a severe resource allocation change. In this case, if the terminal device can accurately report a value of a code rate or spectral efficiency corresponding to a signal-to-noise ratio (SNR), a system can save many resources, thereby improving system utilization. According to evaluation, specially, if a time-domain resource for data transmission is in a length of two symbols, a required frequency-domain resource is at least 212 resource blocks (RB) when a code rate multiplied by 1024 is 30, a required frequency-domain resource is 192 RBs when a code rate multiplied by 1024 is 34, a required frequency-domain resource is 172 RBs when a code rate multiplied by 1024 is 37, and a required frequency-domain resource is 152 RBs when a code rate multiplied by 1024 is 42. Therefore, different from an original table, in a CQI table or an MCS table in URLLC, if a difference between code rates of two adjacent entries can be less than or equal to a third threshold, system resource utilization can be improved. Therefore, in the MCS table provided in this embodiment of this application, modulation schemes corresponding to the MCS index X and an MCS index X+1 are the same, and a value obtained by multiplying a difference between a code rate corresponding to the MCS index X and a code rate corresponding to the MCS index X+1 by 1024 may be less than or equal to the third threshold.

In addition to a condition related to the third threshold, in this embodiment of this application, a modulation scheme corresponding to the MCS index X is the same as a modulation scheme corresponding to the MCS index X+1, and the value obtained by multiplying the difference between the code rate corresponding to the MCS index X and the code rate corresponding to the MCS index X+1 by 1024 may be further greater than or equal to a fourth threshold. A value of the fourth threshold is related to channel estimation precision of the terminal device. If an SNR corresponding to 10 is 0.5 dB, minimum channel estimation precision of the terminal device is also 0.5 dB. To be specific, a code rate difference that is less than a code rate difference corresponding to the minimum channel estimation precision of 0.5 dB cannot be recognized by the terminal device. Therefore, in the MCS table provided in this embodiment of this application, a value obtained by multiplying a difference between code rates of two adjacent entries by 1024 is greater than or equal to the fourth threshold. For the two conditions related to the third threshold and the fourth threshold, at least one of the conditions may exist in the MCS table provided in this embodiment of this application. For example, when the value obtained by multiplying the difference between the code rates of the two adjacent entries by 1024 is greater than or equal to the fourth threshold, if it is considered that a large difference is not conducive to resource allocation, the value obtained by multiplying the difference between the code rates of the two adjacent entries by 1024 may also be less than or equal to the third threshold.

The third threshold is, for example, 1, 2, 3, 4, 5, 11, 12, or 13, or may be another value. The fourth threshold is, for example, 1, 2, 3, 4, 8, 9, 10, or 11, or may be another value.

Values of the third threshold and the fourth threshold are not limited in this embodiment of this application.

The following describes, by using some examples, the MCS table provided in this embodiment of this application.

1. Example A

In the example A, a new MCS table is obtained by modifying an existing MCS table or CQI table. In the example A, coding schemes corresponding to all MCS indexes included in the MCS table may be the BG2, but are not limited thereto, for example, may alternatively correspond to the polar. Alternatively, coding schemes corresponding to different MCS indexes included in the MCS table may be different.

In the example A, the MCS table may support a BLER lower than existing 10e-1. The following provides descriptions by using different BLERs.

a. For example, the MCS table supports a BLER of 10e-5.

Generally, the MCS table may have 5 bits and the MCS table may include 32 entries, or the MCS table may have 4 bits and the MCS table may include 16 entries. In the following description process, that a 5-bit CQI Table and a 4-bit CQI Table are separately used as examples.

1.5-Bit CQI Table

In a case that the MCS table is corresponding to 5 bits, G entries may be removed from an original MCS table (as shown in Table 2), and then G entries are newly added. The newly added G entries correspond to relatively low code rates, where G is a positive integer. Considering that this embodiment of this application is intended to provide an MCS that can support a lower code rate, and it may be learned from Table 2 that a larger MCS index leads to a higher corresponding code rate, the G entries removed from the original MCS table may be G entries with largest MCS indexes. For example, G=4. In this case, an entry corresponding to an MCS index 28, an entry corresponding to an MCS index 29, an entry corresponding to an MCS index 30, and an entry corresponding to an MCS index 31 may be removed from Table 2. Alternatively, because all the entries corresponding to the MCS indexes 29, 30, and 31 are reserved entries, G valid entries may be considered to be removed. For example, an entry corresponding to an MCS index 25, an entry corresponding to an MCS index 26, an entry corresponding to an MCS index 27, and the entry corresponding to the MCS index 28 may be removed. This is equivalent to removing entries with relatively high code rates from the original MCS table, so that a new MCS table more effectively supports a low code rate. Alternatively, the G entries removed from the original MCS table may be G randomly selected entries, and MCS indexes corresponding to the G removed entries may be consecutive or nonconsecutive. Alternatively, last entries corresponding to 64QAM in the original MCS table may be selected to be removed. This is not specifically limited.

In a first example, when G=4, for an MCS table, refer to Table A1.

TABLE A1

| Old MCS index $I_{MCS}$ | New MCS index $I_{MCS}$ | Modulation order $Q_m$ | Target code rate × [1024] R | Spectral efficiency |
|---|---|---|---|---|
|  | 0 | 2 | 54 | 0.1055 |
|  | 1 | 2 | 66 | 0.1289 |
|  | 2 | 2 | 78 | 0.1523 |
|  | 3 | 2 | 99 | 0.1934 |
| 0 | 4 | 2 | 120 | 0.2344 |

TABLE A1-continued

| Old MCS index $I_{MCS}$ | New MCS index $I_{MCS}$ | Modulation order $Q_m$ | Target code rate × [1024] R | Spectral efficiency |
|---|---|---|---|---|
| 1 | 5 | 2 | 157 | 0.3066 |
| 2 | 6 | 2 | 193 | 0.3770 |
| 3 | 7 | 2 | 251 | 0.4902 |
| 4 | 8 | 2 | 308 | 0.6016 |
| 5 | 9 | 2 | 379 | 0.7402 |
| 6 | 10 | 2 | 449 | 0.8770 |
| 7 | 11 | 2 | 526 | 1.0273 |
| 8 | 12 | 2 | 602 | 1.1758 |
| 9 | 13 | 2 | 679 | 1.3262 |
| 10 | 14 | 4 | 340 | 1.3281 |
| 11 | 15 | 4 | 378 | 1.4766 |
| 12 | 16 | 4 | 434 | 1.6953 |
| 13 | 17 | 4 | 490 | 1.9141 |
| 14 | 18 | 4 | 553 | 2.1602 |
| 15 | 19 | 4 | 616 | 2.4063 |
| 16 | 20 | 4 | 658 | 2.5703 |
| 17 | 21 | 6 | 438 | 2.5664 |
| 18 | 22 | 6 | 466 | 2.7305 |
| 19 | 23 | 6 | 517 | 3.0293 |
| 20 | 24 | 6 | 567 | 3.3223 |
| 21 | 25 | 6 | 616 | 3.6094 |
| 22 | 26 | 6 | 666 | 3.9023 |
| 23 | 27 | 6 | 719 | 4.2129 |
| 24 | 28 | 6 | 772 | 4.5234 |
| 25 | 29 | 6 | 822 | 4.8164 |
| 26 | 30 | 6 | 873 | 5.1152 |
| 27 | 31 | 6 | 910 | 5.3320 |
| 28 |  | 6 | 948 | 5.5547 |
| 29 |  | 2 | reserved |  |
| 30 |  | 4 | reserved |  |
| 31 |  | 6 | reserved |  |

One row in Table A1 may be understood as one MCS. It may be learned that one MCS corresponds to one MCS index and a series of parameters. In addition, in the MCS table, parameters corresponding to one MCS may include other parameters in addition to the several parameters shown in Table A1. However, the other parameters are not significantly associated with the solutions of this application, and therefore are not listed one by one.

For a correspondence between a modulation scheme number and a specific modulation scheme, refer to the foregoing description. Subsequent tables are similar, and details are not described again.

In Table A1, the old MCS index represents an index of a corresponding entry in the original MCS table, and the new MCS index represents an index of a corresponding entry in the new MCS table. It can be learned that, in Table A1, there is no corresponding new MCS index since an old MCS index 28. This indicates that Table A1 uses an example in which an entry corresponding to an MCS index 28, an entry corresponding to an MCS index 29, an entry corresponding to an MCS index 30, and an entry corresponding to an MCS index 31 are removed from the original MCS table. Four entries: a new MCS index 0 to a new MCS index 3, are newly added. This may be understood as follows: The new MCS index 0 and the new MCS index 2 are newly added, an entry corresponding to the new MCS index 1 is obtained by averaging an entry corresponding to the new MCS index 0 and an entry corresponding to the new MCS index 2, and an entry corresponding to the new MCS index 3 is obtained by averaging the entry corresponding to the new MCS index 2 and an entry corresponding to the new MCS index 4. For example, a value that is obtained by multiplying a code rate by 1024 and that corresponds to the new MCS index 1 is equal to 66, and this is obtained by averaging a value 54 that is obtained by multiplying a code rate by 1024 and that corresponds to the new MCS index 0 and a value 78 that is obtained by multiplying a code rate by 1024 and that corresponds to the new MCS index 2, in other words, 66=(54+78)/2. Spectral efficiency corresponding to the new MCS index 1 is 0.1289, and this is obtained by averaging spectral efficiency 0.1055 corresponding to the new MCS index 0 and spectral efficiency 0.1523 corresponding to the new MCS index 2, in other words, 0.1289=(0.1055+0.1523)/2. A method for obtaining the entry corresponding to the new MCS index 3 is similar to the method for obtaining the entry corresponding to the new MCS index 1, and details are not described again.

In the newly added entries in Table A1, a correspondence between an MCS index and each parameter is merely an example. For example, a modulation order corresponding to the new MCS index 0 may not be 2, or the corresponding value obtained by multiplying the code rate by 1024 may not be 54. This is not specifically limited, provided that a code rate corresponding to at least one of the newly added entries is less than a lowest code rate in the original MCS table.

For example, if YY is 120, the MCS index X may include at least one of the new MCS index 0 to the new MCS index 3 in Table A1.

In a second example, when G=6, for an MCS table, refer to Table A2.

TABLE A2

| Old MCS index $I_{MCS}$ | New MCS index $I_{MCS}$ | Modulation Order $Q_m$ | Target code rate × [1024] R | Spectral efficiency |
|---|---|---|---|---|
| | 0 | 2 | 16 | 0.0313 |
| | 1 | 2 | 35 | 0.0684 |
| | 2 | 2 | 54 | 0.1055 |
| | 3 | 2 | 66 | 0.1289 |
| | 4 | 2 | 78 | 0.1523 |
| | 5 | 2 | 99 | 0.1934 |
| 0 | 6 | 2 | 120 | 0.2344 |
| 1 | 7 | 2 | 157 | 0.3066 |
| 2 | 8 | 2 | 193 | 0.3770 |
| 3 | 9 | 2 | 251 | 0.4902 |
| 4 | 10 | 2 | 308 | 0.6016 |
| 5 | 11 | 2 | 379 | 0.7402 |
| 6 | 12 | 2 | 449 | 0.8770 |
| 7 | 13 | 2 | 526 | 1.0273 |
| 8 | 14 | 2 | 602 | 1.1758 |
| 9 | 15 | 2 | 679 | 1.3262 |
| 10 | 16 | 4 | 340 | 1.3281 |
| 11 | 17 | 4 | 378 | 1.4766 |
| 12 | 18 | 4 | 434 | 1.6953 |
| 13 | 19 | 4 | 490 | 1.9141 |
| 14 | 20 | 4 | 553 | 2.1602 |
| 15 | 21 | 4 | 616 | 2.4063 |
| 16 | 22 | 4 | 658 | 2.5703 |
| 17 | 23 | 6 | 438 | 2.5664 |
| 18 | 24 | 6 | 466 | 2.7305 |

TABLE A2-continued

| Old MCS index $I_{MCS}$ | New MCS index $I_{MCS}$ | Modulation Order $Q_m$ | Target code rate × [1024] R | Spectral efficiency |
|---|---|---|---|---|
| 19 | 25 | 6 | 517 | 3.0293 |
| 20 | 26 | 6 | 567 | 3.3223 |
| 21 | 27 | 6 | 616 | 3.6094 |
| 22 | 28 | 6 | 666 | 3.9023 |
| 23 | 29 | 6 | 719 | 4.2129 |
| 24 | 30 | 6 | 772 | 4.5234 |
| 25 | 31 | 6 | 822 | 4.8164 |
| 26 | | 6 | 873 | 5.1152 |
| 27 | | 6 | 910 | 5.3320 |
| 28 | | 6 | 948 | 5.5547 |
| 29 | | 2 | reserved | |
| 30 | | 4 | reserved | |
| 31 | | 6 | reserved | |

A question similar to that in Table A1 is no longer described. For details, refer to the description of Table A1.

It can be learned that, in Table A2, there is no corresponding new MCS index since an old MCS index 26. This indicates that Table A2 uses an example in which an entry corresponding to an MCS index 26, an entry corresponding to an MCS index 27, an entry corresponding to an MCS index 28, an entry corresponding to an MCS index 29, an entry corresponding to an MCS index 30, and an entry corresponding to an MCS index 31 are removed from the original MCS table. Six entries: a new MCS index 0 to a new MCS index 5, are newly added. This may be understood as follows: The new MCS index 0, the new MCS index 2, and the new MCS index 4 are newly added, an entry corresponding to the new MCS index 1 is obtained by averaging an entry corresponding to the new MCS index 0 and an entry corresponding to the new MCS index 2, an entry corresponding to the new MCS index 3 is obtained by averaging the entry corresponding to the new MCS index 2 and an entry corresponding to the new MCS index 4, and an entry corresponding to the new MCS index 5 is obtained by averaging the entry corresponding to the new MCS index 4 and an entry corresponding to the new MCS index 6. For a specific manner of obtaining a new entry through averaging, refer to the description of Table A1.

For example, if YY is 120, the MCS index X may include at least one of the new MCS index 0 to the new MCS index 5 in Table A2.

In the newly added entries in Table A2, a correspondence between an MCS index and each parameter is merely an example. For example, a modulation order corresponding to the new MCS index 0 may not be 2, or a corresponding value obtained by multiplying a code rate by 1024 may not be 16. This is not specifically limited, provided that a code rate corresponding to at least one of the newly added entries is less than a lowest code rate in the original MCS table.

In an eighth example, for an MCS table, refer to Table A8.

TABLE A8

| Old MCS index | Possibility 1 | Possibility 2 | Possibility 3 | Possibility 4 | Possibility 5 | Modulation order | Code rate × [1024] | Spectral efficiency | Modulation Order | Code rate × [1024] |
|---|---|---|---|---|---|---|---|---|---|---|
| | 0 | 0 | | | | 2 | 30 | 0.0586 | 1 | 60 |
| | 1 | 1 | 0 | 0 | 0 | 2 | 35 | 0.0684 | 1 | 70 |
| | 2 | 2 | 1 | 1 | | 2 | 46 | 0.0898 | 1 | 92 |
| | 3 | 3 | 2 | 2 | 1 | 2 | 68 | 0.1328 | 1 | 136 |
| | 4 | | 3 | | | 2 | 78 | 0.1523 | 1 | 156 |
| | 5 | 4 | 4 | 3 | 2 | 2 | 90 | 0.1758 | | |
| 0 | 6 | 5 | 5 | 4 | 3 | 2 | 120 | 0.2344 | | |
| 1 | 7 | 6 | 6 | 5 | 4 | 2 | 157 | 0.3066 | | |
| 2 | 8 | 7 | 7 | 6 | 5 | 2 | 193 | 0.3770 | | |

TABLE A8-continued

| Old MCS index | Possibility 1 | Possibility 2 | Possibility 3 | Possibility 4 | Possibility 5 | Modulation order | Code rate × [1024] | Spectral efficiency | Modulation Order | Code rate × [1024] |
|---|---|---|---|---|---|---|---|---|---|---|
| 3 | 9 | 8 | 8 | 7 | 6 | 2 | 251 | 0.4902 | | |
| 4 | 10 | 9 | 9 | 8 | 7 | 2 | 308 | 0.6016 | | |
| 5 | 11 | 10 | 10 | 9 | 8 | 2 | 379 | 0.7402 | | |
| 6 | 12 | 11 | 11 | 10 | 9 | 2 | 449 | 0.8770 | | |
| 7 | 13 | 12 | 12 | 11 | 10 | 2 | 526 | 1.0273 | | |
| 8 | 14 | 13 | 13 | 12 | 11 | 2 | 602 | 1.1758 | | |
| 9 | 15 | 14 | 14 | 13 | 12 | 2 | 679 | 1.3262 | | |
| 10 | 16 | 15 | 15 | 14 | 13 | 4 | 340 | 1.3281 | | |
| 11 | 17 | 16 | 16 | 15 | 14 | 4 | 378 | 1.4766 | | |
| 12 | 18 | 17 | 17 | 16 | 15 | 4 | 434 | 1.6953 | | |
| 13 | 19 | 18 | 18 | 17 | 16 | 4 | 490 | 1.9141 | | |
| 14 | 20 | 19 | 19 | 18 | 17 | 4 | 553 | 2.1602 | | |
| 15 | 21 | 20 | 20 | 19 | 18 | 4 | 616 | 2.4003 | | |
| 16 | 22 | 21 | 21 | 20 | 19 | 4 | 658 | 2.5703 | | |
| 17 | 23 | 22 | 22 | 21 | 20 | 6 | 438 | 2.5664 | | |
| 18 | 24 | 23 | 23 | 22 | 21 | 6 | 466 | 2.7305 | | |
| 19 | 25 | 24 | 24 | 23 | 22 | 6 | 517 | 3.0293 | | |
| 20 | 26 | 25 | 25 | 24 | 23 | 6 | 567 | 3.3223 | | |
| 21 | 27 | 26 | 26 | 25 | 24 | 6 | 616 | 3.6094 | | |
| 22 | 28 | 27 | 27 | 26 | 25 | 6 | 666 | 3.9023 | | |
| 23 | 29 | 28 | 28 | 27 | 26 | 6 | 719 | 4.2129 | | |
| 24 | 30 | 29 | 29 | 28 | 27 | 6 | 772 | 4.5234 | | |
| 25 | 31 | 30 | 30 | 29 | 28 | 6 | 822 | 4.8164 | | |
| 26 | | 31 | 31 | 30 | 29 | 6 | 873 | 5.1152 | | |
| 27 | | | | 31 | 30 | 6 | 910 | 5.3320 | | |
| 28 | | | | | 31 | 6 | 948 | 5.5547 | | |
| 29 | | | | | | 2 | reserved | | | |
| 30 | | | | | | 4 | reserved | | | |
| 31 | | | | | | 6 | reserved | | | |

A question similar to that in Table A1 is no longer described. For details, refer to the description of Table A1.

In Table A8, a value corresponding to each possibility is an MCS index. Similar to Table A4, Table A8 may actually include a plurality of MCS tables, and each possibility may belong to an independent MCS table. In Table A8, all entries corresponding to MCS indexes that have no correspondence with an old MCS index are newly added.

Using an MCS table corresponding to a possibility 1 as an example, it may be learned that, in Table A8, for the possibility 1, there is no corresponding new MCS index since an old MCS index 26. This indicates that Table A8 uses an example in which an entry corresponding to an MCS index 26, an entry corresponding to an MCS index 27, an entry corresponding to an MCS index 28, an entry corresponding to an MCS index 29, an entry corresponding to an MCS index 30, and an entry corresponding to an MCS index 31 are removed from the original MCS table. Six entries: a new MCS index 0 to a new MCS index 5, are newly added.

For example, if YY is 120, for the possibility 1, the MCS index X may include at least one of the new MCS index 0 to the new MCS index 5 in Table A8.

In the newly added entries in Table A8, a correspondence between an MCS index and each parameter is merely an example. For example, for the possibility 1, a modulation order corresponding to the new MCS index 0 may not be 2, or a corresponding value obtained by multiplying a code rate by 1024 may not be 8. This is not specifically limited, provided that a code rate corresponding to at least one of the newly added entries is less than a lowest code rate in the original MCS table.

In a ninth example, for an MCS table, refer to Table A9.

TABLE A9

| Old MCS index | Possibility 2 | Possibility 3 | Possibility 4 | Possibility 5 | Modulation Order | Code rate × [1024] | Spectral efficiency | Modulation Order | Code rate × [1024] |
|---|---|---|---|---|---|---|---|---|---|
| | | 0 | 0 | | 2 | 30 | 0.0586 | 1 | 60 |
| | | 1 | | 0 | 0 | 2 | 40 | 0.0781 | 1 | 80 |
| | | 2 | 1 | 1 | | 2 | 49 | 0.0957 | 1 | 98 |
| | | 3 | 2 | 2 | 1 | 2 | 70 | 0.1367 | | |
| | | 4 | 3 | 3 | 2 | 2 | 95 | 0.1855 | | |
| 0 | | 5 | 4 | 4 | 3 | 2 | 120 | 0.2344 | | |
| 1 | | 6 | 5 | 5 | 4 | 2 | 157 | 0.3066 | | |
| 2 | | 7 | 6 | 6 | 5 | 2 | 193 | 0.3770 | | |
| 3 | | 8 | 7 | 7 | 6 | 2 | 251 | 0.4902 | | |
| 4 | | 9 | 8 | 8 | 7 | 2 | 308 | 0.6016 | | |
| 5 | | 10 | 9 | 9 | 8 | 2 | 379 | 0.7402 | | |
| 6 | | 11 | 10 | 10 | 9 | 2 | 449 | 0.8770 | | |
| 7 | | 12 | 11 | 11 | 10 | 2 | 526 | 1.0273 | | |
| 8 | | 13 | 12 | 12 | 11 | 2 | 602 | 1.1758 | | |
| 9 | | 14 | 13 | 13 | 12 | 2 | 679 | 1.3262 | | |
| 10 | | 15 | 14 | 14 | 13 | 4 | 340 | 1.3281 | | |
| 11 | | 16 | 15 | 15 | 14 | 4 | 378 | 1.4766 | | |

TABLE A9-continued

| Old MCS index | Possibility 2 | Possibility 3 | Possibility 4 | Possibility 5 | Modulation Order | Code rate × [1024] | Spectral efficiency | Modulation Order | Code rate × [1024] |
|---|---|---|---|---|---|---|---|---|---|
| 12 | 17 | 16 | 16 | 15 | 4 | 434 | 1.6953 | | |
| 13 | 18 | 17 | 17 | 16 | 4 | 490 | 1.9141 | | |
| 14 | 19 | 18 | 18 | 17 | 4 | 553 | 2.1602 | | |
| 15 | 20 | 19 | 19 | 18 | 4 | 616 | 2.4063 | | |
| 16 | 21 | 20 | 20 | 19 | 4 | 658 | 2.5703 | | |
| 17 | 22 | 21 | 21 | 20 | 6 | 438 | 2.5664 | | |
| 18 | 23 | 22 | 22 | 21 | 6 | 466 | 2.7305 | | |
| 19 | 24 | 23 | 23 | 22 | 6 | 517 | 3.0293 | | |
| 20 | 25 | 24 | 24 | 23 | 6 | 567 | 3.3223 | | |
| 21 | 26 | 25 | 25 | 24 | 6 | 616 | 3.6094 | | |
| 22 | 27 | 26 | 26 | 25 | 6 | 666 | 3.9023 | | |
| 23 | 28 | 27 | 27 | 26 | 6 | 719 | 4.2129 | | |
| 24 | 29 | 28 | 28 | 27 | 6 | 772 | 4.5234 | | |
| 25 | 30 | 29 | 29 | 28 | 6 | 822 | 4.8164 | | |
| 26 | 31 | 30 | 30 | 29 | 6 | 873 | 5.1152 | | |
| 27 | | 31 | 31 | 30 | 6 | 910 | 5.3320 | | |
| 28 | | | | 31 | 6 | 948 | 5.5547 | | |
| 29 | | | | | 2 | reserved | | | |
| 30 | | | | | 4 | reserved | | | |
| 31 | | | | | 6 | reserved | | | |

A question similar to that in Table A1 is no longer described. For details, refer to the description of Table A1.

In Table A9, a value corresponding to each possibility is an MCS index. Similar to Table A4, Table A9 may actually include a plurality of MCS tables, and each possibility may belong to an independent MCS table. In Table A9, all entries corresponding to MCS indexes that have no correspondence with an old MCS index are newly added.

Using an MCS table corresponding to a possibility 1 as an example, it may be learned that, in Table A9, for the possibility 1, there is no corresponding new MCS index since an old MCS index 28. This indicates that Table A9 uses an example in which an entry corresponding to an MCS index 28, an entry corresponding to an MCS index 29, an entry corresponding to an MCS index 30, and an entry corresponding to an MCS index 31 are removed from the original MCS table. Four entries: a new MCS index 0 to a new MCS index 3, are newly added.

For example, if YY is 120, for the possibility 1, the MCS index X may include at least one of the new MCS index 0 to the new MCS index 4 in Table A9.

In the newly added entries in Table A9, a correspondence between an MCS index and each parameter is merely an example. For example, for the possibility 1, a modulation order corresponding to the new MCS index 0 may not be 2, or a corresponding value obtained by multiplying a code rate by 1024 may not be 22. This is not specifically limited, provided that a code rate corresponding to at least one of the newly added entries is less than a lowest code rate in the original MCS table.

In another example, for an MCS table, refer to Table A9-1.

TABLE A9-1

| Old MCS index | Possibility 1 | Possibility 2 | Possibility 3 | Possibility 4 | Possibility 5 | Modulation Order | Code rate × [1024] | Spectral efficiency | Modulation Order | Code rate × [1024] |
|---|---|---|---|---|---|---|---|---|---|---|
| | | 0 | 0 | | 0 | 2 | 30 | 0.0586 | 1 | 28 |
| | | 1 | 1 | 0 | 0 | 2 | 35 | 0.0684 | 1 | 60 |
| | | 2 | 2 | 1 | 1 | 1 | 2 | 40 | 0.0781 | 1 | 72 |
| | | 3 | 3 | 2 | 2 | | 2 | 55 | 0.1074 | 1 | 90 |
| | | 4 | | 3 | | 2 | 2 | 70 | 0.1367 | 1 | 123 |
| | | 5 | 4 | 4 | 3 | | 2 | 90 | 0.1758 | | |
| 0 | | 6 | 5 | 5 | 4 | 3 | 2 | 120 | 0.2344 | | |
| 1 | | 7 | 6 | 6 | 5 | 4 | 2 | 157 | 0.3066 | | |
| 2 | | 8 | 7 | 7 | 6 | 5 | 2 | 193 | 0.3770 | | |
| 3 | | 9 | 8 | 8 | 7 | 6 | 2 | 251 | 0.4902 | | |
| 4 | | 10 | 9 | 9 | 8 | 7 | 2 | 308 | 0.6016 | | |
| 5 | | 11 | 10 | 10 | 9 | 8 | 2 | 379 | 0.7402 | | |
| 6 | | 12 | 11 | 11 | 10 | 9 | 2 | 449 | 0.8770 | | |
| 7 | | 13 | 12 | 12 | 11 | 10 | 2 | 526 | 1.0273 | | |
| 8 | | 14 | 13 | 13 | 12 | 11 | 2 | 602 | 1.1758 | | |
| 9 | | 15 | 14 | 14 | 13 | 12 | 2 | 679 | 1.3262 | | |
| 10 | | 16 | 15 | 15 | 14 | 13 | 4 | 340 | 1.3281 | | |
| 11 | | 17 | 16 | 16 | 15 | 14 | 4 | 378 | 1.4766 | | |
| 12 | | 18 | 17 | 17 | 16 | 15 | 4 | 434 | 1.6953 | | |
| 13 | | 19 | 18 | 18 | 17 | 16 | 4 | 490 | 1.9141 | | |
| 14 | | 20 | 19 | 19 | 18 | 17 | 4 | 553 | 2.1602 | | |
| 15 | | 21 | 20 | 20 | 19 | 18 | 4 | 616 | 2.4063 | | |
| 16 | | 22 | 21 | 21 | 20 | 19 | 4 | 658 | 2.5703 | | |
| 17 | | 23 | 22 | 22 | 21 | 20 | 6 | 438 | 2.5664 | | |
| 18 | | 24 | 23 | 23 | 22 | 21 | 6 | 466 | 2.7305 | | |
| 19 | | 25 | 24 | 24 | 23 | 22 | 6 | 517 | 3.0293 | | |

TABLE A9-1-continued

| Old MCS index | Possibility 1 | Possibility 2 | Possibility 3 | Possibility 4 | Possibility 5 | Modulation Order | Code rate × [1024] | Spectral efficiency | Modulation Order | Code rate × [1024] |
|---|---|---|---|---|---|---|---|---|---|---|
| 20 | 26 | 25 | 25 | 24 | 23 | 6 | 567 | 3.3223 | | |
| 21 | 27 | 26 | 26 | 25 | 24 | 6 | 616 | 3.6094 | | |
| 22 | 28 | 27 | 27 | 26 | 25 | 6 | 666 | 3.9023 | | |
| 23 | 29 | 28 | 28 | 27 | 26 | 6 | 719 | 4.2129 | | |
| 24 | 30 | 29 | 29 | 28 | 27 | 6 | 772 | 4.5234 | | |
| 25 | 31 | 30 | 30 | 29 | 28 | 6 | 822 | 4.8164 | | |
| 26 | | 31 | 31 | 30 | 29 | 6 | 873 | 5.1152 | | |
| 27 | | | | 31 | 30 | 6 | 910 | 5.3320 | | |
| 28 | | | | | 31 | 6 | 948 | 5.5547 | | |
| 29 | | | | | | 2 | reserved | | | |
| 30 | | | | | | 4 | reserved | | | |
| 31 | | | | | | 6 | reserved | | | |

2. The MCS table is corresponding to 4 bits.

When the MCS table is corresponding to 4 bits, an original CQI table (referring to Table 1) may be directly extracted to form a new MCS table. The new MCS table may include a plurality of entries in the original CQI table, and may further include H entries that are not included in the original CQI table. In other words, when the new MCS table is formed, in addition to directly extracting the entries in the original CQI table, the H entries are newly added to the new MCS table. For example, an entry corresponding to an MCS index 1 in the new MCS table may not be included in the original CQI table. In a thirteenth example, for an MCS table, refer to Table A13.

Table A13, all entries corresponding to MCS indexes that have no correspondence with an old CQI index are newly added.

In Table A13, for example, for the possibility 1, five entries: a new MCS index 0 to a new MCS index 4, are newly added.

For example, if YY is 120, for the possibility 1, the MCS index X may include at least one of the new MCS index 0 to the new MCS index 4 in Table A13.

In the newly added entries in Table A13, a correspondence between an MCS index and each parameter is merely an example. For example, for the possibility 1, a modulation order corresponding to the new MCS index 0 may not be 2,

TABLE A13

| Old CQI index | Possibility 1 | Possibility 2 | Possibility 3 | Possibility 4 | Possibility 5 | Possibility 6 | Possibility 7 | Modulation Order | Code rate × [1024] | Spectral efficiency | Modulation Order | Code rate × [1024] |
|---|---|---|---|---|---|---|---|---|---|---|---|---|
| | | 0 | 0 | | 0 | | | 2 | 30 | 0.0586 | 1 | 60 |
| | | 1 | 1 | 0 | 1 | 0 | 0 | 0 | 2 | 35 | 0.0684 | 1 | 70 |
| | | 2 | 2 | 1 | | 1 | | | 2 | 40 | 0.0781 | 1 | 80 |
| | | 3 | 3 | 2 | 2 | 2 | 1 | 1 | 2 | 55 | 0.1074 | 1 | 110 |
| | | 4 | | 3 | | | 2 | | 2 | 70 | 0.1367 | 1 | 140 |
| 3 | 5 | 4 | 4 | 3 | 3 | 3 | 2 | 2 | 90 | 0.1758 | | |
| 4 | 6 | 5 | 5 | 4 | 4 | 4 | 3 | 2 | 120 | 0.2344 | | |
| 5 | 7 | 6 | 6 | 5 | 5 | 5 | 4 | 2 | 193 | 0.377 | | |
| 6 | 8 | 7 | 7 | 6 | 6 | 6 | 5 | 2 | 308 | 0.6016 | | |
| 7 | 9 | 8 | 8 | 7 | 7 | 7 | 6 | 2 | 449 | 0.877 | | |
| 8 | 10 | 9 | 9 | 8 | 8 | 8 | 7 | 2 | 602 | 1.1758 | | |
| 9 | 11 | 10 | 10 | 9 | 9 | 9 | 8 | 4 | 378 | 1.4766 | | |
| 10 | 12 | 11 | 11 | 10 | 10 | 10 | 9 | 4 | 490 | 1.9141 | | |
| 11 | 13 | 12 | 12 | 11 | 11 | 11 | 10 | 4 | 616 | 2.4063 | | |
| 12 | 14 | 13 | 13 | 12 | 12 | 12 | 11 | 6 | 466 | 2.7305 | | |
| 13 | 15 | 14 | 14 | 13 | 13 | 13 | 12 | 6 | 567 | 3.3223 | | |
| | | 15 | 15 | 14 | 14 | 14 | 13 | 6 | 666 | 3.9023 | | |
| 14 | | | | 15 | 15 | 15 | 14 | 6 | 772 | 4.5234 | | |
| | | | | | | | 15 | 6 | 873 | 5.1152 | | |
| 15 | | | | | | | | 6 | 948 | 5.5547 | | |

In Table A13, a value corresponding to each possibility is an MCS index. It can be understood that Table A13 may actually include a plurality of MCS tables. For example, five columns: "old CQI index", "possibility 1", "modulation", "code rate", and "spectral efficiency", may form an MCS table. For another example, five columns: "old CQI index", "possibility 2", "modulation", "code rate", and "spectral efficiency", may form an MCS table. In other words, each possibility may belong to an independent MCS table. In or a corresponding value obtained by multiplying a code rate by 1024 may not be 8. This is not specifically limited, provided that a code rate corresponding to at least one of the newly added entries is less than a lowest code rate in the original MCS table.

b. For example, the MCS table supports a BLER of 10e-3.

In the following description process, that a 5-bit CQI Table and a 4-bit CQI Table are also separately used as examples.

5.5-bit MCS Table.

In another example, for an MCS table, refer to Table A32-1.

TABLE A32-1

| Old MCS index | Possibility 1 | Possibility 2 | Possibility 3 | Possibility 4 | Possibility 5 | Modulation Order | Code rate × [1024] | Spectral efficiency | Modulation Order | Code rate × [1024] |
|---|---|---|---|---|---|---|---|---|---|---|
|   | 0 | 0 |   |   |   | 2 | 15 | 0.0293 | 1 | 30 |
|   | 1 | 1 | 0 | 0 | 0 | 2 | 30 | 0.0586 | 1 | 60 |
|   | 2 | 2 | 1 | 1 |   | 2 | 38 | 0.0742 | 1 | 76 |
|   | 3 | 3 | 2 | 2 | 1 | 2 | 46 | 0.0898 | 1 | 92 |
|   | 4 |   | 3 |   |   | 2 | 62 | 0.1211 | 1 | 124 |
|   | 5 | 4 | 4 | 3 | 2 | 2 | 78 | 0.1523 |   |   |
| 0 | 6 | 5 | 5 | 4 | 3 | 2 | 120 | 0.2344 |   |   |
| 1 | 7 | 6 | 6 | 5 | 4 | 2 | 157 | 0.3066 |   |   |
| 2 | 8 | 7 | 7 | 6 | 5 | 2 | 193 | 0.3770 |   |   |
| 3 | 9 | 8 | 8 | 7 | 6 | 2 | 251 | 0.4902 |   |   |
| 4 | 10 | 9 | 9 | 8 | 7 | 2 | 308 | 0.6016 |   |   |
| 5 | 11 | 10 | 10 | 9 | 8 | 2 | 379 | 0.7402 |   |   |
| 6 | 12 | 11 | 11 | 10 | 9 | 2 | 449 | 0.8770 |   |   |
| 7 | 13 | 12 | 12 | 11 | 10 | 2 | 526 | 1.0273 |   |   |
| 8 | 14 | 13 | 13 | 12 | 11 | 2 | 602 | 1.1758 |   |   |
| 9 | 15 | 14 | 14 | 13 | 12 | 2 | 679 | 1.3262 |   |   |
| 10 | 16 | 15 | 15 | 14 | 13 | 4 | 340 | 1.3281 |   |   |
| 11 | 17 | 16 | 16 | 15 | 14 | 4 | 378 | 1.4766 |   |   |
| 12 | 18 | 17 | 17 | 16 | 15 | 4 | 434 | 1.6953 |   |   |
| 13 | 19 | 18 | 18 | 17 | 16 | 4 | 490 | 1.9141 |   |   |
| 14 | 20 | 19 | 19 | 18 | 17 | 4 | 553 | 2.1602 |   |   |
| 15 | 21 | 20 | 20 | 19 | 18 | 4 | 616 | 2.4063 |   |   |
| 16 | 22 | 21 | 21 | 20 | 19 | 4 | 658 | 2.5703 |   |   |
| 17 | 23 | 22 | 22 | 21 | 20 | 6 | 438 | 2.5664 |   |   |
| 18 | 24 | 23 | 23 | 22 | 21 | 6 | 466 | 2.7305 |   |   |
| 19 | 25 | 24 | 24 | 23 | 22 | 6 | 517 | 3.0293 |   |   |
| 20 | 26 | 25 | 25 | 24 | 23 | 6 | 567 | 3.3223 |   |   |
| 21 | 27 | 26 | 26 | 25 | 24 | 6 | 616 | 3.6094 |   |   |
| 22 | 28 | 27 | 27 | 26 | 25 | 6 | 666 | 3.9023 |   |   |
| 23 | 29 | 28 | 28 | 27 | 26 | 6 | 719 | 4.2129 |   |   |
| 24 | 30 | 29 | 29 | 28 | 27 | 6 | 772 | 4.5234 |   |   |
| 25 | 31 | 30 | 30 | 29 | 28 | 6 | 822 | 4.8164 |   |   |
| 26 |   | 31 | 31 | 30 | 29 | 6 | 873 | 5.1152 |   |   |
| 27 |   |   |   | 31 | 30 | 6 | 910 | 5.3320 |   |   |
| 28 |   |   |   |   | 31 | 6 | 948 | 5.5547 |   |   |
| 29 |   |   |   |   |   | 2 | reserved |   |   |   |
| 30 |   |   |   |   |   | 4 | reserved |   |   |   |
| 31 |   |   |   |   |   | 6 | reserved |   |   |   |

6. The MCS table is corresponding to 4 bits.

In a thirty-sixth example, for an MCS table, refer to Table A36.

TABLE A36

| Old CQI index | Possibility 1 | Possibility 2 | Possibility 3 | Possibility 4 | Modulation Order | Code rate × [1024] | Spectral efficiency | Modulation Order | Code rate × [1024] |
|---|---|---|---|---|---|---|---|---|---|
|   | 0 | 0 |   |   | 2 | 30 | 0.0586 | 1 | 60 |
|   | 1 | 1 | 0 | 0 | 2 | 42 | 0.082 | 1 | 84 |
|   | 2 |   | 1 |   | 2 | 60 | 0.1172 | 1 | 120 |
|   | 3 | 2 | 2 | 1 | 2 | 78 | 0.1523 |   |   |
|   | 4 | 3 | 3 | 2 | 2 | 120 | 0.2344 |   |   |
|   | 5 | 4 | 4 | 3 | 2 | 193 | 0.377 |   |   |
|   | 6 | 5 | 5 | 4 | 2 | 308 | 0.6016 |   |   |
|   | 7 | 6 | 6 | 5 | 2 | 449 | 0.877 |   |   |
|   | 8 | 7 | 7 | 6 | 2 | 602 | 1.1758 |   |   |
|   | 9 | 8 | 8 | 7 | 4 | 378 | 1.4766 |   |   |
|   | 10 | 9 | 9 | 8 | 4 | 490 | 1.9141 |   |   |
|   | 11 | 10 | 10 | 9 | 4 | 616 | 2.4063 |   |   |
|   | 12 | 11 | 11 | 10 | 6 | 466 | 2.7305 |   |   |
|   | 13 | 12 | 12 | 11 | 6 | 567 | 3.3223 |   |   |
|   | 14 | 13 | 13 | 12 | 6 | 666 | 3.9023 |   |   |
|   | 15 | 14 | 14 | 13 | 6 | 772 | 4.5234 |   |   |
|   |   | 15 | 15 | 14 | 6 | 873 | 5.1152 |   |   |
|   |   |   |   | 15 | 6 | 948 | 5.5547 |   |   | c. For example, the MCS table supports a BLER of 10e-4.

In the following description process, that the MCS table is corresponding to 5 bits and that the MCS table is corresponding to 4 bits are also separately used as examples.

7. The MCS table is corresponding to 5 bits.

In a forty-second example, for an MCS table, refer to Table A42.

TABLE A42

| Old MCS index | Possibility 1 | Possibility 2 | Possibility 3 | Possibility 4 | Modulation Order | Code rate × [1024] | Spectral efficiency | Modulation Order | Code rate × [1024] |
|---|---|---|---|---|---|---|---|---|---|
| | | 0 | 0 | | 2 | 25 | 0.04885 | 1 | 50 |
| | | 1 | 1 | 0 | 0 | 2 | 50 | 0.0977 | 1 | 100 |
| | | 2 | | 1 | | 2 | 64 | 0.125 | 1 | 128 |
| | | 3 | 2 | 2 | 1 | 2 | 78 | 0.1523 | | |
| | 0 | 4 | 3 | 3 | 2 | 2 | 120 | 0.2344 | | |
| | 1 | 5 | 4 | 4 | 3 | 2 | 157 | 0.3066 | | |
| | 2 | 6 | 5 | 5 | 4 | 2 | 193 | 0.3770 | | |
| | 3 | 7 | 6 | 6 | 5 | 2 | 251 | 0.4902 | | |
| | 4 | 8 | 7 | 7 | 6 | 2 | 308 | 0.6016 | | |
| | 5 | 9 | 8 | 8 | 7 | 2 | 379 | 0.7402 | | |
| | 6 | 10 | 9 | 9 | 8 | 2 | 449 | 0.8770 | | |
| | 7 | 11 | 10 | 10 | 9 | 2 | 526 | 1.0273 | | |
| | 8 | 12 | 11 | 11 | 10 | 2 | 602 | 1.1758 | | |
| | 9 | 13 | 12 | 12 | 11 | 2 | 679 | 1.3262 | | |
| | 10 | 14 | 13 | 13 | 12 | 4 | 340 | 1.3281 | | |
| | 11 | 15 | 14 | 14 | 13 | 4 | 378 | 1.4766 | | |
| | 12 | 16 | 15 | 15 | 14 | 4 | 434 | 1.6953 | | |
| | 13 | 17 | 16 | 16 | 15 | 4 | 490 | 1.9141 | | |
| | 14 | 18 | 17 | 17 | 16 | 4 | 553 | 2.1602 | | |
| | 15 | 19 | 18 | 18 | 17 | 4 | 616 | 2.4063 | | |
| | 16 | 20 | 19 | 19 | 18 | 4 | 658 | 2.5703 | | |
| | 17 | 21 | 20 | 20 | 19 | 6 | 438 | 2.5664 | | |
| | 18 | 22 | 21 | 21 | 20 | 6 | 466 | 2.7305 | | |
| | 19 | 23 | 22 | 22 | 21 | 6 | 517 | 3.0293 | | |
| | 20 | 24 | 23 | 23 | 22 | 6 | 567 | 3.3223 | | |
| | 21 | 25 | 24 | 24 | 23 | 6 | 616 | 3.6094 | | |
| | 22 | 26 | 25 | 25 | 24 | 6 | 666 | 3.9023 | | |
| | 23 | 27 | 26 | 26 | 25 | 6 | 719 | 4.2129 | | |
| | 24 | 28 | 27 | 27 | 26 | 6 | 772 | 4.5234 | | |
| | 25 | 29 | 28 | 28 | 27 | 6 | 822 | 4.8164 | | |
| | 26 | 30 | 29 | 29 | 28 | 6 | 873 | 5.1152 | | |
| | 27 | 31 | 30 | 30 | 29 | 6 | 910 | 5.3320 | | |
| | 28 | | 31 | 31 | 30 | 6 | 948 | 5.5547 | | |
| | 29 | | | | 31 | 2 | reserved | | | |
| | 30 | | | | | 4 | reserved | | | |
| | 31 | | | | | 6 | reserved | | | |

8. The MCS table is corresponding to 4 bits.

In a forty-sixth example, for an MCS table, refer to Table A46.

TABLE A46

| Old CQI index | Possibility 1 | Possibility 2 | Possibility 3 | Possibility 4 | Possibility 5 | Possibility 6 | Possibility 7 | Modulation Order | Code rate × [1024] | Spectral efficiency | Modulation | Code rate × [1024] |
|---|---|---|---|---|---|---|---|---|---|---|---|---|
| | | | 0 | | 0 | | 0 | 2 | 30 | 0.0586 | 1 | 60 |
| | | | 1 | 0 | | 0 | 1 | 2 | 50 | 0.0977 | 1 | 100 |
| | | | 2 | | 1 | 1 | | 2 | 64 | 0.125 | 1 | 128 |
| | | | 3 | 1 | 2 | 2 | 2 | 2 | 78 | 0.1523 | | |
| | | | 4 | 2 | 3 | 3 | 3 | 2 | 120 | 0.2344 | | |
| | | | 5 | 3 | 4 | 4 | 4 | 2 | 193 | 0.377 | | |
| | | | 6 | 4 | 5 | 5 | 5 | 2 | 308 | 0.6016 | | |
| | | | 7 | 5 | 6 | 6 | 6 | 2 | 449 | 0.877 | | |
| | | | 8 | 6 | 7 | 7 | 7 | 2 | 602 | 1.1758 | | |
| | | | 9 | 7 | 8 | 8 | 8 | 4 | 378 | 1.4766 | | |
| | | | 10 | 8 | 9 | 9 | 9 | 4 | 490 | 1.9141 | | |
| | | | 11 | 9 | 10 | 10 | 10 | 4 | 616 | 2.4063 | | |
| 11 | 12 | | 12 | 10 | 11 | 11 | 11 | 6 | 466 | 2.7305 | | |
| 12 | 13 | | 13 | 11 | 12 | 12 | 12 | 6 | 567 | 3.3223 | | |
| 13 | | | 14 | 12 | 13 | 13 | 13 | 6 | 666 | 3.9023 | | |
| 14 | 14 | | 15 | 13 | 14 | 14 | 14 | 6 | 772 | 4.5234 | | |
| | | | | 14 | 15 | 15 | 15 | 6 | 873 | 5.1152 | | |
| 15 | 15 | | 15 | | | | | 6 | 948 | 5.5547 | | |

In a forty-ninth example, for an MCS table, refer to Table A49.

TABLE A49

| Old CQI index | Possibility 1 | Possibility 2 | Possibility 3 | Possibility 4 | Modulation Order | Code rate × [1024] | Spectral efficiency | Modulation Order | Code rate × [1024] |
|---|---|---|---|---|---|---|---|---|---|
|  | 0 | 0 |  |  | 2 | 30 | 0.0586 | 1 | 60 |
|  | 1 | 1 | 0 | 0 | 2 | 40 | 0.0781 | 1 | 80 |
|  | 2 |  | 1 |  | 2 | 52 | 0.1016 | 1 | 104 |
|  | 3 | 2 | 2 | 1 | 2 | 78 | 0.1523 |  |  |
|  | 4 | 3 | 3 | 2 | 2 | 120 | 0.2344 |  |  |
|  | 5 | 4 | 4 | 3 | 2 | 193 | 0.377 |  |  |
|  | 6 | 5 | 5 | 4 | 2 | 308 | 0.6016 |  |  |
|  | 7 | 6 | 6 | 5 | 2 | 449 | 0.877 |  |  |
|  | 8 | 7 | 7 | 6 | 2 | 602 | 1.1758 |  |  |
|  | 9 | 8 | 8 | 7 | 4 | 378 | 1.4766 |  |  |
|  | 10 | 9 | 9 | 8 | 4 | 490 | 1.9141 |  |  |
|  | 11 | 10 | 10 | 9 | 4 | 616 | 2.4063 |  |  |
|  | 12 | 11 | 11 | 10 | 6 | 466 | 2.7305 |  |  |
|  | 13 | 12 | 12 | 11 | 6 | 567 | 3.3223 |  |  |
|  | 14 | 13 | 13 | 12 | 6 | 666 | 3.9023 |  |  |
|  | 15 | 14 | 14 | 13 | 6 | 772 | 4.5234 |  |  |
|  |  | 15 | 15 | 14 | 6 | 873 | 5.1152 |  |  |
|  |  |  |  | 15 | 6 | 948 | 5.5547 |  |  |

In a fiftieth example, or an MCS table, refer to Table A50.

TABLE A50

| Old CQI index | Possibility 1 | Possibility 2 | Possibility 3 | Possibility 4 | Modulation Order | Code rate × [1024] | Spectral efficiency | Modulation Order | Code rate × [1024] |
|---|---|---|---|---|---|---|---|---|---|
|  | 0 | 0 |  |  | 2 | 30 | 0.0586 | 1 | 60 |
|  | 1 | 1 | 0 | 0 | 2 | 50 | 0.0977 | 1 | 100 |
|  | 2 |  | 1 |  | 2 | 64 | 0.125 | 1 | 128 |
|  | 3 | 2 | 2 | 1 | 2 | 78 | 0.1523 |  |  |
|  | 4 | 3 | 3 | 2 | 2 | 120 | 0.2344 |  |  |
|  | 5 | 4 | 4 | 3 | 2 | 193 | 0.377 |  |  |
|  | 6 | 5 | 5 | 4 | 2 | 308 | 0.6016 |  |  |
|  | 7 | 6 | 6 | 5 | 2 | 449 | 0.877 |  |  |
|  | 8 | 7 | 7 | 6 | 2 | 602 | 1.1758 |  |  |
|  | 9 | 8 | 8 | 7 | 4 | 378 | 1.4766 |  |  |
|  | 10 | 9 | 9 | 8 | 4 | 490 | 1.9141 |  |  |
|  | 11 | 10 | 10 | 9 | 4 | 616 | 2.4063 |  |  |
|  | 12 | 11 | 11 | 10 | 6 | 466 | 2.7305 |  |  |
|  | 13 | 12 | 12 | 11 | 6 | 567 | 3.3223 |  |  |
|  | 14 | 13 | 13 | 12 | 6 | 666 | 3.9023 |  |  |
|  | 15 | 14 | 14 | 13 | 6 | 772 | 4.5234 |  |  |
|  |  | 15 | 15 | 14 | 6 | 873 | 5.1152 |  |  |

In another example, for an MCS table, refer to Table A50-1.

TABLE A50-1

| Old CQI index | Possibility 1 | Possibility 2 | Possibility 3 | Possibility 4 | Possibility 5 | Possibility 6 | Possibility 7 | Modulation Order | Code rate × [1024] | Spectral efficiency | Modulation Order | Code rate × [1024] |
|---|---|---|---|---|---|---|---|---|---|---|---|---|
|  | 0 | 0 |  | 0 |  |  |  | 2 | 30 | 0.0586 | 1 | 60 |
|  | 1 | 1 | 0 | 1 | 0 | 0 | 0 | 2 | 35 | 0.0684 | 1 | 70 |
|  | 2 | 2 | 1 |  | 1 |  |  | 2 | 40 | 0.0781 | 1 | 80 |
|  | 3 | 3 | 2 | 2 | 2 | 1 | 1 | 2 | 50 | 0.0977 | 1 | 100 |
|  | 4 |  | 3 |  |  | 2 |  | 2 | 70 | 0.1367 | 1 | 140 |
| 3 | 5 | 4 | 4 | 3 | 3 | 3 | 2 | 2 | 90 | 0.1758 |  |  |
| 4 | 6 | 5 | 5 | 4 | 4 | 4 | 3 | 2 | 120 | 0.2344 |  |  |
| 5 | 7 | 6 | 6 | 5 | 5 | 5 | 4 | 2 | 193 | 0.377 |  |  |
| 6 | 8 | 7 | 7 | 6 | 6 | 6 | 5 | 2 | 308 | 0.6016 |  |  |
| 7 | 9 | 8 | 8 | 7 | 7 | 7 | 6 | 2 | 449 | 0.877 |  |  |
| 8 | 10 | 9 | 9 | 8 | 8 | 8 | 7 | 2 | 602 | 1.1758 |  |  |
| 9 | 11 | 10 | 10 | 9 | 9 | 9 | 8 | 4 | 378 | 1.4766 |  |  |
| 10 | 12 | 11 | 11 | 10 | 10 | 10 | 9 | 4 | 490 | 1.9141 |  |  |
| 11 | 13 | 12 | 12 | 11 | 11 | 11 | 10 | 4 | 616 | 2.4063 |  |  |

TABLE A50-1-continued

| Old CQI index | Possibility 1 | Possibility 2 | Possibility 3 | Possibility 4 | Possibility 5 | Possibility 6 | Possibility 7 | Modulation Order | Code rate x [1024] | Spectral efficiency | Modulation Order | Code rate x [1024] |
|---|---|---|---|---|---|---|---|---|---|---|---|---|
| 12 | 14 | 13 | 13 | 12 | 12 | 12 | 11 | 6 | 466 | 2.7305 | | |
| 13 | 15 | 14 | 14 | 13 | 13 | 13 | 12 | 6 | 567 | 3.3223 | | |
|  |  | 15 | 15 | 14 | 14 | 14 | 13 | 6 | 666 | 3.9023 | | |
| 14 |  |  |  | 15 | 15 | 15 | 14 | 6 | 772 | 4.5234 | | |
|  |  |  |  |  |  |  | 15 | 6 | 873 | 5.1152 | | |
| 15 |  |  |  |  |  |  |  | 6 | 948 | 5.5547 | | |

In the example A described above, the new MCS table provided in this embodiment of this application is obtained by modifying the existing MCS table or CQI table.

In addition, due to a feature that current URLLC supports a lower BLER, the terminal device and the network device support two CQI tables. The two CQI tables respectively correspond to different BLERs. For example, the two CQI tables are respectively referred to as a first CQI table and a second CQI table. All or some entries in the two CQI tables are different. For example, a BLER corresponding to the first CQI table is 10e-5, and more low spectral efficiency entries are introduced in the first CQI table than in the second CQI table. For example, a BLER corresponding to the second CQI table is 10e-1, an eMBB CQI table may be reused as the second CQI table, and the second CQI table includes more high spectral efficiency entries than the first CQI table. For example, for the second CQI table, refer to the foregoing Table 1, and for the first CQI table, refer to the following Table 2.1A, where Z1 and Z2 are positive integers greater than or equal to 30 and less than 78. Z1 is less than Z2. Optionally, Z1 and Z2 are two of 31, 33, 34, 35, 36, 37, 38, 41, 43, 44, 45, 46, 47, 48, 49, 51, 53, 55, 57, 58, 59, 60, 61, 63, 64, 65, 66, 67, 68, 69, 70, 71, 72, 73, 74, 75, 76, and 77. A ratio of Z2 to 78 is less than or equal to 10, and a ratio of Z2 to Z1 is less than or equal to 10. Table 2.1A is as follows:

TABLE 2.1A

| Index | Modulation scheme | Code rate x [1024] | Spectral efficiency |
|---|---|---|---|
| 0 | | Out of range | |
| 1 | QPSK | Z1 | Z1/1024 × 2 |
| 2 | QPSK | Z2 | Z2/1024 × 2 |
| 3 | QPSK | 78 | 0.1523 |
| 4 | QPSK | 120 | 0.2344 |
| 5 | QPSK | 193 | 0.377 |
| 6 | QPSK | 308 | 0.6016 |
| 7 | QPSK | 449 | 0.877 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Because the URLLC supports the CQI tables of the two BLERs, if the URLLC also supports two MCS tables that are in a one-to-one correspondence with the CQI tables, how the terminal device and the network device determine a corresponding MCS table used for data transmission is a problem to be resolved. Currently, there are two solutions: 1. The network device notifies, by using dynamic signaling DCI, the terminal device of a specific MCS table used for data receiving or data sending. 2. The network device semi-statically configures an MCS table for the terminal device by using RRC signaling, and both the terminal device and the network device use this previously configured MCS table for data transmission before the terminal device receives new RRC configuration signaling. A disadvantage of the foregoing solution 1 is that a relatively large quantity of additional signaling overheads are caused. In the foregoing solution 2, because RRC signaling or other higher layer signaling is used, and reconfiguration of the signaling requires a relatively long waiting time, the solution 2 is not suitable for dynamic scheduling in the URLLC service having a relatively high latency requirement, to select a most suitable MCS table.

In view of this, in an implementation, this embodiment of this application provides a new MCS table. The MCS table is, for example, referred to as a first MCS table. The first MCS table includes all or some entries corresponding to the CQI tables of the two BLERs. Therefore, one MCS table may correspond to at least two CQI tables with different BLERs, so that extra signaling overheads are avoided, scheduling flexibility can be maintained, and system efficiency can be improved.

In this embodiment of this application, the first MCS table may include 32 entries. The 32 entries include all entries in the first CQI table. The first CQI table includes at least one entry whose spectral efficiency is less than 78/1024×2. Currently, it is known that highest spectral efficiency in the first CQI table is 772/1024×6. In this case, all the entries included in the first CQI table should be included in the first MCS table, and the 32 entries further include at least one entry excluded in the first CQI table. Spectral efficiency of the at least one entry excluded in the first CQI table is greater than 772/1024×6. In other words, all or some of entries that are not included in the first CQI table and whose spectral efficiency is greater than 772/1024×6 are included in the first MCS table.

In the first MCS table, for the MCS number X, modulation schemes corresponding to an MCS number X−1 and the MCS number X are QPSK, and a modulation scheme corresponding to an MCS number X+1 is 16QAM. A code rate of the MCS number X is equal to one of the following:
rounding up {(code rate of the MCS number X−1×2+code rate of the MCS number X+1×4)/4};
rounding down {(code rate of the MCS number X−1×2+code rate of the MCS number X+1×4)/4};
rounding off {(code rate of the MCS number X−1×2+code rate of the MCS number X+1×4)/4}; and
(code rate of the MCS number X−1×2+code rate of the MCS number X+1×4)/4.

In the first MCS table, for an MCS number Y, modulation schemes corresponding to an MCS number Y−1 and the MCS number Y are 16QAM, and a modulation scheme corresponding to an MCS number Y+1 is 64QAM. A code rate of the MCS number Y is equal to one of the following:

rounding up {(code rate of the MCS number Y−1×4+code rate of the MCS number Y+1×6)/8};

rounding down {(code rate of the MCS number Y−1×4+code rate of the MCS number Y+1×6)/8};

rounding off {(code rate of the MCS number Y−1×4+code rate of the MCS number Y+1×6)/8}; and (code rate of the MCS number Y−1×4+code rate of the MCS number Y+1×6)/8.

Y is greater than X+2.

The case described above is a case in which transform precoding is not enabled, or a case of cyclic prefix (CP)-orthogonal frequency division multiplexing (OFDM).

It can be understood that, in the first MCS table, only an entry corresponding to a lower modulation order is reserved at a modulation order shift part. In the prior art, two entries corresponding to same spectral efficiency are reserved at a shift part, but modulation orders corresponding to the two entries are different. Herein, to reduce a quantity of state entries in the MCS table, only one entry is reserved in this embodiment of this application. Reserving the entry with the lower modulation order is to ensure higher reliability. Generally, for same spectral efficiency, a lower modulation order leads to higher reliability. In addition, the MCS table further corresponds to transform precoding. If the transform precoding is enabled, a parameter q exists, and q may represent a lowest supported modulation order reported by the terminal device. If q=2, a reserved entry q (for example, an entry corresponding to an MCS number 28 in the prior art) always exists in the MCS table. This causes a state entry waste. For example, in the prior art, when q=2, the MCS number 28 and an MCS number 29 are a same entry. This belongs to a redundant state.

In view of this, in this embodiment of this application, in consideration of state entry saving, more valid MCS indication state entries are introduced. For example, in this embodiment of this application, all or some entries in the first MCS table may be determined based on a value of q.

Optionally, the transform precoding is enabled; if the terminal device reports that pi/2 BPSK modulation is supported, q=1; if the terminal device reports that pi/2 BPSK modulation is not supported, q=2, where q is the lowest supported modulation order reported by the terminal device; and spectral efficiency corresponding to at least one MCS number is determined based on the value of q.

Optionally, the transform precoding is enabled; if the terminal device reports that pi/2 BPSK modulation is supported, q=1; if the terminal device reports that pi/2 BPSK modulation is not supported, q=2, where q is the lowest supported modulation order reported by the terminal device; and a modulation order and spectral efficiency corresponding to at least one MCS number are determined based on the value of q.

Optionally, the transform precoding is enabled; if the terminal device reports that pi/2 BPSK modulation is supported, q=1; if the terminal device reports that pi/2 BPSK modulation is not supported, q=2, where q is the lowest supported modulation order reported by the terminal device; and a reserved entry and a first value corresponding to at least one MCS number are determined based on the value of q, where the first value is a value greater than 772/1024×6.

Optionally, the transform precoding is enabled; if the terminal device reports that pi/2 BPSK modulation is supported, q=1; if the terminal device reports that pi/2 BPSK modulation is not supported, q=2, where q is the lowest supported modulation order reported by the terminal device; and a first value or a second value corresponding to at least one MCS number is determined based on the value of q, where both the first value and the second value are greater than 772/1024×6.

In this embodiment of this application, if the terminal device supports the pi/2 BPSK modulation, the terminal device reports to the network device. If the network device receives the report of the terminal device, in other words, if the network device determines that the terminal device reports that the pi/2 BPSK modulation is supported, q is equal to 1; if the network device determines that the terminal device reports that the pi/2 BPSK modulation is not supported, q is equal to 2. A modulation order of a reserved entry corresponding to at least one of MCS numbers 29, 30, and 31 in the first MCS table is determined based on the value of q. This may be understood as follows: Modulation orders of all or some entries in the first MCS table may be determined based on the value of q. Actually, a specific entry whose modulation order is determined based on the value of q is not limited. The at least one of the MCS numbers 29, 30, and 31 herein is merely an example.

For example, that a modulation order of a reserved entry corresponding to at least one of MCS numbers 29, 30, and 31 is determined based on the value of q includes but is not limited to at least one of the following two cases:

if q=1, the MCS number 29 corresponds to a modulation order 1, the MCS number 30 corresponds to a modulation order 2, and the MCS number 31 corresponds to a modulation order 4; and if q=2, the MCS number 29 corresponds to a modulation order 2, the MCS number 30 corresponds to a modulation order 4, and the MCS number 31 corresponds to a modulation order 6.

For example, that a modulation order of a reserved entry corresponding to at least one of MCS numbers 28, 29, 30, and 31 is determined based on the value of q includes but is not limited to at least one of the following two cases:

if q=1, the MCS number 28 corresponds to a modulation order 1 and spectral efficiency is a reserved value, the MCS number 29 corresponds to a modulation order 2 and spectral efficiency is a reserved value, the MCS number 30 corresponds to a modulation order 4 and spectral efficiency is a reserved value, and the MCS number 31 corresponds to a modulation order 6 and spectral efficiency is a reserved value; and if q=2, the MCS number 28 corresponds to a modulation order 6 and spectral efficiency is a value greater than 772/1024×6, the MCS number 29 corresponds to a modulation order 2 and spectral efficiency is a reserved value, the MCS number 30 corresponds to a modulation order 4 and spectral efficiency is a reserved value, and the MCS number 31 corresponds to a modulation order 6 and spectral efficiency is a reserved value.

Figure 4:
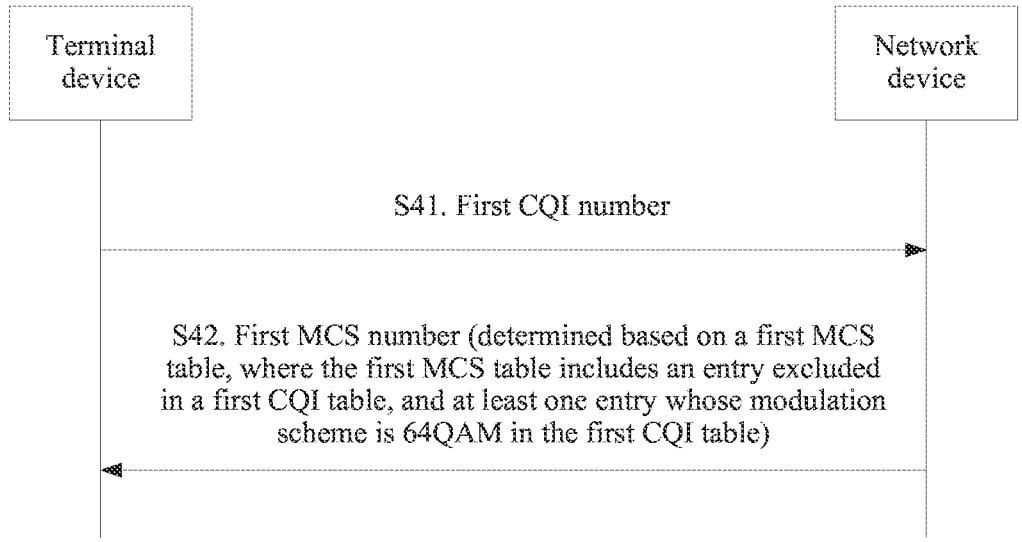
FIG. 4 is a flowchart of a communication method according to an embodiment of this application.
Figures 1, 4:
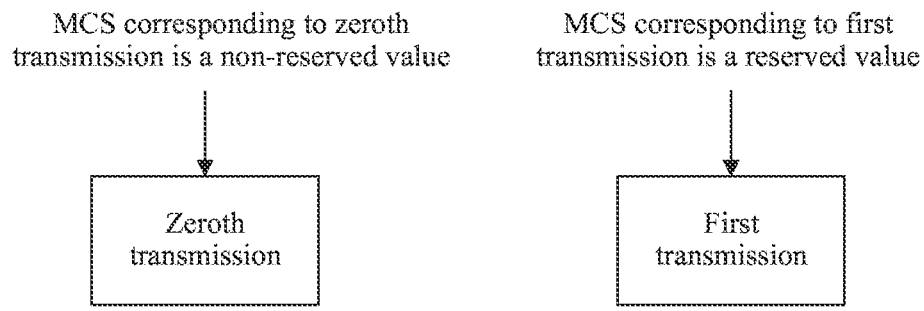
Figures 2, 4:
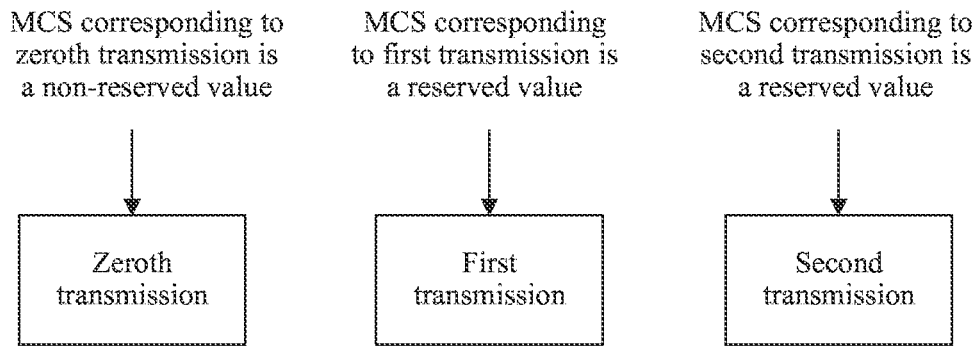

Referring to FIG. 4, an embodiment of this application provides a second communication method. The method is also referred to as an MCS receiving and notification method. In the following description process, an example in which the method is applied to the application scenario shown in FIG. 2 is used. A procedure of the method is described as follows:

S41. A terminal device sends a first CQI number to a network device, and correspondingly the network device receives the first CQI number from the terminal device, where the first CQI number is determined based on a first CQI table.

S42. The network device sends a first MCS number, and correspondingly the terminal device receives the first MCS number, where the first MCS number is determined based on a first MCS table, and the first MCS table includes an entry excluded in the first CQI table, and at least one entry whose modulation scheme is 64QAM in the first CQI table.

In this embodiment of this application, "number" and "index" may be understood as a same meaning. For example, a CQI index and a CQI number are replaceable concepts, or an MCS index and an MCS number are replaceable concepts.

The first CQI table may be predefined in a protocol, may be preset by the terminal device according to a protocol rule or pre-stored by the terminal device, may be selected by the terminal device from at least two predefined tables based on a downlink channel state, or may be notified by the network device to the terminal device. Specifically, a method of notifying the terminal device by the network device may be that the network device selects one of at least two predefined tables based on an uplink channel state or a downlink channel state, and notifies the terminal device. The CQI table is used to describe a mapping relationship between a CQI number and an entry. In this embodiment of this application, the mapping relationship in the CQI table is merely an example enumerated for facilitating understanding of this application. An expression form of the CQI table in this application includes the mapping relationship but is not limited thereto. In other words, the CQI table may have a plurality of combinations, and provided that the mapping relationship between a CQI number and an entry can be reflected in the CQI table, all the combinations fall within the protection scope of this application.

The first MCS table may be predefined in a protocol, may be preset by the terminal device according to a protocol rule or pre-stored by the terminal device, may be selected by the terminal device from at least two predefined MCS tables based on a downlink channel state, or may be notified by the network device to the terminal device. Specifically, a method of notifying the terminal device by the network device may be that the network device selects one of at least two predefined tables based on an uplink channel state or a downlink channel state, and notifies the terminal device. The MCS table is used to describe a mapping relationship between an MCS number and an entry. In this embodiment of this application, the mapping relationship in the MCS table is merely an example enumerated for facilitating understanding of this application. An expression form of the MCS table in this application includes the mapping relationship but is not limited thereto. In other words, the MCS table may have a plurality of combinations, and provided that the mapping relationship between an MCS number and an entry can be reflected in the CQI table, all the combinations fall within the protection scope of this application.

Specifically, the terminal device determines first spectral efficiency based on a measured first SINR, and then obtains, based on the first spectral efficiency and the first CQI table, the first CQI number corresponding to the first spectral efficiency. The first CQI table is pre-stored in the terminal device.

Specifically, an entry corresponding to a CQI number may represent a row in which the CQI number is located in a CQI table, or may represent a modulation scheme, spectral efficiency, and a code rate that correspond to the CQI number in a CQI table, or may represent that the CQI number corresponds to "out of range" in a CQI table, or may represent that a value corresponding to the CQI number in a CQI table is null, in other words, is not used. It should be understood that, generally, that a CQI number 0 corresponds to "out of range" means that in this case, a receive signal-to-noise ratio of the terminal device is less than a preset threshold.

Specifically, an entry corresponding to an MCS number may represent a row in which the MCS number is located in an MCS table, or may represent a modulation scheme, spectral efficiency, and a code rate that correspond to the MCS number in an MCS table, or may represent a modulation scheme and reserved information that correspond to the MCS number in an MCS table, or may represent that a value corresponding to the MCS number in an MCS table is null, in other words, is not used. It should be understood that the reserved information means that a current MCS notification includes no code rate and spectral efficiency. Therefore, a code rate or spectral efficiency required for current transmission is determined by using a predefined MCS, an MCS notified by the network device in advance, or an MCS notified by using higher layer signaling.

Specifically, the first MCS table includes the entry excluded in the first CQI table, and the at least one entry whose modulation scheme is 64 quadrature amplitude modulation QAM in the first CQI table. Specifically, the first MCS table includes the entry excluded in the first CQI table, and further includes at least one of XXX1 to XXX5. The first MCS table may include one or more entries whose modulation schemes are 64QAM, and each entry whose modulation scheme is 64QAM includes the modulation scheme, a code rate, and spectral efficiency, and has a corresponding MCS number.

It should be understood that locations and quantities of XXX1 to XXX5 and YYY1 are merely examples. To be specific, a part corresponding to 64QAM may alternatively include only XXX1 to XXX4, and YYY may alternatively include YYY1 and YYY2.

TABLE C2

| CQI number (CQI index) | Modulation scheme (modulation) | Code rate × 1024 (code rate × 1024) | Spectral efficiency (efficiency) |
|---|---|---|---|
| 0 | Out of range (out of range) | | |
| 1 | QPSK/Pi/2 BSPKBPSK | YYY1 | |
| 2 | QPSK/Pi/2 BSPKBPSK | YYY2 | |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | XXX1 | |
| 13 | 64QAM | XXX2 | |
| 14 | 64QAM | XXX3 | |
| 15 | 64QAM | XXX4 | |

Specifically, the network device predefines the first CQI table or determines the first CQI table from the at least two CQI tables. Then, the network device receives the first CQI number sent by the terminal device. It can be understood that the network device has determined or learned of the first CQI table when receiving the first CQI number.

The network device may determine a corresponding modulation scheme, a corresponding code rate, and corresponding spectral efficiency based on the received first CQI number. The network device determines the first MCS number in the first MCS table based on the received first CQI number and the first MCS table. A modulation scheme, a code rate, and spectral efficiency corresponding to the first MCS number may be the same as or different from the modulation scheme, the code rate, and the spectral efficiency corresponding to the first CQI number. This is not limited in this application. It can be understood that, that the network device further determines the first MCS table specifically includes: the network device determines the first MCS table based on the first CQI number.

The network device sends the first MCS number. Specifically, the network device may send the first MCS number by using higher layer signaling or downlink control information.

Specifically, the first MCS table includes all entries other than an entry corresponding to a smallest CQI number in the first CQI table. The first MCS table includes all entries other than an entry corresponding to a CQI number 0 in the first CQI table. In other words, the first MCS table does not include all entries other than an "out of range" entry in the first CQI table.

Optionally, it may be further understood that the first MCS table includes all valid entries in the first CQI table. The valid entries are entries other than an entry corresponding to "out of range" and/or an entry whose value is null.

For example, it is assumed that the first MCS table includes 16 entries or 32 entries. Generally, the CQI table is shown in Table 1 and Table 2, and there are 15 entries other than an entry corresponding to "out of range" and/or an entry whose value is null. In other words, the first MCS table includes the 15 valid entries in the CQI table. It can be understood that if the CQI table includes seven entries whose values are null and one entry corresponding to "out of range", the first MCS table includes eight valid entries in the CQI table.

In this embodiment of this application, the first MCS table includes 16 entries in total, and there is one entry excluded in the first CQI table.

Optionally, a size of an MCS bit field in downlink control information corresponding to the MCS table is 4 bits.

Specifically, a quantity of entries that are included in the first MCS table and that are not included in the first CQI table is 1. In other words, the first MCS table includes one entry excluded in the first CQI table.

For example, generally, the CQI table is shown in Table C1 and Table C2, and there are 15 entries other than an entry corresponding to "out of range" and/or an entry whose value is null. The first MCS table includes 15 entries in the first CQI table and one entry excluded in the first CQI table.

For example, a code rate of the one entry excluded in the first CQI table is less than a code rate of a CQI number 1 in the first CQI table. For another example, spectral efficiency of the one entry excluded in the first CQI table is less than spectral efficiency of the CQI number 1 in the first CQI table. In this way, when the network device receives the CQI number 1 or the CQI number 0 sent by the terminal device, the network device may further schedule the terminal device at a lower code rate, so that the terminal device can still meet a URLLC service requirement. Therefore, reliability of URLLC service transmission is ensured.

Optionally, an MCS number 0 is the entry excluded in the first CQI table. According to a principle of designing an MCS table in ascending order of spectral efficiency, it may be learned that spectral efficiency corresponding to the MCS number 0 is less than spectral efficiency corresponding to a number 1 in the CQI table. In this way, when the network device receives the CQI number 1 or the CQI number 0 sent by the terminal device, the network device may further schedule the terminal device at a lower code rate, so that the terminal device can still meet a URLLC service requirement. Therefore, reliability of URLLC service transmission is ensured.

Optionally, an MCS number 1 is the entry excluded in the first CQI table. According to a design in ascending order of spectral efficiency, possible spectral efficiency corresponding to the MCS number 1 is equal to (spectral efficiency corresponding to a CQI number 1 in the first CQI table+spectral efficiency corresponding to a CQI number 2 in the first CQI table)/2. The possible spectral efficiency corresponding to the MCS number 1 is less than the spectral efficiency corresponding to the CQI number 2 in the first CQI table and is greater than the spectral efficiency corresponding to the CQI number 1 in the first CQI table. It can be learned from the foregoing description that, in this way, when the network device receives the CQI number 1 or the CQI number 2 sent by the terminal device, the network device may further schedule the terminal device based on the MCS number 1 corresponding to the intermediate spectral efficiency, so that the terminal device can still meet a URLLC service requirement. Therefore, system efficiency and reliability of URLLC service transmission are ensured.

In this embodiment of this application, an MCS number that is of the entry not included in the first CQI table and that is in the first MCS table is one of the following: an MCS number 0, an MCS number 1, and an MCS number 3.

Optionally, the MCS number 3 is the entry excluded in the first CQI table. According to a design in ascending order of spectral efficiency, possible spectral efficiency corresponding to the MCS number 3 is equal to (spectral efficiency corresponding to a CQI number 2 in the first CQI table+spectral efficiency corresponding to a CQI number 3 in the first CQI table)/2. The possible spectral efficiency corresponding to the MCS number 3 is less than the spectral efficiency corresponding to the CQI number 3 in the first CQI table and is greater than the spectral efficiency corresponding to the CQI number 2 in the first CQI table. It can be learned from the foregoing description that, in this way, when the network device receives the CQI number 2 or the CQI number 3 sent by the terminal device, the network device may further schedule the terminal device based on the MCS number 3 corresponding to the intermediate spectral efficiency, so that the terminal device can still meet a URLLC service requirement. Therefore, system efficiency and reliability of URLLC service transmission are ensured. It can be understood that, because spectral efficiency retains only four decimal places, if a value of (spectral efficiency corresponding to the CQI number 2 in the first CQI table+spectral efficiency corresponding to the CQI number 3 in the first CQI table)/2 includes five or more decimal places, the value is rounded off to obtain spectral efficiency with four decimal places, and it may be considered that the spectral efficiency corresponding to the MCS number 3 is still equal to (spectral efficiency corresponding to the CQI number 2 in the first CQI table+spectral efficiency corresponding to the CQI number 3 in the first CQI table)/2.

It can be understood that a code rate or spectral efficiency corresponding to a newly added entry herein is not included in the first CQI table. However, a specific adding location may be the MCS number 0, 1, or 3, or may be another location. If the entry is added to the another location, the another location is within the protection scope of this application.

Spectral efficiency of an entry of the MCS number 0 in the first MCS table is less than spectral efficiency of an entry of the CQI number 1 in the first CQI table.

For example, the spectral efficiency of the entry of the CQI number 1 in the first CQI table is 0.0781, a code rate corresponding to QPSK modulation multiplied by 1024 is 40, and a code rate corresponding to pi/2 BPSK modulation multiplied by 1024 is 80.

The spectral efficiency of the entry of the MCS number 0 in the first MCS table is 0.0195, a code rate corresponding to QPSK modulation multiplied by 1024 is 10, and a code rate corresponding to pi/2 BPSK modulation multiplied by 1024 is 20. Alternatively, the spectral efficiency of the entry of the MCS number 0 in the first MCS table is 0.0391, a code rate corresponding to QPSK modulation multiplied by 1024 is 20, and a code rate corresponding to pi/2 BPSK modulation multiplied by 1024 is 40. Alternatively, the spectral efficiency of the entry of the MCS number 0 in the first MCS table is 0.0586, a code rate corresponding to QPSK modulation multiplied by 1024 is 30, and a code rate corresponding to pi/2 BPSK modulation multiplied by 1024 is 60. Alternatively, the spectral efficiency of the entry of the MCS number 0 in the first MCS table is 0.0625, a code rate corresponding to QPSK modulation multiplied by 1024 is 32, and a code rate corresponding to pi/2 BPSK modulation multiplied by 1024 is 64. Alternatively, the spectral efficiency of the entry of the MCS number 0 in the first MCS table is 0.0313, a code rate corresponding to QPSK modulation multiplied by 1024 is 16, and a code rate corresponding to pi/2 BPSK modulation multiplied by 1024 is 32. Alternatively, the spectral efficiency of the entry of the MCS number 0 in the first MCS table is 0.0156, a code rate corresponding to QPSK modulation multiplied by 1024 is 8, and a code rate corresponding to pi/2 BPSK modulation multiplied by 1024 is 16. It should be understood that the foregoing value may alternatively correspond to another MCS number. This is not limited in this application. To be specific, an MCS number that can correspond to the foregoing spectral efficiency may be greater than or equal to 0 and less than or equal to 31.

In this way, when the network device receives the CQI number 1 or the CQI number 0 sent by the terminal device, the network device may further schedule the terminal device at a lower code rate, so that the terminal device can still meet a URLLC service requirement. Therefore, reliability of URLLC service transmission is ensured.

In this embodiment of this application, a quantity of entries included in the first MCS table is the same as a quantity of entries included in the first CQI table, or a quantity of entries included in the first MCS table is less than or equal to 16 and is greater than a quantity of entries included in the first CQI table.

Optionally, if there are 16 entries in the first CQI table, there are 16 entries in the first MCS table. If there are eight entries in the first CQI table, there are eight entries in the first MCS table.

It can be understood that, in this case, the 16 entries in the first CQI table include one "out of range" entry: index 0, and 15 valid entries: index 1 to index 15. All the 16 entries in the first MCS table are 16 valid entries. Alternatively, in this case, the eight entries in the first CQI table include one "out of range" entry: index 0, and seven valid entries: index 1 to index 7. All the eight entries in the first MCS table are eight valid entries. Then, the quantity of entries in the first MCS table is the same as the quantity of entries in the first CQI table. However, the first MCS table includes a valid entry excluded in the CQI table. The valid entry that is included in the first MCS table but not included in the first CQI table may be a reserved entry, that is, includes no modulation order, code rate, and spectral efficiency. In this case, a meaning of the valid entry is: using a modulation order, a code rate, and spectral efficiency that are used in last transmission. Alternatively, the valid entry that is included in the first MCS table but not included in the first CQI table may be an MCS index 0, where a code rate and/or spectral efficiency of the MCS index 0 are/is less than those/that of a CQI index 1. In another example, there is only one valid entry that is included in the first MCS table but not included in the first CQI table, and a value of the valid entry may be obtained by using an MCS index A corresponding to the valid entry. A code rate of the MCS index A may be equal to ⌈(code rate of an MCS index A−1+code rate of an MCS index A+1)/2⌉, and/or spectral efficiency of the MCS index A is equal to (spectral efficiency of an MCS index A−1+ spectral efficiency of an MCS index A+1)/2. Alternatively, a code rate of the MCS index A is equal to ⌈(code rate of a CQI index A+code rate of a CQI index A+1)/2⌉, and/or spectral efficiency of the MCS index A is equal to (spectral efficiency of a CQI index A+spectral efficiency of a CQI index A+1)/2. It should be noted that all other entries in the first MCS table are valid entries in the CQI table. Optionally, when A is 1, the MCS index 1 that needs to be added is an entry with a low code rate and low spectral efficiency. Correspondingly, resource utilization and reliability of a URLLC service can be improved.

It should be noted that, because spectral efficiency retains only four decimal places, when the spectral efficiency of the MCS index 1 is obtained, a calculated result needs to be rounded off, to retain four decimal places. For example, if the spectral efficiency of the MCS index 1 is 1.56444, 1.5644 is finally obtained. For example, if the spectral efficiency of the MCS index 1 is 1.56445, 1.5645 is finally obtained.

Optionally, if there are eight entries in the first CQI table, there are 16 entries in the first MCS table. Optionally, if there are four entries in the first CQI table, there are eight entries in the first MCS table.

It can be understood that, in this case, the 8 entries in the first CQI table include one "out of range" entry: index 0, and seven valid entries: index 1 to index 7. All the 16 entries in the first MCS table are 16 valid entries, and the seven entries are correspondingly: CQI index 1 to CQI index 7.

A code rate of an MCS index B is equal to:
⌈(code rate of an MCS index B−1+code rate of an MCS index B+1)/2⌉; and/or spectral efficiency of the MCS index B is equal to:
(spectral efficiency of an MCS index B−1+spectral efficiency of an MCS index B+1)/2.

A code rate of an MCS index C is equal to:
⌈(code rate of an MCS index C−1+code rate of an MCS index C+2)/2⌉; or
⌈(code rate of an MCS index C−1+code rate of an MCS index C+2)/2⌋.

A last valid entry may be a reserved entry, or may be an entry obtained in a manner of obtaining the index B or the index C, or may be an entry obtained in a manner of obtaining the MCS index X or the MCS index X+1 in the communication method shown in FIG. 3. This is not limited in this embodiment of this application.

In this embodiment of this application, in the entries included in the first CQI table and/or the first MCS table, a corresponding value obtained by multiplying a code rate by 1024 includes the following value: 30, or includes at least one of the following values: 35, 37, 40, 46, 49, 68, 70, 90, and 95.

Optionally, in the entries included in the first CQI table, corresponding values obtained by multiplying code rates by 1024 include the following values: two values in 30 to 39, less than or equal to two values in 40 to 49, less than or equal to two values in 60 to 70, and less than or equal to two values in 89 to 96. A code rate in another range is not limited.

Optionally, in the entries included in the first MCS table, corresponding values obtained by multiplying code rates by 1024 include the following values: three values in 30 to 39, less than or equal to three values in 40 to 49, less than or equal to two values in 60 to 70, and less than or equal to two values in 89 to 96. A code rate in another range is not limited.

least one of 45 and 50, and/or at least one of 65 and 70, and/or at least one of 78 and 80, and/or at least one of 90 and 95.

Through application of this solution, resource utilization and transmission reliability at a low signal-to-noise ratio can be improved.

The following describes, by using some examples, the MCS table provided in this embodiment of this application.

Table C5-1 is an MCS table according to an embodiment of this application. The MCS table is corresponding to 5 bits. To be specific, the MCS table includes 32 entries.

TABLE C5-1

| Old MCS index | Possibility 1 | Possibility 2 | Possibility 3 | Possibility 4 | Possibility 5 | Possibility 6 | Possibility 7 | Possibility 8 | Modulation order | Code rate × [1024] | Spectral efficiency |
|---|---|---|---|---|---|---|---|---|---|---|---|
|  | 0 | 0 |  |  | 0 | 0 | 0 | 0 | 2 | 30 | 0.0586 |
|  |  |  |  | 1 | 1 |  | 1 | 1 | 2 | 35 | 0.0684 |
|  | 1 | 1 | 0 | 2 | 2 | 1 | 2 | 2 | 2 | 40 | 0.0781 |
|  |  |  | 1 | 3 |  |  | 3 |  | 2 | 45 | 0.0879 |
|  | 2 | 2 |  | 4 | 3 | 2 |  | 3 | 2 | 50 | 0.0977 |
|  |  |  | 2 | 5 |  |  | 4 |  | 2 | 55 | 0.1074 |
|  | 3 | 3 |  | 6 | 4 | 3 |  | 4 | 2 | 60 | 0.1172 |
|  |  |  |  |  |  |  |  |  | 2 | 65 | 0.127 |
|  | 4 | 4 | 3 | 7 | 5 | 4 | 5 | 5 | 2 | 70 | 0.1367 |
|  |  |  |  |  |  |  |  |  | 2 | 75 | 0.1465 |
|  |  | 5 |  |  | 6 |  |  |  | 2 | 78 | 0.1523 |
|  | 5 |  |  |  |  |  |  |  | 2 | 80 | 0.1563 |
|  |  |  |  |  |  |  |  |  | 2 | 85 | 0.166 |
|  | 6 | 6 | 4 | 8 | 7 | 5 | 6 | 6 | 2 | 90 | 0.1758 |
|  |  |  |  |  | 8 | 6 |  |  | 2 | 105 | 0.2051 |
| 0 | 7 | 7 | 5 | 9 | 9 | 7 | 7 | 7 | 2 | 120 | 0.2344 |
| 1 | 8 | 8 | 6 | 10 | 10 | 8 | 8 | 8 | 2 | 157 | 0.3066 |
| 2 | 9 | 9 | 7 | 11 | 11 | 9 | 9 | 9 | 2 | 193 | 0.3770 |
| 3 | 10 | 10 | 8 | 12 | 12 | 10 | 10 | 10 | 2 | 251 | 0.4902 |
| 4 | 11 | 11 | 9 | 13 | 13 | 11 | 11 | 11 | 2 | 308 | 0.6016 |
| 5 | 12 | 12 | 10 | 14 | 14 | 12 | 12 | 12 | 2 | 379 | 0.7402 |
| 6 | 13 | 13 | 11 | 15 | 15 | 13 | 13 | 13 | 2 | 449 | 0.8770 |
| 7 | 14 | 14 | 12 | 16 | 16 | 14 | 14 | 14 | 2 | 526 | 1.0273 |
| 8 | 15 | 15 | 13 | 17 | 17 | 15 | 15 | 15 | 2 | 602 | 1.1758 |
| 9 | 16 | 16 | 14 | 18 | 18 | 16 | 16 | 16 | 2 | 679 | 1.3262 |
| 10 | 17 | 17 | 15 | 19 | 19 | 17 | 17 | 17 | 4 | 340 | 1.3281 |
| 11 | 18 | 18 | 16 | 20 | 20 | 18 | 18 | 18 | 4 | 378 | 1.4766 |
| 12 | 19 | 19 | 17 | 21 | 21 | 19 | 19 | 19 | 4 | 434 | 1.6953 |
| 13 | 20 | 20 | 18 | 22 | 22 | 20 | 20 | 20 | 4 | 490 | 1.9141 |
| 14 | 21 | 21 | 19 | 23 | 23 | 21 | 21 | 21 | 4 | 553 | 2.1602 |
| 15 | 22 | 22 | 20 | 24 | 24 | 22 | 22 | 22 | 4 | 616 | 2.4063 |
| 16 | 23 | 23 | 21 | 25 | 25 | 23 | 23 | 23 | 4 | 658 | 2.5703 |
| 17 | 24 | 24 | 22 | 26 | 26 | 24 | 24 | 24 | 6 | 438 | 2.5664 |
| 18 | 25 | 25 | 23 | 27 | 27 | 25 | 25 | 25 | 6 | 466 | 2.7305 |
| 19 | 26 | 26 | 24 | 28 | 28 | 26 | 26 | 26 | 6 | 517 | 3.0293 |
| 20 | 27 | 27 | 25 | 29 | 29 | 27 | 27 | 27 | 6 | 567 | 3.3223 |
| 21 | 28 | 28 | 26 | 30 | 30 | 28 | 28 | 28 | 6 | 616 | 3.6094 |
| 22 | 29 | 29 | 27 | 31 | 31 | 29 | 29 | 29 | 6 | 666 | 3.9023 |
| 23 | 30 | 30 | 28 |  |  | 30 | 30 | 30 | 6 | 719 | 4.2129 |
| 24 | 31 | 31 | 29 |  |  | 31 | 31 | 31 | 6 | 772 | 4.5234 |
| 25 |  |  | 30 |  |  |  |  |  | 6 | 822 | 4.8164 |
| 26 |  |  | 31 |  |  |  |  |  | 6 | 873 | 5.1152 |
| 27 |  |  |  |  |  |  |  |  | 6 | 910 | 5.3320 |
| 28 |  |  |  |  |  |  |  |  | 6 | 948 | 5.5547 |
| 29 |  |  |  |  |  |  |  |  | 2 | reserved |  |
| 30 |  |  |  |  |  |  |  |  | 4 | reserved |  |
| 31 |  |  |  |  |  |  |  |  | 6 | reserved |  |
|  |  |  |  |  |  |  |  |  |  | reserved |  |

Optionally, in the entries included in the first CQI table, a value obtained by multiplying a code rate by 1024 includes the following value: at least one of 35, 37, and 40, and/or at least one of 46 and 49, and/or at least one of 68 and 70, and/or at least one of 90 and 95.

Optionally, in the entries included in the first CQI table, a value obtained by multiplying a code rate by 1024 includes the following value: at least one of 30, 35, and 40, and/or at One row in Table C5-1 may be understood as one MCS. It may be learned that one MCS corresponds to one MCS index and a series of parameters. In addition, in the MCS table, parameters corresponding to one MCS may include other parameters in addition to the several parameters shown in Table C5-1. However, the other parameters are not significantly associated with the solutions of this application, and therefore are not listed one by one.

In Table C5-1, a corresponding value of each possibility is an MCS index in a new MCS table, and an old MCS index represents an index of a corresponding entry in an original MCS table. It can be understood that Table C5-1 may actually include a plurality of MCS tables. For example, four columns: "possibility 1", "modulation order", "code rate", and "spectral efficiency", may form an MCS table. For another example, four columns: "possibility 2", "modulation order", "code rate", and "spectral efficiency", may also form an MCS table. In other words, each possibility may belong to an independent MCS table. In Table C5-1, all entries corresponding to MCS indexes that have no correspondence with an old MCS index are newly added.

In newly added entries in Table C5-1, a correspondence between an MCS index and each parameter is merely an example. For example, for the possibility 2, a modulation order corresponding to an MCS index 6 may not be 2, or a corresponding value obtained by multiplying a code rate by 1024 may not be 90. This is not specifically limited.

Table C5-3 is an MCS table according to an embodiment of this application. The MCS table is corresponding to 4 bits. To be specific, the MCS table includes 16 entries.

the some entries correspond to equally spaced CQI numbers; or the some entries correspond to nonconsecutive CQI numbers, and are at least one entry other than an entry corresponding to a largest CQI number in all entries whose modulation schemes are 64QAM in the second CQI table; or the some entries correspond to consecutive CQI numbers, and are at least one entry other than an entry corresponding to a largest CQI number in all entries whose modulation schemes are 64QAM in the second CQI table; or the some entries include an entry corresponding to a largest CQI number in all entries whose modulation schemes are 64QAM in the second CQI table; or the some entries include N entries whose modulation schemes are 64QAM in the second CQI table and that correspond to consecutive CQI numbers, and a first entry in the N consecutive entries is an entry whose modulation scheme is 64QAM in the second CQI table and that corresponds to a smallest CQI number, where N is a positive integer greater than or equal to 1 and less than or equal to 5.

TABLE C5-3

| Possibility 1 | Possibility 2 | Possibility 3 | Possibility 4 | Possibility 5 | Possibility 6 | Possibility 7 | Modulation order | Code rate × [1024] | Spectral efficiency |
|---|---|---|---|---|---|---|---|---|---|
| | | | 0 | 0 | | 0 | 2 | 30 | 0.0586 |
| | | 0 | 1 | | 0 | 1 | 2 | 35 | 0.0684 |
| | 0 | 1 | 2 | 1 | 1 | 2 | 2 | 40 | 0.0781 |
| 0 | 1 | | | | | | 2 | 45 | 0.0879 |
| 1 | | 2 | 3 | 2 | 2 | 3 | 2 | 50 | 0.0977 |
| 2 | 2 | | | | | | 2 | 55 | 0.1074 |
| | | | | 3 | | 4 | 2 | 60 | 0.1172 |
| 3 | | 3 | 4 | | 3 | | 2 | 65 | 0.127 |
| | 3 | | | | | | 2 | 70 | 0.1367 |
| | | | | | | | 2 | 75 | 0.1465 |
| 4 | | | | 4 | 4 | 5 | 2 | 78 | 0.1523 |
| | | | | | | | 2 | 80 | 0.1563 |
| | | 4 | 5 | | | | 2 | 85 | 0.166 |
| | 4 | | | | 5 | 6 | 2 | 90 | 0.1758 |
| 5 | | | | 5 | | | 2 | 96 | 0.1875 |
| 6 | 5 | 5 | 6 | 6 | 6 | 7 | 2 | 120 | 0.2344 |
| 7 | 6 | 6 | 7 | 7 | 7 | 8 | 2 | 193 | 0.377 |
| 8 | 7 | 7 | 8 | 8 | 8 | 9 | 2 | 308 | 0.6016 |
| 9 | 8 | 8 | 9 | 9 | 9 | 10 | 2 | 449 | 0.877 |
| 10 | 9 | 9 | 10 | 10 | 10 | 11 | 2 | 602 | 1.1758 |
| 11 | 10 | 10 | 11 | 11 | 11 | 12 | 4 | 378 | 1.4766 |
| 12 | 11 | 11 | 12 | 12 | 12 | 13 | 4 | 490 | 1.9141 |
| 13 | 12 | 12 | 13 | 13 | 13 | 14 | 4 | 616 | 2.4063 |
| 14 | 13 | 13 | 14 | 14 | 14 | 15 | 6 | 466 | 2.7305 |
| 15 | 14 | 14 | 15 | 15 | 15 | | 6 | 567 | 3.3223 |
| | | | | | | | 6 | 666 | 3.9023 |
| | | | | | | | 6 | 772 | 4.5234 |
| | | | | | | | 6 | 873 | 5.1152 |
| | | | | | | | 6 | 948 | 5.5547 |
| | 15 | 15 | | | | | | reserved | |

A question similar to that in Table C5-1 is no longer described. For details, refer to the description of Table C5-1.

In newly added entries in Table C5-3, a correspondence between an MCS index and each parameter is merely an example. For example, for the possibility 1, a modulation order corresponding to an MCS index 0 may not be 2, or a corresponding code rate value obtained by multiplying a code rate by 1024 may not be 45. This is not specifically limited.

In this embodiment of this application, all entries whose modulation schemes are 64QAM in the first CQI table are some entries of 64QAM in a second CQI table, and the some entries of 64QAM in the second CQI table are as follows:

Optionally, the terminal device determines the first CQI table. Further, the terminal device determines the first CQI table from a CQI table set, and the CQI table set includes the first CQI table and the second CQI table. Alternatively, the terminal device determines the first CQI table based on a first message, and tables that are in the first message and that can be configured for the terminal device includes at least the first CQI table and the second CQI table.

Optionally, the network device determines the first CQI table. Further, the network device determines the first CQI table from a CQI table set, and the CQI table set includes the first CQI table and the second CQI table. Alternatively, the network device determines the first CQI table based on a first message, and the first message is the first CQI table or the second CQI table configured by the network device for the terminal device.

It can be understood that the some entries of 64QAM in the second CQI table are some of all entries of 64QAM in the second CQI table.

Optionally, the second CQI table is Table C6, or may be another preconfigured table.

It can be understood that, that all entries whose modulation schemes are 64QAM in the first CQI table are some entries of 64QAM in a second CQI table means that all the entries whose modulation schemes are 64QAM in the first CQI table originate from entries of 64QAM in the second CQI table. In addition, the entries whose modulation schemes are 64QAM in the first CQI table are a subset of the entries of 64QAM in the second CQI table.

G1: The some entries correspond to equally spaced CQI numbers.

It can be understood that the some entries corresponding to 64QAM include at least three entries. The some entries of 64QAM in the second CQI table are CQI numbers 10, 12, and 14 in the second CQI table.

Alternatively, the some entries of 64QAM in the second CQI table are CQI numbers 11, 13, and 15 in the second CQI table.

Further, the entries of 64QAM in the first CQI table are the CQI numbers 10, 12, and 14 in the second CQI table, or the CQI numbers 11, 13, and 15 in the second CQI table. CQI numbers of these entries in the first CQI table are not limited in this application. To be specific, code rates (code rates×1024) and spectral efficiency corresponding to the entries of 64QAM in the first CQI table include values corresponding to the CQI numbers in the foregoing second CQI table. For example, a CQI number of an entry of 64QAM in the first CQI table is XXX3. If XXX3 corresponds to a CQI number 15 in the second CQI table, a code rate corresponding to XXX3 is 948, and spectral efficiency is 5.5547.

G2: The some entries include N entries whose modulation schemes are 64QAM in the second CQI table and that correspond to consecutive CQI numbers, and a first entry in the N consecutive entries is an entry whose modulation scheme is 64QAM in the second CQI table and that corresponds to a smallest CQI number, where N is a positive integer greater than or equal to 1 and less than or equal to 5.

N=1, and the some entries of 64QAM in the second CQI table are CQI numbers 10 and 11 in the second CQI table; or N=2, and the some entries of 64QAM in the second CQI table are CQI numbers 10 and 11 in the second CQI table; or N=3, and the some entries of 64QAM in the second CQI table are CQI numbers 10, 11, and 12 in the second CQI table; or N=4, and the some entries of 64QAM in the second CQI table are CQI numbers 10, 11, 12, and 13 in the second CQI table; or N=5, and the some entries of 64QAM in the second CQI table are CQI numbers 10, 11, 12, 13, and 14 in the second CQI table.

Further, the entries of 64QAM in the first CQI table are the CQI numbers 10 and 11 in the second CQI table, or the CQI numbers 10, 11, and 12 in the second CQI table, or the CQI numbers 10, 11, 12, and 13 in the second CQI table, or the CQI numbers 10, 11, 12, 13, and 14 in the second CQI table. CQI numbers of these entries in the first CQI table are not limited in this application. To be specific, code rates (code rates×1024) and spectral efficiency corresponding to the entries of 64QAM in the first CQI table include values corresponding to the CQI numbers in the foregoing second CQI table. For example, CQI numbers of entries of 64QAM in the first CQI table are XXX1 to XXX3. If XXX1 to XXX3 correspond to CQI numbers 10 to 12 in the second CQI table, a code rate corresponding to XXX3 is 666, and spectral efficiency is 3.9023. For another value, refer to Table 10. Details are not described again.

G3: The some entries correspond to nonconsecutive CQI numbers, and are at least one entry other than an entry corresponding to a largest CQI number in all entries whose modulation schemes are 64QAM in the second CQI table.

The some entries of 64QAM in the second CQI table are CQI numbers 10 and 12 in the second CQI table, or CQI numbers 10 and 13 in the second CQI table, or CQI numbers 10 and 14 in the second CQI table; or the some entries of 64QAM in the second CQI table are CQI numbers 11 and 13 in the second CQI table, or CQI numbers 11 and 14 in the second CQI table; or the some entries of 64QAM in the second CQI table are CQI numbers 12 and 14 in the second CQI table; or the some entries of 64QAM in the second CQI table are CQI numbers 10, 11, and 13 in the second CQI table, or the some entries of 64QAM in the second CQI table are CQI numbers 10, 11, and 14 in the second CQI table; or the some entries of 64QAM in the second CQI table are CQI numbers 10, 12, and 13 in the second CQI table, or the some entries of 64QAM in the second CQI table are CQI numbers 10, 12, and 14 in the second CQI table; or the some entries of 64QAM in the second CQI table are CQI numbers 10, 13, and 14 in the second CQI table; or the some entries of 64QAM in the second CQI table are CQI numbers 11, 12, and 14 in the second CQI table; or the some entries of 64QAM in the second CQI table are CQI numbers 10, 11, 12, and 14 in the second CQI table, or the some entries of 64QAM in the second CQI table are CQI numbers 10, 12, 13, and 14 in the second CQI table, or the some entries of 64QAM in the second CQI table are CQI numbers 10, 11, 13, and 14 in the second CQI table.

Further, the entries of 64QAM in the first CQI table are the CQI numbers 10, 12, 13, and 14 in the second CQI table, or others described above. CQI numbers of these entries in the first CQI table are not limited in this application. To be specific, code rates (code rates×1024) and spectral efficiency corresponding to the entries of 64QAM in the first CQI table include values corresponding to the CQI numbers in the foregoing second CQI table. For example, CQI numbers of entries of 64QAM in the first CQI table are XXX1 to XXX4. If XXX1 to XXX4 correspond to CQI numbers 10, 12, 13, and 14 in the second CQI table, a code rate corresponding to XXX4 is 873, and spectral efficiency is 5.1152. For another value, refer to Table 10. Details are not described again.

G4: The some entries include an entry corresponding to a largest CQI number in all entries whose modulation schemes are 64QAM in the second CQI table.

It can be understood that the some entries of 64QAM in the second CQI table include at least the entry corresponding to the largest CQI number in all the entries whose modulation schemes are 64QAM in the second CQI table. To be specific, the some entries include at least an entry of a CQI number 15 in the second CQI table.

In other words, the first CQI table includes at least the entry of the CQI number 15 in the second CQI table. It can be understood that the some entries of 64QAM in the second CQI table may alternatively include two, three, or four entries of numbers 10 to 14, but does not include all entries of 10 to 14.

G5: The some entries correspond to consecutive CQI numbers, and are at least one entry other than an entry corresponding to a largest CQI number in all entries whose modulation schemes are 64QAM in the second CQI table.

N=1, and the some entries of 64QAM in the second CQI table are CQI numbers 10 and 11 in the second CQI table; or N=2, and the some entries of 64QAM in the second CQI table are CQI numbers 10 and 11 in the second CQI table; or N=3, and the some entries of 64QAM in the second CQI table are CQI numbers 10, 11, and 12 in the second CQI table; or N=4, and the some entries of 64QAM in the second CQI table are CQI numbers 10, 11, 12, and 13 in the second CQI table; or N=5, and the some entries of 64QAM in the second CQI table are CQI numbers 10, 11, 12, 13, and 14 in the second CQI table.

For ease of understanding, the entries that are included in the first CQI table and whose modulation schemes are 64QAM are described based on Table 2 (namely, the second CQI table). For example, there may be one or more entries whose modulation schemes are 64QAM.

All the entries whose modulation schemes are 64QAM in the first CQI table are the some entries of 64QAM in the second CQI table, and the some entries of 64QAM in the second CQI table are as follows:

numbers of the some entries whose modulation schemes are 64QAM in the second CQI table are a CQI number 10, a CQI number 12, and a CQI number 14, or a CQI number 11, a CQI number 13, and a CQI number 15 in the second CQI table; or numbers of the some entries whose modulation schemes are 64QAM in the second CQI table are a CQI number 10, a CQI number 11, a CQI number 12, a CQI number 13, and a CQI number 15, or a CQI number 10, a CQI number 11, a CQI number 14, and a CQI number 15, or a CQI number 11, a CQI number 12, a CQI number 13, a CQI number 14, and a CQI number 15, or a CQI number 10, a CQI number 11, a CQI number 12, a CQI number 14, and a CQI number 15 in the second CQI table; or numbers of the some entries whose modulation schemes are 64QAM in the second CQI table are a CQI number 10, a CQI number 11, a CQI number 12, a CQI number 13, and a CQI number 14, or a CQI number 10, a CQI number 11, a CQI number 12, and a CQI number 13, or a CQI number 10, a CQI number 11, and a CQI number 12, or a CQI number 10 and a CQI number 11 in the second CQI table.

In this embodiment of this application, each entry in the first MCS table corresponds to one modulation scheme, one code rate, and one piece of spectral efficiency; or a modulation scheme of an entry with a largest MCS number in the first MCS table is QPSK, and a code rate and spectral efficiency are reserved; or a modulation scheme of an entry with a largest MCS number in the first MCS table is 16QAM and a code rate and spectral efficiency are reserved, and a modulation scheme of an entry with a second largest MCS number in the first MCS table is QPSK and a code rate and spectral efficiency are reserved; or a modulation scheme of an entry with a largest MCS number in the first MCS table is 64QAM and a code rate and spectral efficiency are reserved, and a modulation scheme of an entry with a second largest MCS number in the first MCS table is QPSK and a code rate and spectral efficiency are reserved; or a modulation scheme, a code rate, and spectral efficiency of at least one entry in the first MCS table are reserved.

Specifically, if the first CQI table includes CQI numbers 0 to 15, the second CQI table also includes the CQI numbers 0 to 15.

Optionally, the modulation scheme, the code rate, and the spectral efficiency of the at least one entry in the first MCS table are reserved. For example, a number of an entry corresponding to "reserved" in the first MCS table may be the MCS number 0 or a last MCS number.

It can be understood that a modulation scheme, a code rate, and spectral efficiency that correspond to a notified MCS number in an MCS table are reserved. In this case, it can be understood that a modulation scheme, a code rate, and spectral efficiency in current transmission of a HARQ process number are a modulation scheme, a code rate, and spectral efficiency last received in a valid MCS corresponding to transmission of the same HARQ process number. This is because transmissions corresponding to different HARQ process numbers are considered as different transmissions. Optionally, a modulation scheme, a code rate, and spectral efficiency in current transmission of a HARQ process number are a modulation scheme, a code rate, and spectral efficiency last received in a valid MCS corresponding to transmission that does not correspond to the HARQ process number. In this case, the network device may not specify a HARQ process number when notifying an MCS. In this case, the notified MCS may correspond to an MCS of any HARQ process number.

Optionally, a modulation scheme, a code rate, and spectral efficiency corresponding to an MCS number that are used for retransmission are reserved. The modulation scheme, the code rate, and the spectral efficiency that are used for the retransmission are a modulation scheme, a code rate, and spectral efficiency corresponding to an MCS number that are used for initial transmission. This has the following advantage: a transport block in the retransmission is the same as a transport block in the initial transmission. In this way, a size of the transport block is not determined based on a time/frequency-domain resource allocated for the retransmission, and the network device may allocate more time/frequency-domain resources to transmit the transport block in the retransmission. In contrast, when a modulation scheme, a code rate, and spectral efficiency corresponding to an MCS number that are used for retransmission are not reserved, an indicated time/frequency-domain resource affects the terminal device in determining a size of a transport block. In this case, to indicate a transport block the same as a transport block in initial transmission, the time/frequency-domain resource indicated by the network device is limited. This is not conducive to a requirement on high reliability in URLLC.

For example, referring to FIG. 4-1, if zeroth transmission scheduled by the network device is initial transmission and a corresponding MCS is a non-reserved value, and scheduled first transmission is retransmission and a corresponding MCS is a reserved value, the value of the MCS corresponding to the zeroth transmission may be used for the first transmission, and is specifically a modulation scheme, a code rate, spectral efficiency, and the like corresponding to the zeroth transmission. Alternatively, referring to FIG. 4-2, if zeroth transmission scheduled by the network device is initial transmission and a corresponding MCS is a non-reserved value, and both scheduled first transmission and scheduled second transmission are retransmission and corresponding MCSs are reserved values, for example, the value of the MCS corresponding to the zeroth transmission is used for the second transmission, and is specifically a modulation scheme, a code rate, spectral efficiency, and the like corresponding to the zeroth transmission.

In this embodiment of this application, the first MCS table is determined based on a first MCS offset and a second MCS table, or a code rate corresponding to at least one MCS number in the first MCS table is determined based on a first MCS offset and a second MCS table. The first MCS offset is sent by the network device.

Optionally, a quantity of entries in the second MCS table is greater than or equal to the quantity of entries in the first MCS table. The entries included in the first MCS table are a subset of the entries included in the second MCS table.

Optionally, the first MCS offset may be configured for a time/frequency-domain resource. The frequency-domain resource may be a carrier (CC), a bandwidth part (BWP), a serving cell, or one or more resource blocks (RBs). The time-domain resource may be one or more symbols, or one or more slots.

Optionally, the first MCS offset may be configured for a BLER. For example, a first MCS offset configured for 10e-5 is AA1, a first MCS offset configured for 10e-4 is AA2, a first MCS offset configured for 10e-3 is AA3, and a first MCS offset configured for 10e-2 is AA4.

Optionally, the first MCS offset may be configured for the first MCS table. For example, the first MCS offset configured for the first MCS table is AA5, and a first MCS offset configured for a third MCS table is AA6.

It can be understood that the first MCS offset is sent by the network device by using higher layer signaling. The terminal device receives the first MCS offset by using the higher layer signaling sent by the network device.

Optionally, the first MCS offset may be used to determine one or more modulation schemes, code rates, and spectral efficiency that correspond to one or more MCS numbers BB1. BB1 is a positive integer greater than or equal to 0. For example, modulation schemes, code rates, and spectral efficiency that correspond to an MCS number 0 to an MCS number 4 are determined based on the first MCS offset.

Optionally, the first CQI table is determined based on a first CQI offset and the second CQI table, or a code rate corresponding to at least one CQI number in the first CQI table is determined based on a first CQI offset and the second CQI table.

Optionally, a quantity of entries in the second CQI table is greater than or equal to the quantity of entries in the first CQI table. The entries included in the first CQI table are a subset of the entries included in the second CQI table.

Optionally, the first CQI offset may be configured for a time/frequency-domain resource. The frequency-domain resource may be a carrier (CC), a bandwidth part (BWP), a serving cell, or one or more resource blocks (RBs). The time-domain resource may be one or more symbols, or one or more slots.

Optionally, the first CQI offset may be configured for a BLER. For example, a first CQI offset configured for 10e-5 is AA7, a first CQI offset configured for 10e-4 is AA8, a first CQI offset configured for 10e-3 is AA9, and a first CQI offset configured for 10e-2 is AA10.

Optionally, the first CQI offset may be configured for the first CQI table. For example, the first CQI offset configured for the first CQI table is AA11, and a first CQI offset configured for a third CQI table is AA12.

It can be understood that the first CQI offset is sent by the network device by using higher layer signaling. The terminal device receives the first CQI offset by using the higher layer signaling sent by the network device. The higher layer signaling may be signaling sent by a higher-layer protocol layer. The higher-layer protocol layer is at least one of all protocol layers above a physical layer. The higher-layer protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS).

Optionally, the first CQI offset may be used to determine one or more modulation schemes, code rates, and spectral efficiency that correspond to one or more CQI numbers BB2 in the first CQI table. BB2 is a positive integer greater than or equal to 1. For example, modulation schemes, code rates, and spectral efficiency that correspond to a CQI number 1 to a CQI number 15 are determined based on the first CQI offset.

Optionally, modulation schemes, code rates, and spectral efficiency that correspond to CQI numbers whose modulation schemes are 16QAM, and/or QPSK, and/or BPSK in the first CQI table are determined based on the first CQI offset. For example, modulation schemes, code rates, and spectral efficiency that correspond to a CQI number 1 and a CQI number 2 whose modulation schemes are BPSK are determined based on the first CQI offset. For example, modulation schemes, code rates, and spectral efficiency that correspond to a CQI number 0 and a CQI number 9 whose modulation schemes are QPSK are determined based on the first CQI offset. Table C13 shows an example of determining the first CQI table based on the second CQI table and the first CQI offset.

TABLE C13

| First CQI number (CQI index) | Second CQI number (CQI index) | Modulation scheme (modulation) | Code rate × 1024 (code rate × 1024) | Spectral efficiency (efficiency) |
|---|---|---|---|---|
| | 0 | Out of range (out of range) | | |
| 1 | 1 | QPSK | 30 | 0.0586 |
| 2 | 2 | QPSK | 40 | 0.0781 |
| 3 | 3 | QPSK | 50 | 0.0977 |
| 4 | 4 | QPSK | 60 | 0.1172 |
| 5 | 5 | QPSK | 78 | 0.1523 |
| 6 | 6 | QPSK | 90 | 0.1758 |
| 7 | 7 | QPSK | 120 | 0.2344 |
| 8 | 8 | QPSK | 193 | 0.3770 |
| 9 | 9 | QPSK | 308 | 0.6016 |
| | 10 | QPSK | 449 | 0.8770 |
| | 11 | QPSK | 602 | 1.1758 |
| 10 | 12 | 16QAM | 378 | 1.4766 |
| 11 | 13 | 16QAM | 490 | 1.9141 |
| 12 | 14 | 16QAM | 616 | 2.4063 |
| 13 | 15 | 64QAM | 466 | 2.7305 |
| 14 | 16 | 64QAM | 567 | 3.3223 |
| 15 | 17 | 64QAM | 666 | 3.9023 |
| | 18 | 64QAM | 772 | 4.5234 |
| | 19 | 64QAM | 873 | 5.1152 |
| | 20 | 64QAM | 948 | 5.5547 |

In Table C13, the first CQI number represents a CQI index in the first CQI table, and the second CQI number represents a CQI index in the second CQI table.

In Table C13, a correspondence between a CQI index and each parameter is merely an example. For example, a modulation scheme corresponding to a first CQI number 15 and a second CQI number 17 may not be 64QAM, or a corresponding value obtained by multiplying a code rate by 1024 may not be 666. This is not specifically limited.

It should be noted that the first CQI table and/or the second CQI table provided in this embodiment of this application may include at least one corresponding entry shown in Table C13, and may further include another possible entry that is not shown in Table C13. Provided that the another entry meets a rule of determining the first CQI table based on the second CQI table in this embodiment of this application, the another entry falls within the protection scope of this embodiment of this application. Table C13 may be alternatively tailored. For example, one or more entries in Table C13 may also form one or more new Tables C13, which also fall within the protection scope of this embodiment of this application.

It should be noted that the MCS table provided in this embodiment of this application may include at least one entry shown in Table A1, A2, A8, A9, A9-1, A13, A32-1, A36, A42, A46, A49, A50, A50-1, C2, C5-1, or C5-3, and may further include another possible entry that is not shown in Table A1, A2, A8, A9, A9-1, A13, A32-1, A36, A42, A46, A49, A50, A50-1, C2, C5-1, or C5-3. Provided that the another entry meets a rule of the MCS table in this embodiment of this application, the another entry falls within the protection scope of this embodiment of this application. Table A1, A2, A8, A9, A9-1, A13, A32-1, A36, A42, A46, A49, A50, A50-1, C2, C5-1, or C5-3 may be alternatively tailored to form a new table. For example, one or more entries in Table A1 may also separately form one or more new Tables A1, and one or more entries in Table A2 may also separately form one or more new Tables A2. The other tables are similar, and details are not described. The new table formed after tailoring also falls within the protection scope of this embodiment of this application.

Figure 5:
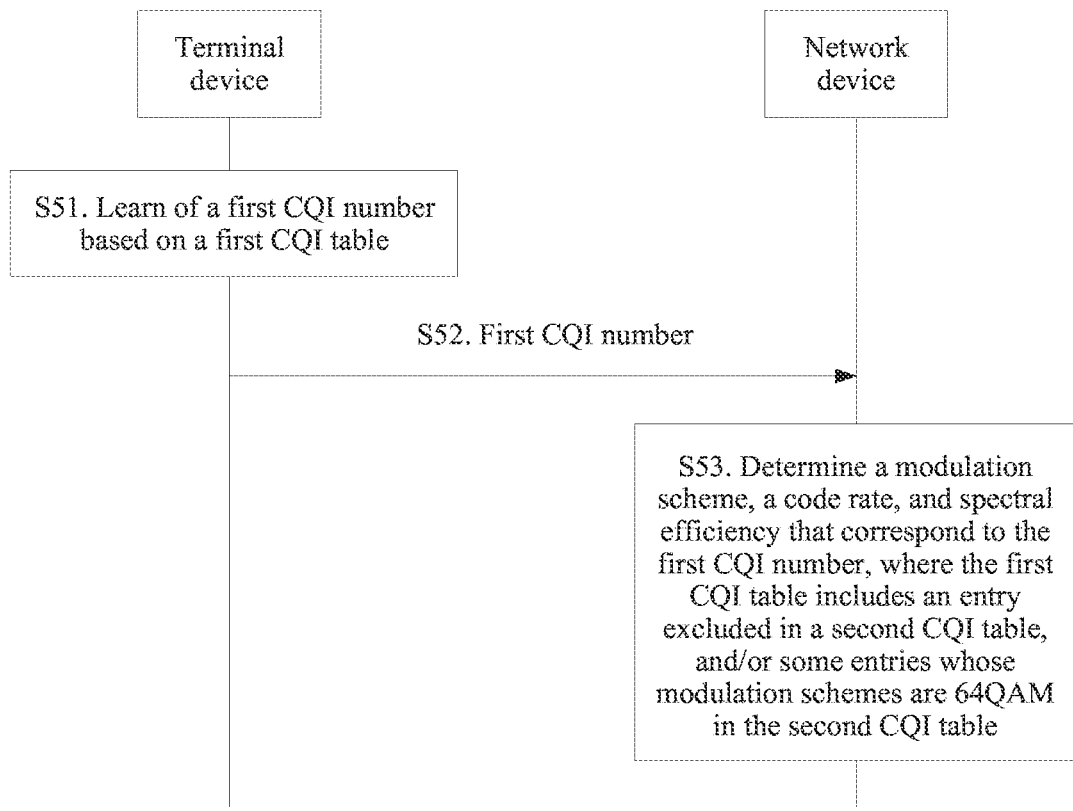
FIG. 5 is a flowchart of a communication method according to an embodiment of this application.

Referring to FIG. 5, an embodiment of this application provides a third communication method. The method is also referred to as a CQI receiving and notification method. In the following description process, an example in which the method is applied to the application scenario shown in FIG. 2 is used. A procedure of the method is described as follows:

S51. A terminal device learns of a first CQI number based on a first CQI table.

S52. If the terminal device sends the first CQI number, a network device receives the first CQI number.

S53. The network device determines a modulation scheme, a code rate, and spectral efficiency that correspond to the first CQI number, where the first CQI table includes an entry excluded in a second CQI table, and/or some entries whose modulation schemes are 64QAM in the second CQI table.

All entries whose modulation schemes are 64QAM in the first CQI table are the some entries of 64QAM in the second CQI table, and the some entries of 64QAM in the second CQI table are as follows:

the some entries correspond to equally spaced CQI numbers; or the some entries correspond to nonconsecutive CQI numbers, and are at least one entry other than an entry corresponding to a largest CQI number in all entries whose modulation schemes are 64QAM in the second CQI table; or the some entries correspond to consecutive CQI numbers, and are at least one entry other than an entry corresponding to a largest CQI number in all entries whose modulation schemes are 64QAM in the second CQI table; or the some entries include an entry corresponding to a largest CQI number in all entries whose modulation schemes are 64QAM in the second CQI table; or the some entries include N entries whose modulation schemes are 64QAM in the second CQI table and that correspond to consecutive CQI numbers, and a first entry in the N consecutive entries is an entry whose modulation scheme is 64QAM in the second CQI table and that corresponds to a smallest CQI number, where N is a positive integer greater than or equal to 1 and less than or equal to 5.

All the entries whose modulation schemes are 64QAM in the first CQI table are the some entries of 64QAM in the second CQI table, and the some entries of 64QAM in the second CQI table are as follows:

numbers of the some entries whose modulation schemes are 64QAM in the second CQI table are a CQI number 10, a CQI number 12, and a CQI number 14, or a CQI number 11, a CQI number 13, and a CQI number 15 in the second CQI table; or numbers of the some entries whose modulation schemes are 64QAM in the second CQI table are a CQI number 10, a CQI number 11, a CQI number 12, a CQI number 13, and a CQI number 15, or a CQI number 10, a CQI number 11, a CQI number 14, and a CQI number 15, or a CQI number 11, a CQI number 12, a CQI number 13, a CQI number 14, and a CQI number 15, or a CQI number 10, a CQI number 11, a CQI number 12, a CQI number 14, and a CQI number 15 in the second CQI table; or numbers of the some entries whose modulation schemes are 64QAM in the second CQI table are a CQI number 10, a CQI number 11, a CQI number 12, a CQI number 13, and a CQI number 14, or a CQI number 10, a CQI number 11, a CQI number 12, and a CQI number 13, or a CQI number 10, a CQI number 11, and a CQI number 12, or a CQI number 10 and a CQI number 11 in the second CQI table.

Alternatively, all the entries whose modulation schemes are 64QAM in the first CQI table are the some entries of 64QAM in the second CQI table, and the some entries of 64QAM in the second CQI table are as follows:

numbers of the some entries whose modulation schemes are 64QAM in the second CQI table are a CQI number 10, a CQI number 12, and a CQI number 14, or a CQI number 11, a CQI number 13, and a CQI number 15 in the second CQI table; or numbers of the some entries whose modulation schemes are 64QAM in the second CQI table are a CQI number 10, a CQI number 11, a CQI number 12, a CQI number 13, and a CQI number 15, or a CQI number 10, a CQI number 11, a CQI number 14, and a CQI number 15, or a CQI number 11, a CQI number 12, a CQI number 13, a CQI number 14, and a CQI number 15, or a CQI number 10, a CQI number 11, a CQI number 12, a CQI number 14, and a CQI number 15 in the second CQI table; or numbers of the some entries whose modulation schemes are 64QAM in the second CQI table are a CQI number 10, a CQI number 11, a CQI number 12, a CQI number 13, and a CQI number 14, or a CQI number 10, a CQI number 11, a CQI number 12, and a CQI number 13, or a CQI number 10, a CQI number 11, and a CQI number 12, or a CQI number 10 and a CQI number 11 in the second CQI table.

For the first CQI table and the second CQI table, a difference is similar to a difference between Table C6 and each of Table C1 and Table C2. Therefore, for a related description of the embodiment shown in FIG. 5, refer to the embodiment shown in FIG. 4.

Devices provided in the embodiments of this application are described below with reference to the accompanying drawings.

Figure 6:
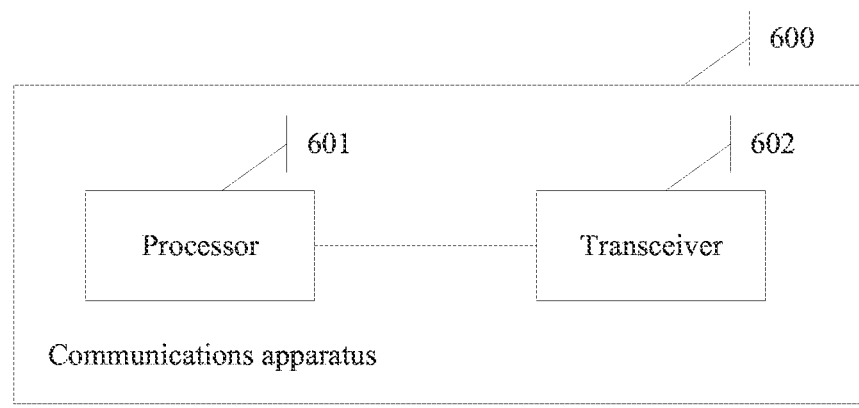
FIG. 6 is a schematic diagram of a communications apparatus according to an embodiment of this application.

FIG. 6 is a schematic structural diagram of a communications apparatus 600. The communications apparatus 600 can implement a function of the network device in the foregoing specification. The communications apparatus 600 may be the network device described in the foregoing specification, or may be a chip disposed in the network device described in the foregoing specification. The communications apparatus 600 may include a processor 601 and a transceiver 602. The processor 601 may be configured to perform S31 in the embodiment shown in FIG. 3, and/or S53 in the embodiment shown in FIG. 5, and/or another process used to support the technology described in this specification. The transceiver 602 may be configured to perform S32 and S35 in the embodiment shown in FIG. 3, and/or S41 and S42 in the embodiment shown in FIG. 4, and/or S52 in the embodiment shown in FIG. 5, and/or another process used to support the technology described in this specification.

For example, the processor 601 is configured to determine N MCS indexes in an MCS table, where a value that is obtained by multiplying a code rate by 1024 and that corresponds to an MCS index X in the N MCS indexes is less than or equal to a first threshold, where X is an integer greater than or equal to 0, N is a positive integer, and N≥X; and the transceiver 602 is configured to send at least one of the N MCS indexes.

All content related to the steps in the foregoing method embodiments may be cited in function descriptions of corresponding function modules. Details are not described herein again.

Figure 7:
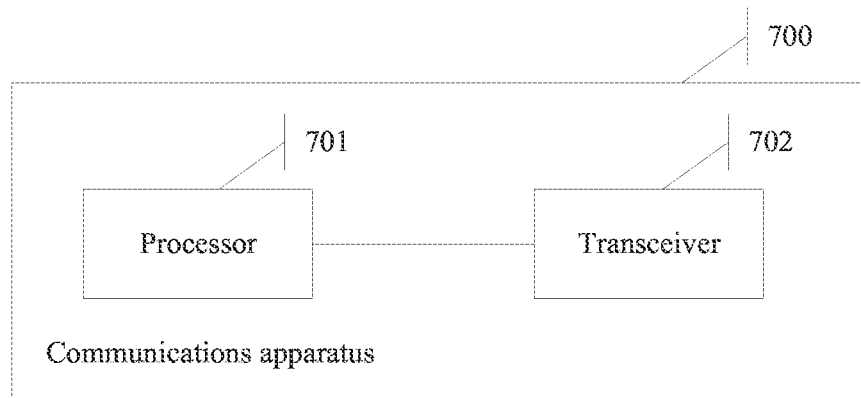
FIG. 7 is a schematic diagram of a communications apparatus according to an embodiment of this application.

FIG. 7 is a schematic structural diagram of a communications apparatus 700. The communications apparatus 700 can implement a function of the terminal device in the foregoing specification. The communications apparatus 700 may be the terminal device described in the foregoing specification, or may be a chip disposed in the terminal device described in the foregoing specification. The communications apparatus 700 may include a processor 701 and a transceiver 702. The processor 701 may be configured to perform S33 and S34 in the embodiment shown in FIG. 3, and/or S51 in the embodiment shown in FIG. 5, and/or another process used to support the technology described in this specification. The transceiver 702 may be configured to perform S32 and S35 in the embodiment shown in FIG. 3, and/or S41 and S42 in the embodiment shown in FIG. 4, and/or S52 in the embodiment shown in FIG. 5, and/or another process used to support the technology described in this specification.

For example, the transceiver 702 is configured to receive downlink control information; and the processor 701 is configured to obtain at least one MCS index in an MCS table from the downlink control information, where the MCS table includes N MCS indexes, a value that is obtained by multiplying a code rate by 1024 and that corresponds to an MCS index X in the N MCS indexes is less than or equal to a first threshold, where X is an integer greater than or equal to 0, N is a positive integer, and N≥X.

All content related to the steps in the foregoing method embodiments may be cited in function descriptions of corresponding function modules. Details are not described herein again.

Figure 8A:
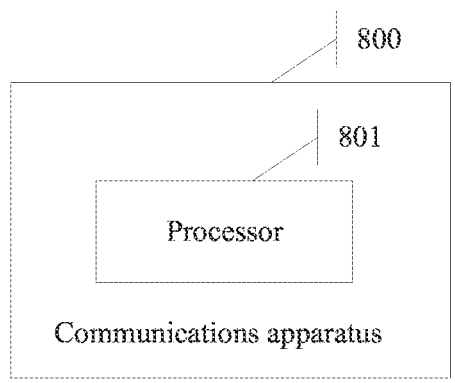
FIG. 8A and FIG. 8B are schematic diagrams of a communications apparatus according to an embodiment of this application.

In a simple embodiment, a person skilled in the art can figure out that the communications apparatus 600 or the communications apparatus 700 may be alternatively implemented by using a structure of a communications apparatus 800 shown in FIG. 8A. The communications apparatus 800 can implement a function of the network device or the terminal device in the foregoing specification. The communications apparatus 800 may include a processor 801. When the communications apparatus 800 is configured to implement a function of the terminal device in the embodiment shown in FIG. 3, the processor 801 may be configured to perform S33 and S34 in the embodiment shown in FIG. 3, and/or another process used to support the technology described in this specification. When the communications apparatus 800 is configured to implement a function of the network device in the embodiment shown in FIG. 3, the processor 801 may be configured to perform S31 in the embodiment shown in FIG. 3, and/or another process used to support the technology described in this specification. When the communications apparatus 800 is configured to implement a function of the terminal device in the embodiment shown in FIG. 5, the processor 801 may be configured to perform S5i in the embodiment shown in FIG. 5, and/or another process used to support the technology described in this specification. When the communications apparatus 800 is configured to implement a function of the network device in the embodiment shown in FIG. 5, the processor 801 may be configured to perform S53 in the embodiment shown in FIG. 5, and/or another process used to support the technology described in this specification.

The communications apparatus 800 may be implemented by using a field-programmable gate array (FPGA), an application-specific integrated circuit (ASIC), a system on chip (SoC), a central processing unit (CPU), a network processor (NP), a digital signal processor (DSP), a micro control unit (MCU), a programmable logic device (PLD), or another integrated chip. The communications apparatus 800 may be disposed in the network device or the terminal device in the embodiments of this application, so that the network device or the terminal device implements the method provided in the embodiments of this application.

In an optional implementation, the communications apparatus 800 may include a transceiver component, configured to communicate with a network device. For example, when the communications apparatus 800 is configured to implement a function of the network device or the terminal device in the embodiment shown in FIG. 3, the transceiver component may be configured to perform S32 and S35 in the embodiment shown in FIG. 3, and/or another process used to support the technology described in this specification. When the communications apparatus 800 is configured to implement a function of the network device or the terminal device in the embodiment shown in FIG. 4, the transceiver component may be configured to perform S41 and S42 in the embodiment shown in FIG. 4, and/or another process used to support the technology described in this specification. When the communications apparatus 800 is configured to implement a function of the network device or the terminal device in the embodiment shown in FIG. 5, the transceiver component may be configured to perform S52 in the embodiment shown in FIG. 5, and/or another process used to support the technology described in this specification.

Figure 8B:
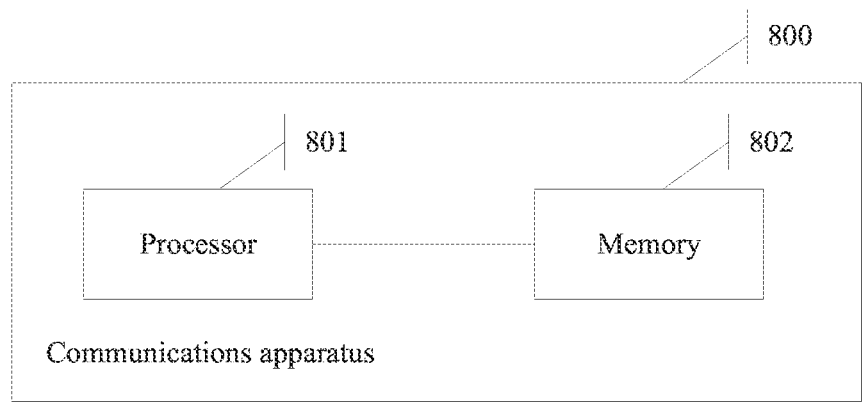

In an optional implementation, referring to FIG. 8B, the communications apparatus 800 may further include a memory 802. The memory 802 is configured to store computer programs or instructions, and the processor 80 is configured to decode and execute these computer programs or instructions. It should be understood that these computer programs or instructions may include function programs of the foregoing network device or terminal device. When the function programs of the network device are decoded and executed by the processor 801, the network device can implement functions of the network device in the method provided in the embodiment shown in FIG. 3, the embodiment shown in FIG. 4, or the embodiment shown in FIG. 5. When the function programs of the terminal device are decoded and executed by the processor 801, the terminal device can implement functions of the terminal device in the method provided in the embodiment shown in FIG. 3, the embodiment shown in FIG. 4, or the embodiment shown in FIG. 5.

In another optional implementation, the function programs of the network device or the terminal device are stored in an external memory of the communications apparatus 800. When the function programs of the network device are decoded and executed by the processor 801, the memory 802 temporarily stores some or all content of the function programs of the network device. When the function programs of the terminal device are decoded and executed by the processor 801, the memory 802 temporarily stores some or all content of the function programs of the terminal device.

In another optional implementation, the function programs of the network device or the terminal device are set to be stored in an internal memory 802 of the communications apparatus 800. When the function programs of the network device are stored in the internal memory 802 of the communications apparatus 800, the communications apparatus 800 may be disposed in the network device in the embodiments of this application. When the function programs of the terminal device are stored in the internal memory 802 of the communications apparatus 800, the communications apparatus 800 may be disposed in the terminal device in the embodiments of this application.

In still another optional implementation, some content of the function programs of the network device is stored in an external memory of the communications apparatus 800, and other content of the function programs of the network device is stored in an internal memory 802 of the communications apparatus 800. Alternatively, some content of the function programs of the terminal device is stored in an external memory of the communications apparatus 800, and other content of the function programs of the terminal device is stored in an internal memory 802 of the communications apparatus 800.

In the embodiments of this application, the communications apparatus 600, the communications apparatus 700, and the communications apparatus 800 are presented in a form in which each function module is divided for each function, or may be presented in a form in which each function module is divided in an integrated manner. The "module" herein may be an ASIC, a processor and a memory that execute one or more software or firmware programs, an integrated logic circuit, and/or another component that can provide the foregoing functions.

In addition, the communications apparatus 600 provided in the embodiment shown in FIG. 6 may be alternatively implemented in another form. For example, the communications apparatus 600 includes a processing module, and optionally, may further include a transceiver module. For example, the processing module may be implemented by using the processor 601, and the transceiver module may be implemented by using the transceiver 602. The processing module may be configured to perform S31 in the embodiment shown in FIG. 3, and/or S53 in the embodiment shown in FIG. 5, and/or another process used to support the technology described in this specification. The transceiver module may be configured to perform S32 and S35 in the embodiment shown in FIG. 3, and/or S41 and S42 in the embodiment shown in FIG. 4, and/or S52 in the embodiment shown in FIG. 5, and/or another process used to support the technology described in this specification.

For example, the processing module is configured to determine N MCS indexes in an MCS table, where a value that is obtained by multiplying a code rate by 1024 and that corresponds to an MCS index X in the N MCS indexes is less than or equal to a first threshold, where X is an integer greater than or equal to 0, N is a positive integer, and N≥X; and the transceiver module is configured to send at least one of the N MCS indexes.

All content related to the steps in the foregoing method embodiments may be cited in function descriptions of corresponding function modules. Details are not described herein.

The communications apparatus 700 provided in the embodiment shown in FIG. 7 may be alternatively implemented in another form. For example, the communications apparatus 700 includes a processing module, and optionally, may further include a transceiver module. For example, the processing module may be implemented by using the processor 701, and the transceiver module may be implemented by using the transceiver 702. The processing module may be configured to perform S33 and S34 in the embodiment shown in FIG. 3, and/or S51 in the embodiment shown in FIG. 5, and/or another process used to support the technology described in this specification. The transceiver module may be configured to perform S32 and S35 in the embodiment shown in FIG. 3, and/or S41 and S42 in the embodiment shown in FIG. 4, and/or S52 in the embodiment shown in FIG. 5, and/or another process used to support the technology described in this specification.

For example, the transceiver module is configured to receive downlink control information; and the processing module is configured to obtain at least one MCS index in an MCS table from the downlink control information, where the MCS table includes N MCS indexes, a value that is obtained by multiplying a code rate by 1024 and that corresponds to an MCS index X in the N MCS indexes is less than or equal to a first threshold, where X is an integer greater than or equal to 0, N is a positive integer, and N≥X.

All content related to the steps in the foregoing method embodiments may be cited in function descriptions of corresponding function modules. Details are not described herein.

The communications apparatus 600, the communications apparatus 700, and the communications apparatus 800 provided in the embodiments of this application may be configured to perform the method provided in the embodiment shown in FIG. 3, the embodiment shown in FIG. 4, or the embodiment shown in FIG. 5. Therefore, for a technical effect that can be achieved by the communications apparatus 600, the communications apparatus 700, and the communications apparatus 800, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Apparently, a person skilled in the art can make various modifications and variations to the embodiments of this application without departing from the spirit and scope of this application. In this way, this application is intended to cover these modifications and variations provided that they fall within the scope of protection defined by the following claims of this application and their equivalent technologies.

What is claimed is:

1. A method, comprising:
sending a first channel quality indicator (CQI) index to a network device, wherein the first CQI index is determined based on a first CQI table; and
receiving a modulation and coding scheme (MCS) index corresponding to a first MCS table from the network device, wherein the first MCS table comprises at least one entry that is not comprised in the first CQI table, and the first CQI table comprises at least one entry whose modulation scheme is 64 quadrature amplitude modulation (QAM), wherein a block error rate (BLER) corresponding to the first CQI table does not exceed 10e-5, values in the first CQI table corresponding to a multiplication of code rates by 1024 comprise 30 and 50, and wherein spectral efficiency of an entry of an MCS index 0 in the first MCS table is less than or equal to spectral efficiency of an entry of a CQI index 1 in the first CQI table.

2. The method according to claim 1, wherein the first MCS table comprises all entries other than an entry corresponding to a smallest CQI index in the first CQI table.

3. The method according to claim 1, wherein an MCS index that is of the entry not comprised in the first CQI table and that is in the first MCS table is one of the following:
the MCS index 0, an MCS index 1, or an MCS index 3.

4. The method according to claim 1, wherein all entries whose modulation schemes are 64 QAM in the first CQI table are some entries of 64QAM in a second CQI table, and the some entries of 64QAM in the second CQI table are as follows:
the some entries correspond to consecutive CQI indexes, and the some entries comprise at least one entry other than an entry corresponding to a largest CQI index in all entries whose modulation schemes are 64QAM in the second CQI table; or
the some entries comprise N entries whose modulation schemes are 64QAM in the second CQI table and that correspond to consecutive CQI indexes, and a first entry in the N consecutive entries is an entry whose modulation scheme is 64QAM in the second CQI table and that corresponds to a smallest CQI index, wherein N is a positive integer greater than or equal to 1 and less than or equal to 5, wherein the second CQI table is as following:

| CQI index | Modulation scheme | Code rate × [1024] | Spectral efficiency |
|---|---|---|---|
| 0 | Out of range | | |
| 1 | Quadrature phase shift keying (QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547. |

5. The method according to claim 4, wherein all the entries whose modulation schemes are 64QAM in the first CQI table are the some entries of 64QAM in the second CQI table, and the some entries of 64QAM in the second CQI table are entries corresponding to a CQI index 10, a CQI index 11, a CQI index 12, and a CQI index 13 in the second CQI table.

6. The method according to claim 1, wherein each entry in the first CQI table corresponds to one CQI index, and each of some CQI indexes in the first CQI table corresponds to one modulation scheme, one code rate, and one piece of spectral efficiency, and wherein in the first CQI table:
a modulation scheme corresponding to an entry whose CQI index is 3 is QPSK, a corresponding value obtained by multiplying a code rate by 1024 is 78, and corresponding spectral efficiency is 0.1523;

a modulation scheme corresponding to an entry whose CQI index is 4 is QPSK, a corresponding value obtained by multiplying a code rate by 1024 is 120, and corresponding spectral efficiency is 0.2344;

a modulation scheme corresponding to an entry whose CQI index is 5 is QPSK, a corresponding value obtained by multiplying a code rate by 1024 is 193, and corresponding spectral efficiency is 0.3770;

a modulation scheme corresponding to an entry whose CQI index is 6 is QPSK, a corresponding value obtained by multiplying a code rate by 1024 is 308, and corresponding spectral efficiency is 0.6016;

a modulation scheme corresponding to an entry whose CQI index is 7 is QPSK, a corresponding value obtained by multiplying a code rate by 1024 is 449, and corresponding spectral efficiency is 0.8770;

a modulation scheme corresponding to an entry whose CQI index is 8 is QPSK, a corresponding value obtained by multiplying a code rate by 1024 is 602, and corresponding spectral efficiency is 1.1758;

a modulation scheme corresponding to an entry whose CQI index is 9 is 16QAM, a corresponding value obtained by multiplying a code rate by 1024 is 378, and corresponding spectral efficiency is 1.4766;

a modulation scheme corresponding to an entry whose CQI index is 10 is 16QAM, a corresponding value obtained by multiplying a code rate by 1024 is 490, and corresponding spectral efficiency is 1.9141; and a modulation scheme corresponding to an entry whose CQI index is 11 is 16QAM, a corresponding value obtained by multiplying a code rate by 1024 is 616, and corresponding spectral efficiency is 2.4063.

7. The method according to claim 1, wherein the values in the first CQI table corresponding to the multiplication of code rates by 1024 further comprise the following values: 78, 120, 193, 308, 449, 602, 378, 490, 616, 466, 567, 666, and 772.

8. The method according to claim 7, wherein in the first CQI table:

a modulation scheme corresponding to the value 30 obtained by multiplying a code rate by 1024 is QPSK, and corresponding spectral efficiency is 0.0586;

a modulation scheme corresponding to the value 50 obtained by multiplying a code rate by 1024 is QPSK, and corresponding spectral efficiency is 0.0977;

a modulation scheme corresponding to the value 78 obtained by multiplying a code rate by 1024 is QPSK, and corresponding spectral efficiency is 0.1523;

a modulation scheme corresponding to the value 120 obtained by multiplying a code rate by 1024 is QPSK, and corresponding spectral efficiency is 0.2344;

a modulation scheme corresponding to the value 193 obtained by multiplying a code rate by 1024 is QPSK, and corresponding spectral efficiency is 0.3770;

a modulation scheme corresponding to the value 308 obtained by multiplying a code rate by 1024 is QPSK, and corresponding spectral efficiency is 0.6016;

a modulation scheme corresponding to the value 449 obtained by multiplying a code rate by 1024 is QPSK, and corresponding spectral efficiency is 0.8770;

a modulation scheme corresponding to the value 602 obtained by multiplying a code rate by 1024 is QPSK, and corresponding spectral efficiency is 1.1758;

a modulation scheme corresponding to the value 378 obtained by multiplying a code rate by 1024 is 16QAM, and corresponding spectral efficiency is 1.4766;

a modulation scheme corresponding to the value 490 obtained by multiplying a code rate by 1024 is 16QAM, and corresponding spectral efficiency is 1.9141;

a modulation scheme corresponding to the value 616 obtained by multiplying a code rate by 1024 is 16QAM, and corresponding spectral efficiency is 2.4063;

a modulation scheme corresponding to the value 466 obtained by multiplying a code rate by 1024 is 64QAM, and corresponding spectral efficiency is 2.7305;

a modulation scheme corresponding to the value 567 obtained by multiplying a code rate by 1024 is 64QAM, and corresponding spectral efficiency is 3.3223;

a modulation scheme corresponding to the value 666 obtained by multiplying a code rate by 1024 is 64QAM, and corresponding spectral efficiency is 3.9023; and a modulation scheme corresponding to the value 772 obtained by multiplying a code rate by 1024 is 64QAM, and corresponding spectral efficiency is 4.5234.

9. A communication apparatus, comprising:

at least one processor in communication with at least one memory, the at least one processor being configured, upon execution of instructions stored in the at least one memory, to perform the following steps:

sending a first channel quality indicator (CQI) index to a network device, wherein the first CQI index is determined based on a first CQI table; and receiving a modulation and coding scheme (MCS) index corresponding to a first MCS table from the network device, wherein the first MCS table comprises at least one entry that is not comprised in the first CQI table, and the first CQI table further comprises at least one entry whose modulation scheme is 64 quadrature amplitude modulation (QAM), wherein a block error rate (BLER) corresponding to the first CQI table does not exceed 10e-5, values in the first CQI table corresponding to a multiplication of code rates by 1024 comprise 30 and 50, and wherein spectral efficiency of an entry of an MCS index 0 in the first MCS table is less than or equal to spectral efficiency of an entry of a COI index 1 in the first CQI table.

10. The communication apparatus according to claim 9, wherein the first MCS table comprises all entries other than an entry corresponding to a smallest CQI index in the first CQI table.

11. The communication apparatus according to claim 9, wherein an MCS index that is of the entry not comprised in the first CQI table and that is in the first MCS table is one of the following:

the MCS index 0, an MCS index 1, or an MCS index 3.

12. The communication apparatus according to claim 9, wherein all entries whose modulation schemes are 64 QAM in the first CQI table are some entries of 64QAM in a second CQI table, and the some entries of 64QAM in the second CQI table are as follows:

the some entries correspond to consecutive CQI indexes, and are at least one entry other than an entry corresponding to a largest CQI index in all entries whose modulation schemes are 64QAM in the second CQI table; or the some entries comprise N entries whose modulation schemes are 64QAM in the second CQI table and that correspond to consecutive CQI indexes, and a first entry in the N consecutive entries is an entry whose modulation scheme is 64QAM in the second CQI table and that corresponds to a smallest CQI index, wherein N is a positive integer greater than or equal to 1 and less than or equal to 5, wherein the second CQI table is as following:

| CQI index | Modulation scheme | Code rate × [1024] | Spectral efficiency |
|---|---|---|---|
| 0 | | Out of range | |
| 1 | Quadrature phase shift keying (QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547. |

13. The communication apparatus according to claim 12, wherein all the entries whose modulation schemes are 64QAM in the first CQI table are the some entries of 64QAM in the second CQI table, and the some entries of 64QAM in the second CQI table are entries corresponding to a CQI index 10, a CQI index 11, a CQI index 12, and a CQI index 13 in the second CQI table.

14. The communication apparatus according to claim 9, wherein each entry in the first CQI table corresponds to one CQI index, and each of some CQI indexes in the first CQI table corresponds to one modulation scheme, one code rate, and one piece of spectral efficiency, and wherein in the first CQI table:
a modulation scheme corresponding to an entry whose CQI index is 3 is QPSK, a corresponding value obtained by multiplying a code rate by 1024 is 78, and corresponding spectral efficiency is 0.1523;
a modulation scheme corresponding to an entry whose CQI index is 4 is QPSK, a corresponding value obtained by multiplying a code rate by 1024 is 120, and corresponding spectral efficiency is 0.2344;
a modulation scheme corresponding to an entry whose CQI index is 5 is QPSK, a corresponding value obtained by multiplying a code rate by 1024 is 193, and corresponding spectral efficiency is 0.3770;
a modulation scheme corresponding to an entry whose CQI index is 6 is QPSK, a corresponding value obtained by multiplying a code rate by 1024 is 308, and corresponding spectral efficiency is 0.6016;
a modulation scheme corresponding to an entry whose CQI index is 7 is QPSK, a corresponding value obtained by multiplying a code rate by 1024 is 449, and corresponding spectral efficiency is 0.8770;
a modulation scheme corresponding to an entry whose CQI index is 8 is QPSK, a corresponding value obtained by multiplying a code rate by 1024 is 602, and corresponding spectral efficiency is 1.1758;
a modulation scheme corresponding to an entry whose CQI index is 9 is 16QAM, a corresponding value obtained by multiplying a code rate by 1024 is 378, and corresponding spectral efficiency is 1.4766;
a modulation scheme corresponding to an entry whose CQI index is 10 is 16QAM, a corresponding value obtained by multiplying a code rate by 1024 is 490, and corresponding spectral efficiency is 1.9141; and
a modulation scheme corresponding to an entry whose CQI index is 11 is 16QAM, a corresponding value obtained by multiplying a code rate by 1024 is 616, and corresponding spectral efficiency is 2.4063.

15. The communication apparatus according to claim 9, wherein the values in the first CQI table corresponding to the multiplication of code rates by 1024 further comprise the following values: 78, 120, 193, 308, 449, 602, 378, 490, 616, 466, 567, 666, and 772.

16. The communication apparatus according to claim 15, wherein in the first CQI table
a modulation scheme corresponding to the value 30 obtained by multiplying a code rate by 1024 is QPSK, and corresponding spectral efficiency is 0.0586;
a modulation scheme corresponding to the value 50 obtained by multiplying a code rate by 1024 is QPSK, and corresponding spectral efficiency is 0.0977;
a modulation scheme corresponding to the value 78 obtained by multiplying a code rate by 1024 is QPSK, and corresponding spectral efficiency is 0.1523;
a modulation scheme corresponding to the value 120 obtained by multiplying a code rate by 1024 is QPSK, and corresponding spectral efficiency is 0.2344;
a modulation scheme corresponding to the value 193 obtained by multiplying a code rate by 1024 is QPSK, and corresponding spectral efficiency is 0.3770;
a modulation scheme corresponding to the value 308 obtained by multiplying a code rate by 1024 is QPSK, and corresponding spectral efficiency is 0.6016;
a modulation scheme corresponding to the value 449 obtained by multiplying a code rate by 1024 is QPSK, and corresponding spectral efficiency is 0.8770;
a modulation scheme corresponding to the value 602 obtained by multiplying a code rate by 1024 is QPSK, and corresponding spectral efficiency is 1.1758;
a modulation scheme corresponding to the value 378 obtained by multiplying a code rate by 1024 is 16QAM, and corresponding spectral efficiency is 1.4766;
a modulation scheme corresponding to the value 490 obtained by multiplying a code rate by 1024 is 16QAM, and corresponding spectral efficiency is 1.9141;
a modulation scheme corresponding to the value 616 obtained by multiplying a code rate by 1024 is 16QAM, and corresponding spectral efficiency is 2.4063;
a modulation scheme corresponding to the value 466 obtained by multiplying a code rate by 1024 is 64QAM, and corresponding spectral efficiency is 2.7305;
a modulation scheme corresponding to the value 567 obtained by multiplying a code rate by 1024 is 64QAM, and corresponding spectral efficiency is 3.3223;
a modulation scheme corresponding to the value 666 obtained by multiplying a code rate by 1024 is 64QAM, and corresponding spectral efficiency is 3.9023; and
a modulation scheme corresponding to the value 772 obtained by multiplying a code rate by 1024 is 64QAM, and corresponding spectral efficiency is 4.5234.

17. A communication apparatus, comprising:
at least one processor in communication with at least one memory, the at least one processor configured, upon execution of instructions stored in the at least one memory, to perform the following steps:
receiving a first channel quality indicator (CQI) index corresponding to a first CQI table from a terminal device; and sending a first modulation and coding scheme (MCS) index, wherein the first MCS index is determined based on a first MCS table, and the first MCS table comprises at least one entry that is not comprised in the first CQI table, and the first CQI table comprises at least one entry whose modulation scheme is 64 quadrature amplitude modulation (QAM), wherein a block error rate BLER corresponding to the first CQI table does not exceed 10e-5, values in the first CQI table corresponding to the multiplication of code rates by 1024 comprise 30 and 50, and wherein spectral efficiency of an entry of an MCS index 0 in the first MCS table is less than or equal to spectral efficiency of an entry of a CQI index 1 in the first COI table.

18. The communication apparatus according to claim 17, wherein all entries whose modulation schemes are 64 QAM in the first CQI table are some entries of 64QAM in a second CQI table, and the some entries of 64QAM in the second CQI table are as follows:

the some entries correspond to consecutive CQI indexes, and are at least one entry other than an entry corresponding to a largest CQI index in all entries whose modulation schemes are 64QAM in the second CQI table; or the some entries comprise N entries whose modulation schemes are 64QAM in the second CQI table and that correspond to consecutive CQI indexes, and a first entry in the N consecutive entries is an entry whose modulation scheme is 64QAM in the second CQI table and that corresponds to a smallest CQI index, wherein N is a positive integer greater than or equal to 1 and less than or equal to 5, wherein the second CQI table is as following:

| CQI index | Modulation scheme | Code rate × [1024] | Spectral efficiency |
|---|---|---|---|
| 0 | Out of range | | |
| 1 | Quadrature phase shift keying (QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547. |

* * * * *

UNITED STATES PATENT AND TRADEMARK OFFICE
CERTIFICATE OF CORRECTION

| | |
|---|---|
| PATENT NO. | : 12,063,110 B2 |
| APPLICATION NO. | : 18/204645 |
| DATED | : August 13, 2024 |
| INVENTOR(S) | : Shao et al. |

It is certified that error appears in the above-identified patent and that said Letters Patent is hereby corrected as shown below:

In the Claims

In Column 70, in Claim 9, Line 41, delete "COI" and insert -- CQI --.

In Column 73, in Claim 17, Line 14, delete "COI" and insert -- CQI --.

Signed and Sealed this
Seventeenth Day of September, 2024

Katherine Kelly Vidal
Director of the United States Patent and Trademark Office